United States Patent
Ishigure

(10) Patent No.: US 8,953,202 B2
(45) Date of Patent: Feb. 10, 2015

(54) IMAGE FORMING APPARATUS, INFORMATION PROCESSING APPARATUS, IMAGE FORMING SYSTEM, AND METHOD FOR FORMING IMAGES

(71) Applicant: Oki Data Corporation, Tokyo (JP)

(72) Inventor: Tsuyoshi Ishigure, Tokyo (JP)

(73) Assignee: Oki Data Corporation, Tokyo (JP)

( * ) Notice: Subject to any disclaimer, the term of this patent is extended or adjusted under 35 U.S.C. 154(b) by 88 days.

(21) Appl. No.: 13/630,719

(22) Filed: Sep. 28, 2012

(65) Prior Publication Data

US 2013/0083359 A1 Apr. 4, 2013

(30) Foreign Application Priority Data

Sep. 30, 2011 (JP) ................. 2011-216816

(51) Int. Cl.
*G06K 15/02* (2006.01)
*H04N 1/00* (2006.01)

(52) U.S. Cl.
CPC ....... *H04N 1/00347* (2013.01); *H04N 1/00973* (2013.01); *H04N 2201/0039* (2013.01)
USPC ....... 358/1.15; 358/1.13; 358/1.14; 358/1.16; 709/208; 709/227; 709/248; 707/610; 707/704

(58) Field of Classification Search
None
See application file for complete search history.

(56) References Cited

U.S. PATENT DOCUMENTS

| | | | |
|---|---|---|---|
| 4,965,719 A * | 10/1990 | Shoens et al. | 711/100 |
| 5,720,015 A * | 2/1998 | Martin et al. | 358/1.15 |
| 6,256,750 B1 | 7/2001 | Takeda | |
| 7,580,146 B2 * | 8/2009 | Halsema | 358/1.15 |
| 7,836,158 B2 * | 11/2010 | Kasatani | 709/220 |
| 8,228,537 B2 * | 7/2012 | Uehara | 358/1.15 |
| 2002/0131069 A1 | 9/2002 | Wanda | |
| 2003/0182367 A1 * | 9/2003 | Ohara | 709/203 |
| 2004/0032614 A1 * | 2/2004 | Tanaka et al. | 358/1.15 |
| 2004/0111462 A1 * | 6/2004 | Minato | 709/200 |
| 2004/0170460 A1 * | 9/2004 | Mokuya et al. | 400/76 |
| 2005/0289116 A1 | 12/2005 | Chae et al. | |
| 2006/0279776 A1 * | 12/2006 | Akiyama | 358/1.15 |

(Continued)

FOREIGN PATENT DOCUMENTS

| | | |
|---|---|---|
| JP | 2000-181653 A | 6/2000 |
| JP | 2008-147935 A | 6/2008 |

(Continued)

*Primary Examiner* — King Poon
*Assistant Examiner* — Ted Barnes
(74) *Attorney, Agent, or Firm* — Rabin & Berdo, P.C.

(57) ABSTRACT

Image forming apparatuses are connected to a network. Each image forming apparatus communicates with remaining ones of the image forming apparatuses. An image forming section forms an image in accordance with the image information. A memory stores management information, the management information including an item of information about one of remaining ones of the plurality of image forming apparatuses. The one of remaining ones of the plurality of image forming apparatuses holds the image information therein. An information management section performs a synchronization processing in which the management information in the plurality of image forming apparatuses is updated to become identical. An image formation controlling section obtains the image information held in the one of remaining ones of the plurality of image forming apparatuses identified by the item of information, and drive the image forming section to form the image in accordance with the obtained image information.

16 Claims, 45 Drawing Sheets

(56) References Cited

U.S. PATENT DOCUMENTS

| | | | |
|---|---|---|---|
| 2007/0013941 A1* | 1/2007 | Anno | 358/1.15 |
| 2007/0139693 A1* | 6/2007 | Lodolo | 358/1.15 |
| 2007/0263245 A1* | 11/2007 | Carney et al. | 358/1.15 |
| 2008/0005331 A1* | 1/2008 | Shiraishi | 709/226 |
| 2008/0021991 A1* | 1/2008 | Kawai | 709/223 |
| 2008/0253667 A1* | 10/2008 | Shiraishi | 382/232 |
| 2009/0033983 A1* | 2/2009 | Tanaka et al. | 358/1.15 |
| 2009/0271696 A1* | 10/2009 | Bailor et al. | 715/229 |
| 2010/0118334 A1* | 5/2010 | Iwase | 358/1.15 |
| 2010/0220350 A1* | 9/2010 | Faridi | 358/1.15 |
| 2011/0095966 A1* | 4/2011 | Shinotou | 345/2.2 |
| 2011/0317223 A1* | 12/2011 | Nagao et al. | 358/442 |
| 2012/0274975 A1* | 11/2012 | Uemura | 358/1.14 |
| 2012/0278294 A1* | 11/2012 | Iyer et al. | 707/704 |
| 2012/0310881 A1* | 12/2012 | Shadmon | 707/613 |

FOREIGN PATENT DOCUMENTS

| | | |
|---|---|---|
| JP | 2008-301164 A | 12/2008 |
| JP | 2010-118788 A | 5/2010 |

* cited by examiner

| CONTROL DATA | DESTINATION | NAME-OF-PRINT DATA |
|---|---|---|
| @PJL JOB Name="DRAFT OF PATENT APPLICATION"<br>@PJL AUXJOBINFO DATA="ComputerName=PC1"<br>@PJL AUXJOBINFO DATA="UserName=Oki Taro"<br>@PJL AUXJOBINFO DATA="UserID=12345678"<br>@PJL AUXJOBINFO DATA="Date=10:00:00 2010/02/02"<br>⋮ | PRINTER B | 0001.dat |
| @PJL JOB Name="PROJECT PROPOSAL"<br>@PJL AUXJOBINFO DATA="ComputerName=PC2"<br>@PJL AUXJOBINFO DATA="UserName=Oki Jiro"<br>@PJL AUXJOBINFO DATA="UserID=23456789"<br>@PJL AUXJOBINFO DATA="Date=10:30:00 2010/02/02"<br>⋮ | PRINTER B | 0002.dat |
| @PJL JOB Name="SPECIFICATION"<br>@PJL AUXJOBINFO DATA="ComputerName=PC3"<br>@PJL AUXJOBINFO DATA="UserName=Oki Taro"<br>@PJL AUXJOBINFO DATA="UserID=12345678"<br>@PJL AUXJOBINFO DATA="Date=11:00:00 2010/02/02"<br>⋮ | PRINTER A | 0001.dat |

| PRINTER NAME | IP ADDRESS |
|---|---|
| PRINTER A | 192.168.1.1 |
| PRINTER B | 192.168.1.2 |
| PRINTER C | 192.168.1.3 |

```
<Type>TypeA</Type>
<ColorMono>Color</ColorMono>
<MediaSize>A4</MediaSize>
<Name>PRINTER A</Name>
<Capacity>5GByte</Capacity>
<Table>
<PJL>
@PJL JOB Name="DRAFT OF PATENT APPLICATION"
@PJL AUXJOBINFO DATA="ComputerName=PC1"
@PJL AUXJOBINFO DATA="UserName=Oki Taro"
@PJL AUXJOBINFO DATA="UserID=12345678"
@PJL AUXJOBINFO DATA="Date=10:00:00 2010/02/02"
      ⋮

</PJL>
<PrinterName>PRINTER B</PrinterName>
<FileName>001.dat</FileName>
<PJL>
@PJL JOB Name="PROJECT PROPOSAL"
@PJL AUXJOBINFO DATA="ComputerName=PC2"
@PJL AUXJOBINFO DATA="UserName=Oki Jiro"
@PJL AUXJOBINFO DATA="UserID=23456789"
@PJL AUXJOBINFO DATA="Date=10:30:00 2010/02/02"
      ⋮

</PJL>
<PrinterName>PrinterB</PrinterName>
<FileName>002.dat</FileName>
      ⋮

</Table>
```

```
<Command>ADD</Command>
<PJL>
@PJL JOB Name="DRAFT OF PATENT APPLICATION"
@PJL AUXJOBINFO DATA="ComputerName=PC1"
@PJL AUXJOBINFO DATA="UserName=Oki Taro"
@PJL AUXJOBINFO DATA="UserID=12345678"
@PJL AUXJOBINFO DATA="Date=10:00:00 2010/02/02"
       ⋮
</PJL>
<PrinterName>PRINTER B</PrinterName>
<FileName>001.dat</FileName>
```

```
<Command>DELETE</Command>
<PrinterName>PRINTER B</PrinterName>
<FileName>001.dat</FileName>
```

FIG.14

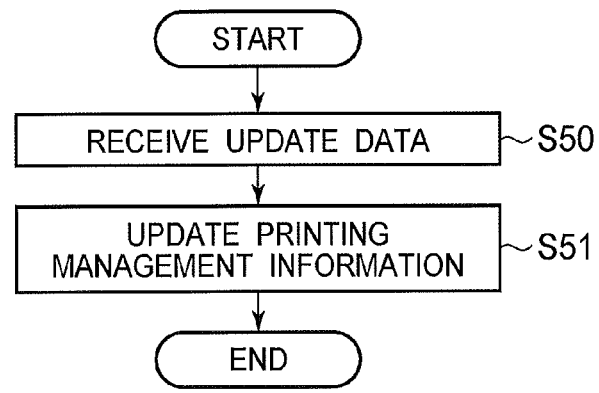

| CONTROL DATA | DESTINATION | NAME-OF-PRINT DATA |
|---|---|---|
| @PJL JOB Name="SPECIFICATION"<br>@PJL AUXJOBINFO DATA="ComputerName=PC3"<br>@PJL AUXJOBINFO DATA="UserName=Oki Taro"<br>@PJL AUXJOBINFO DATA="UserID=12345678"<br>@PJL AUXJOBINFO DATA="Date=11:00:00 2010/02/02"<br>⋮ | PRINTER A | 0001.dat |

| CONTROL DATA | DESTINATION | NAME-OF-PRINT DATA |
|---|---|---|
| @PJL JOB Name="SPECIFICATION"<br>@PJL AUXJOBINFO DATA="ComputerName=PC3"<br>@PJL AUXJOBINFO DATA="UserName=Oki Taro"<br>@PJL AUXJOBINFO DATA="UserID=12345678"<br>@PJL AUXJOBINFO DATA="Date=11:00:00 2010/02/02"<br>⋮ | PRINTER A | 0001.dat |
| @PJL JOB Name="DRAFT OF PATENT APPLICATION"<br>@PJL AUXJOBINFO DATA="ComputerName=PC1"<br>@PJL AUXJOBINFO DATA="UserName=Oki Taro"<br>@PJL AUXJOBINFO DATA="UserID=12345678"<br>@PJL AUXJOBINFO DATA="Date=10:00:00 2010/02/02"<br>⋮ | PRINTER B | 0001.dat |

```
<Command>DeletePrintData</Command>
<PJL>
@PJL JOB Name="SPEC SHEET"
@PJL AUXJOBINFO DATA="ComputerName=PC"
@PJL AUXJOBINFO DATA="UserName=Oki Taro"
@PJL AUXJOBINFO DATA="UserID=12345678"
@PJL AUXJOBINFO DATA="Date=10:00:00 2010/02/02"
   ⋮
</PJL>
<PrinterName>PRINTER C</PrinterName>
```

```
<Command>DeletePrinter</Command>
<PrinterName>PRINTER C</PrinterName>
```

FIG.35

| | 371b | 371c | 371d | 371e | 371f | 371g | 371h | 371i | 371j |
|---|---|---|---|---|---|---|---|---|---|
| REFER-ENCE NUMBER | DOCUMENT NAME | TIME INFOR-MATION | DOCU-MENT CREATOR | AUTHEN-TICATION INFOR-MATION | NUMBER-OF-PAGES | ADDRESS | NAME | DESTI-NATION | PATH |
| 1 | DRAFT OF PATENT APPLICATION | 2011/2/2 12:00 | Oki Taro | 12345678 | 10 | 198.168.0.1 | PC1 20110202120000.prm | PRINTER A | /spool |
| 2 | SPECIFI-CATION | 2011/2/2 13:00 | Oki Taro | 12345678 | 2 | 198.168.0.1 | PC1 20110202130000.prm | PRINTER B | /spool |
| 3 | SPECIFI-CATION | 2011/2/2 13:10 | Oki Hanako | 98765432 | 1 | 198.168.0.2 | PC2 20110202131000.prm | PRINTER A | /spool |
| 4 | PROPOSAL | 2011/2/2 13:20 | Oki Hanako | 98765432 | 1 | 198.168.0.2 | PC2 20110202132000.prm | PRINTER B | /spool |
| 5 | SALES INFOR-MATION | 2011/2/2 14:00 | Oki Taro | 12345678 | 5 | 198.168.0.2 | PC2 20110202140000.prm | PRINTER C | /spool |
| ... | ... | ... | ... | ... | ... | ... | ... | ... | ... |

| 372a | 372b | 372c | 372d | 372e | 372f | 372g | |
|---|---|---|---|---|---|---|---|
| REFERENCE NUMBER | ADDRESS | PRINTER NAME | ACTIVE/ INACTIVE | PRINTER MODEL | MAXIMUM PAPER SIZE | REMAINING AMOUNT OF TONER | ... |
| 1 | 198.168.1.1 | PRINTER A | YES | ColorPrinter | A4 | C:100%, M:100%, Y:100%, K:100% | ... |
| 2 | 198.168.1.2 | PRINTER B | YES | ColorPrinter | A4 | C:80%, M:80%, Y:80%, K:80% | ... |
| 3 | 198.168.1.3 | PRINTER C | YES | ColorPrinter | A4 | C:50%, M:50%, Y:50%, K:50% | ... |
| ... | ... | ... | ... | ... | ... | ... | ... |

372

(CONTINUES ON FIG.46)

(CONTINUES ON FIG.47)

IMAGE FORMING APPARATUS, INFORMATION PROCESSING APPARATUS, IMAGE FORMING SYSTEM, AND METHOD FOR FORMING IMAGES

BACKGROUND OF THE INVENTION

1. Field of the Invention

The present invention relates to an image forming apparatus, an image processing apparatus, an image forming system, and a method for forming images.

2. Description of the Related Art

An existing system allows a user to select one of a plurality of printers that are connected to a network and hold print data therein, so that the print data held in one of the printers can be printed by using another printer. One such system is disclosed in Japanese patent publication No. 2010-118788. In this system, the server function of any one of the plurality of printers connected to the network is placed in an enabled state. A printer receives print data and sends information that identifies the print data to another printer whose server function is in the enabled state. Once authentication has been successfully performed in any one of the printers, a printer whose server function is in the enabled state allows a printer that has the print data to transfer the print data to the authenticated printer.

However, if a malfunction occurs in the printer whose server function has been placed in the enabled state, the information used for managing the print data held in the malfunctioning printer would be lost. Therefore, the user has to reproduce the print data for printing out the print data, though the malfunctioning printer still holds print data therein. This is very inconvenient to the user.

SUMMARY OF THE INVENTION

An object of the invention is to provide an apparatus in which when a malfunction occurs in a specific printer of a plurality of printers connected to a network, the information used for managing the print data held in the malfunctioning printer is not lost.

Image forming apparatuses are connected to a network. Each image forming apparatus communicate with remaining ones of the image forming apparatuses. An image forming section forms an image in accordance with the image information. A memory stores management information, the management information including an item of information about one of remaining ones of the plurality of image forming apparatuses. The one of remaining ones of the plurality of image forming apparatuses holds the image information therein. An information management section performs a synchronization processing in which the management information in the plurality of image forming apparatuses is updated to become identical. An image formation controlling section obtains the image information held in the one of remaining ones of the plurality of image forming apparatuses identified by the item of information, and drive the image forming section to form the image in accordance with the obtained image information.

A method for forming an image at one of a plurality of image forming apparatuses in accordance with an item of image information held in one of remaining ones of the plurality of image forming apparatuses connected to a network, the method includes:

storing management information that includes an item of information that identifies one of remaining ones of the plurality of image forming apparatuses, the one of remaining ones of the plurality of image forming apparatuses holding the item of image information therein;

obtaining the image information held in the one of remaining ones of the plurality of image forming apparatuses identified by the item of information; and forming the image in accordance with the obtained image information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 4 illustrates a printing management table that holds printing management information;

FIG. 5 illustrates the outline of a printer table;

FIG. 10 illustrates the outlines of search-response data;

FIG. 13A illustrates update data used when a new item of control data is added to a printing management table;

FIG. 13B illustrates the update data used when a new item of control data is deleted from the printing management table;

FIG. 14 is a flowchart illustrating the process performed in the printer when the printer has received the update data;

FIG. 18 is a sequence diagram illustrating the operation when the printers are turned on;

FIGS. 20A and 20B illustrate the printing management table before update and the printing management table after update;

FIG. 23 illustrates print data deletion notification data;

FIG. 24 illustrates the outline of print data deletion notification data;

FIG. 35 illustrates a printing management table according to the third embodiment;

FIG. 36 illustrates the outline of a printer table;

DETAILED DESCRIPTION OF THE INVENTION

First Embodiment

{Configuration}

Figure 1:
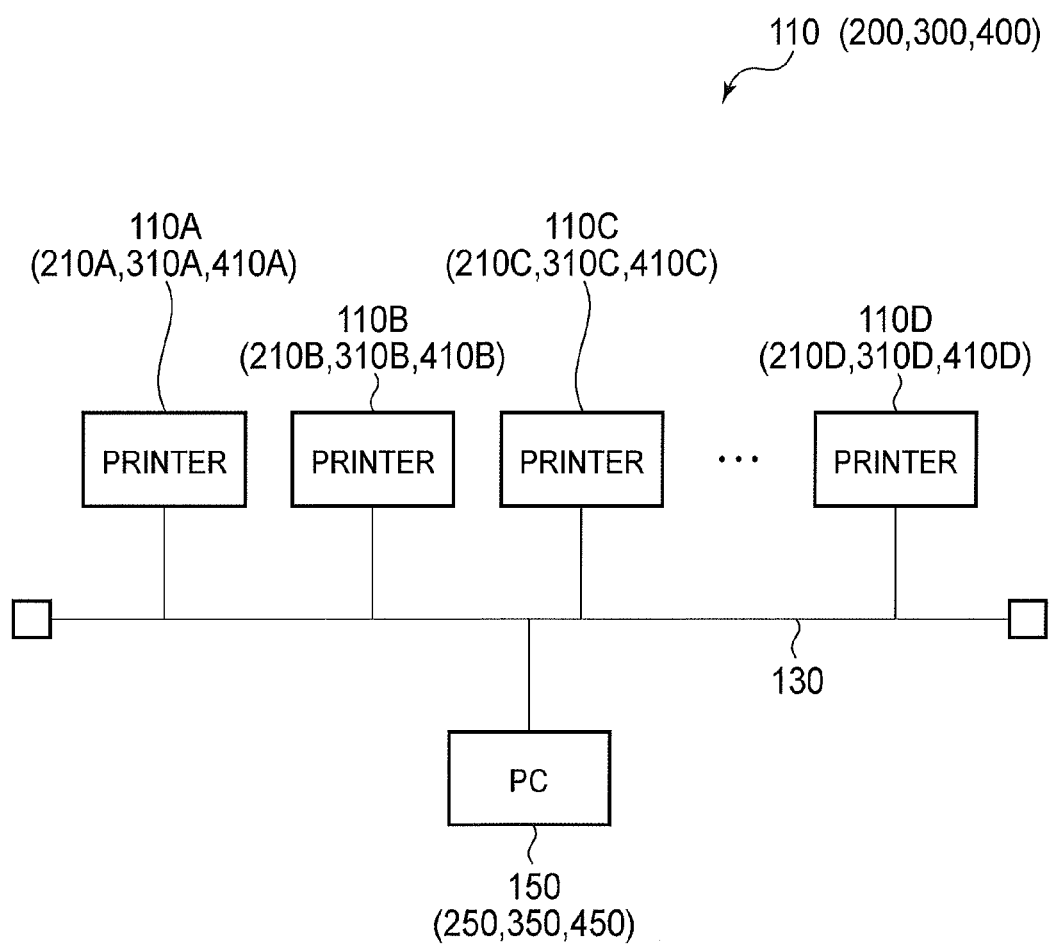
FIG. 1 illustrates an image forming system according to first to fourth embodiments.

FIG. 1 illustrates an image forming system 100. The image forming system 100 includes a plurality of printers 110A, 110B, 110C, and 110D connected to a network 130. A personal computer (PC) 150 is also connected to the network 130. The reference numerals in parentheses in FIG. 1 refer to corresponding elements in the second, third, and fourth embodiments.

Figure 2:
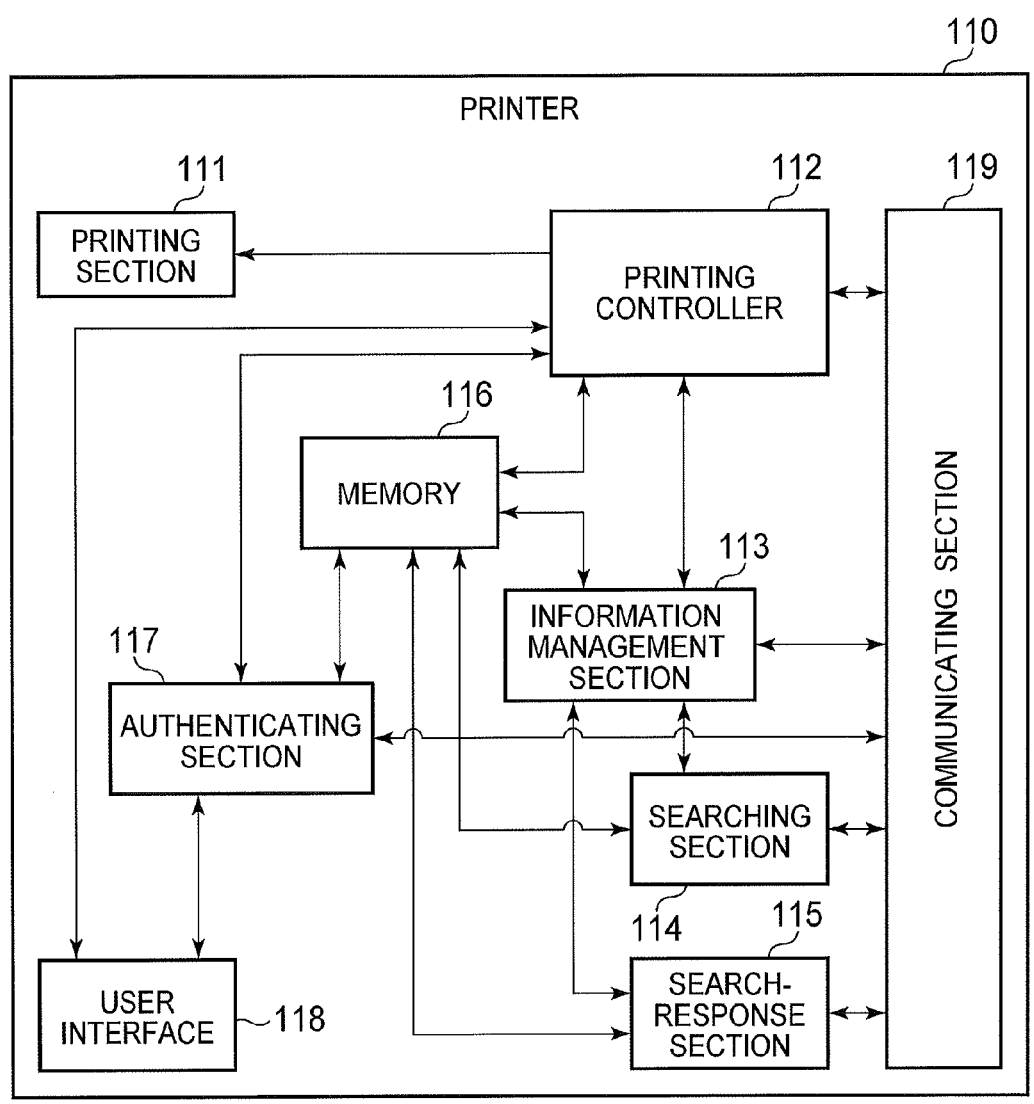
FIG. 2 is a block diagram illustrating the general configuration of printers.

FIG. 2 is a block diagram illustrating the general configuration of the printers 110A-110D. Each of the printers 110A-110D includes a printing section 111 as an image forming section, a printing controller 112 as an image formation controlling section, an information management section 113, a searching section 114, a search-response section 115, a memory 116, an authenticating section 117, a user interface (UI) 118, and a communicating section 119.

The printing section 111 receives the print data as image information from the PC 150, rasterizes the print image data included in the image information, and prints the rasterized printed data (i.e., image data). For example, if the printers 110A-110D take the form of an electrophotographic printer, the printing section 111 forms an electrostatic latent image on the photoconductive drum, deposits toner to the electrostatic latent image, and transfers the toner image onto the print medium.

Figure 3:
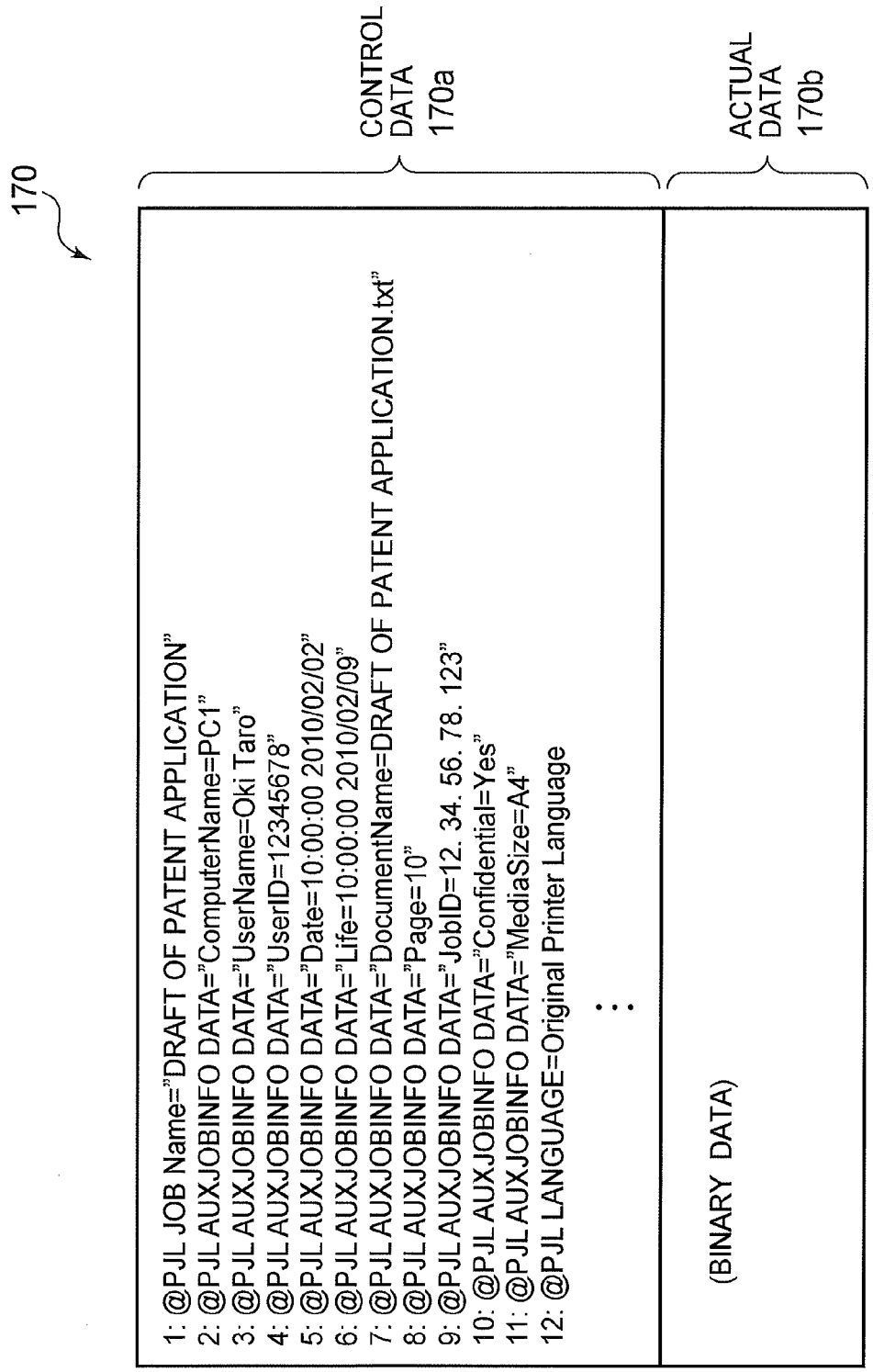
FIG. 3 illustrates the outline of print data according to the first embodiment.

A description will be given of the print data according to the first embodiment. FIG. 3 illustrates the outline of the print data 170. The print data 170 includes control data 170a and actual data 170b. The control data 170a is constituted of text data, and the actual data 170b is print image data in the form of binary data. The numeral followed by a colon on each line of the control data 170a is added for purposes of illustration, and is not part of the control data 170a. The control data 170a is written in printer job language (PJL), and is a plain text. Each line of the control data 170a has a variable name after "@PJL" and the content of the variable after "=". The variables "AUXJOBINFO DATA" in line 2 to line 11 are extended variables. Each extended variable includes a variable name and a content corresponding to the variable. The control data 170a shown in FIG. 3 includes the following information.

Line 1 describes "JOB Name" that identifies the print data 170.

Line 2 describes the extended variable of "ComputerName" that identifies the PC 150 by which the print data 170 was created.

Line 3 describes the extended variable of "UserName" that represents the name of a user of the PC 150 who created the print data 170.

Line 4 describes the extended variable of "UserID" that identifies the user of the PC 150 who created the print data 170.

Line 5 describes the extended variable of "Date" that indicates the year, date and time at which the print data 170 is created.

Line 6 describes the extended variable of "Life" that indicates the deadline of validity of the print data 170.

Line 7 describes the extended variable of "Document-Name" that identifies the file name of a file in the PC 150 under which the print data 170 is created.

Line 8 describes the extended variable of "Page" that indicates the total number of pages that are to be outputted during printing.

Line 9 describes the extended variable of "JobID" that indicates the job ID of a job in which the print data 170 is printed. The value of "JobID" is a combination of information unique to the PC 150 and a serial number created in the PC 150. Therefore, no identical number is assigned to more than one item of print data 170.

Line 10 describes the extended variable of "Confidential" that indicates whether authentication is required prior to the printing of the print data 170, i.e., whether the print data 170 is data for a secure printing, i.e., secure print job. If the value of "Confidential" is "Yes," authentication is required. If the value of "Confidential" is "No," authentication is not required.

Line 11 describes the extended variable of "MediaSize" that identifies the size of a print medium specified by the print data 170.

Line 12 describes the extended variable of "LANGUAGE" that identifies the language that describes the actual data 170$b$ included in the print data 170. The control data 170$a$ is text data and the actual data 170$b$ is binary data. However, they are not limited to these formats of data. For example, the control data 170$a$ may be binary data and the actual data 170$b$ may be text data.

Referring back to FIG. 2, the printing controlling section 112 manages the print data 170. The printing controlling section 112 drives the printing section 111 to perform printing. For example, the printing controlling section 112 obtains the print data 170 from the PC 150 through the communicating section 119. The printing controlling section 112 then checks the control data 170$a$ of the obtained print data 170 to determine whether the print data 170 should be printed immediately. If the printing controlling section 112 determines that the print data 170 should be printed immediately, the printing controlling section 112 sends the print data 170 to the printing section 111 for printing. If the printing controlling section 112 determines that the print data 170 should not be printed immediately, the printing controlling section 112 stores the print data 170 into the memory 116. When the print data 170 is stored into the memory 116, the printing controlling section 112 adds a name to each item of print data 170, so that items of print data 170 can be distinguished from each other. The name is different for each item of print data so that no duplicate names are used in a printer 110. For example, this name is assigned as a file name. When the print data 170 is stored into the memory 116, the printing controlling section 112 extracts the control data 170$a$ from the print data 170, and then sends the extracted control data 170$a$ to the information managing section 113.

The information managing section 113 manages the printing management information held in the memory 116. The printing management information is used for managing items of print data 170 held in the memory 116, and includes identification information for identifying each item of print data 170 and destination information for identifying the destination to which the item of print data identified by the identification information should be destined.

FIG. 4 illustrates a printing management table 171 that holds the printing management information. The printing management table 171 includes a control data field 171$a$, a destination field 171$b$, and a name-of-print-data field 171$c$. The control data field 171$a$ holds the control data 170$a$ extracted from the print data 170. The destination field 171$b$ holds identification information that identifies the printers 110 that store the print data 170 therein. The identification information of the printers 110 may be, for example, Internet Protocol (IP) address, media access control (MAC) or the like as long as the printers 110 can be uniquely identified on the network 130. The name-of-print-data field 171$c$ holds the names of items of print data from which the control data 170$a$ is extracted, and which are held in the control data field 171$a$. This name is assigned by the printing controlling section 112. The information held in the control data field 1711$a$ and the name-of-print-data field 171$c$ is the identification information and the information held in the destination field 171$b$ is the destination information. For example, once the information managing section 113 receives the control data 170$a$ from the printing controlling section 112, the information managing section 113 adds a new record to the printing management table 171 and stores the received control data 170$a$, the printer name of the printer, and the name of the stored print data 170 into the record.

Referring back to FIG. 2, when updating the printing management table 171, the information managing section 113 performs a synchronization processing so that the printing management tables 171 of all other printers 110 connected to the network 130 can have the same updated printing management information. Upon receiving the printing management information from the searching section 114, the information managing section 113 updates the printing management table 171 so that the printing management table 171 holds the received printing management information.

The searching section 114 searches other printers 110 connected to the network 130. For example, the searching section 114 performs the process for broadcasting the search data to the other printers 110 via the communicating section 119. The search result is that either the communicating section 119 receives search-response data in response to the search data or the communicating section 119 does not receive the search-response data responding to the search data. If the search-response data received in the communicating section 119 includes the content of the printing management table 171, then the searching section 114 sends the printing management information included in the search-response data to the information managing section 113. Also, the searching section 114 obtains identification information indicative of the source printer 110 from the received search-response data, and then stores the identification information into a printer list as an apparatus list held in the memory 116.

FIG. 5 illustrates the outline of a printer table 172 as the printer list. The printer table 172 has a printer name field 172$a$ and an IP address field 172$b$. The printer name field 172$a$ holds printer names of source printers 110 that sent out the received search-response data in reply to the search data. The IP address field 172$b$ holds IP addresses, which are the communication addresses of the source printers that transmit the search-response data in reply to the search data. Once the searching section 114 has received the search-response data in reply to the search data via the communicating section 119, the searching section 114 extracts the printer name from the search-response data and further extracts the IP address of the source printer from the IP packet that holds the received search-response data. The searching section 114 then stores the IP address into the printer table 172.

Referring back to FIG. 2, if the communicating section 119 receives the search data from the printers 110 and PC 150 connected to the network 130, the search-response section 115 generates the search-response data to respond to the search data. The search-response section 115 performs processing for transmitting the generated search-response data to the source device of the search data via the communicating section 119. In the present embodiment, the search-response section 115 adds the content of the printing management information held in the memory 116 to the generated search-response data. If the communicating section 119 receives the search data, the search-response section 115 extracts the printer name of the source printer 110 that transmitted the search data, and extracts the IP address of the source printer 110 from the IP packet having the search data therein, and stores the IP address into the printer table 172.

The memory 116 stores information necessary for the processes in the printer 110. For example, the memory 116 stores the print data 170, the printing management table 171, and printer table 172 therein.

The authenticating section 117 performs authentication of the user of the printer 110. For example, the authenticating section 117 obtains the ID information of the user via the user interface 118, and performs authentication based on the ID information. If the authentication is successful, the authenticating section 117 gives the ID information of the authenticated user to the printing controller 112. This ID information is uniquely assigned to the user and functions as a user identifying information. If the user who logs on is an authorized user, the value of the ID information is equal to the value of the extended variable "UserID" included in the control data 170a (FIG. 3). The value of the UserID in the control data 170a is obtained, for example, by performing log-in authentication based on the IC card that the user is possessing when the user logs in the PC 150.

The user interface 118 functions as an interface between the printer 110 and the user. The interface 118 is implemented with a touch screen or a combination of a display and a key device. The user interface 118 includes an output section that provides information to the user, and an input section through which the user inputs information. The user interface 118 may have a reading device that reads information necessary for the authenticating section 117 to perform an authentication process. Such a reading device includes a scanning device that obtains biometric information about the user and an IC card reader that reads ID information from the IC card of the user. The communicating section 119 performs communication between the network 130 and the printer 110.

The printing controlling section 112, the information management section 113, the searching section 114, the search-response section 115, and the authenticating section 117 are implemented in software. A CPU reads the programs from a hard disk drive (HDD) or a read only memory (ROM) (not shown) and executes the programs. Alternatively, these sections 112-115 and 117 may be implemented in hardware in the form of an integrated logic IC such as an application specific integrated circuit (ASIC) or a field programmable gate array (FPGA). The memory 116 may be implemented with a memory device such as a volatile memory or a non-volatile memory (e.g., a flash memory or an HDD). The communicating section 119 may be implemented with a network interface card (NIC).

Figure 6:
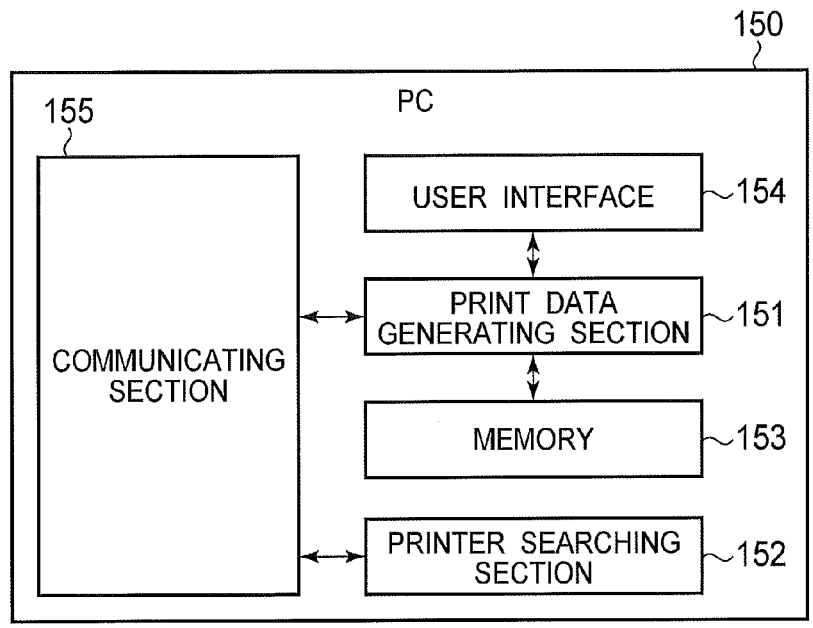
FIG. 6 is a block diagram illustrating the general configuration of a personal computer.

FIG. 6 is a block diagram illustrating the general configuration of the PC 150. The PC 150 includes a print data generating section 151, a printer searching section 152, a memory 153, a user interface 154, and a communicating section 155.

The print data generating section 151 generates the print data 170 using, for example, an application program. The print data 170 includes the control data 170a as shown in FIG. 3. The control data 170a is either commanded or selected by the user or determined independently of the user. The print data generating section 151 performs processing for transmitting the generated print data 170 via the communicating section 155 to the printer 110 searched by the printer searching section 152.

The printer searching section 152 functions as a network searching section that searches the printers 110 connected to the network 130. For example, the printer searching section 152 performs the process for broadcasting the search data via the communicating section 155, thereby determining whether the communicating section 155 receives the search-response data responding to the search data.

If a plurality of printers 110 are detected, the printer searching section 152 selects one of the detected printers 110 to which the print data 170 should be transmitted. The printer searching section 152 sends the printer name and IP address of the selected printer 110 to the print data generating section 151.

The memory 153 stores information necessary for the processes performed in the PC 150. For example, in the present embodiment, the memory 153 stores information that identifies a printer 110 detected by the printer searching section 152 and information that identifies a printer with which the detected printer 110 communicates. Such information includes the printer name and IP address of the detected printers 110. The user interface 154 serves as an interface between the PC 150 and the user. The user interface 154 is implemented with a touch screen or a combination of a display and a key device. The user interface 118 includes an output section that provides information to the user, and an input section through which the user inputs information. The communicating section 155 performs communication between the network 130 and the PC 150.

The print data generating section 151 and the printer searching section 152 are implemented in programs which a CPU reads from a memory such as an HDD or a ROM (not shown). The memory 153 can be implemented with a volatile memory or a non-volatile memory (HDD or flash memory, not shown). The communicating section 155 can be implemented with an NIC.

{Operation}

The operation of the image forming system 100 according to the first embodiment will be described.

Figure 7:
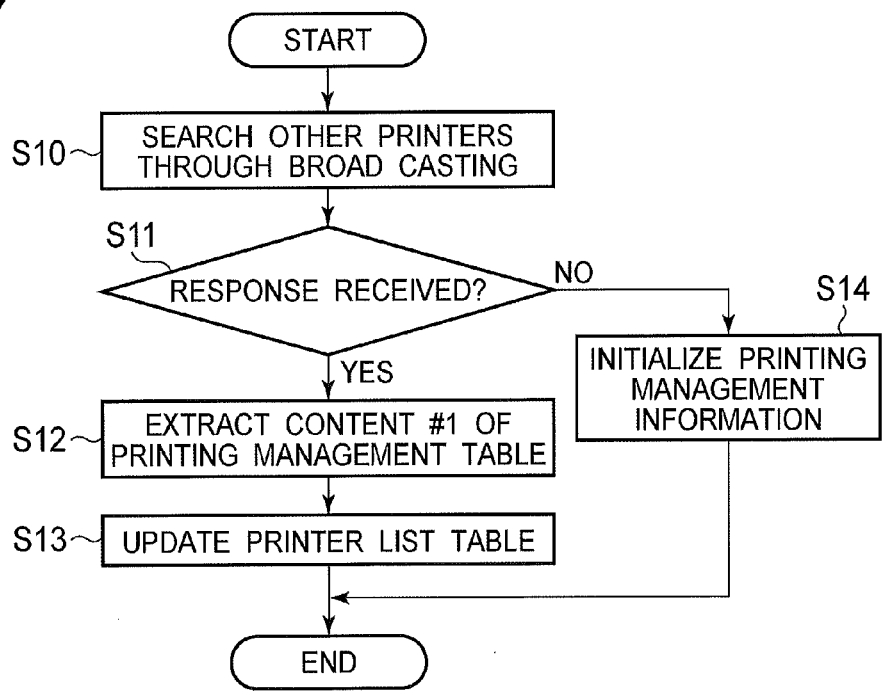
FIG. 7 is a flowchart illustrating the process for a printer to search the other printers.

FIG. 7 is a flowchart illustrating the process for a printer 110 to search the other printers 110. This flow starts, for example, as soon as connection of the printer 110 to the network 130 has been established after power up.

The searching section 114 of a printer 110 searches the other printers 110 connected to the network 130 (S10). For example, the searching section 114 generates the search data and broadcasts the search data to the other printers 110 connected to the network 130, and then waits for responses for a predetermined period of time.

Figures 8, 9:
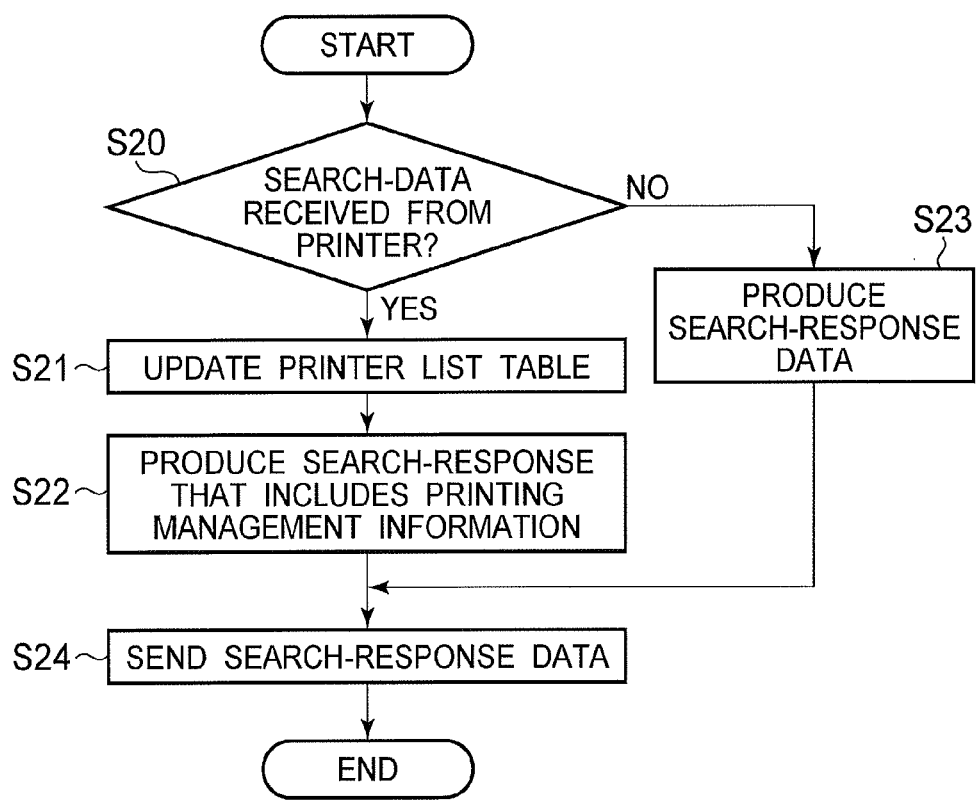
FIG. 8 illustrates the outline of search data.
FIG. 9 is a flowchart illustrating the process for a search-response section of the printer to respond to the search data received from the other printers or a PC.

FIG. 8 illustrates the outline of search data 173. The search data 173 includes at least identification information about the printer 110 that performs searching. The search data 173 is data in the form of a structured document which is constituted of elements such as Type, Color/Mono, MediaSize, Name, and Capacity. The Type represents the model of the printer 110 that performs searching. The Color/Mono and MediaSize represent the cap ability of the printer 110 to be searched. The Color/Mono indicates whether the printer 110 to be searched supports color printing or monochrome printing. The Media- Size indicates the size of a print medium supported by the printer 110 to be searched. The Name indicates the printer name of the printer 110 to be searched. The Capacity indicates the available remaining capacity of the overall capacity of the printer 110 to be searched. The searched data 173 may include the IP address of the source printer 110.

Referring back to FIG. 7, the searching section 114 makes a decision to determine whether a response has been received from the other printers 110 (S11). For example, the searching section 114 checks whether the communicating section 119 has received the search-response data. If the communicating section 119 has received the search-response data (S11, YES), the program proceeds to step S12. If the communicating section 119 has not received the search-response data (S11, NO), the program proceeds to step S14.

At S12, the searching section 114 receives the search-response data via the communicating section 119, and extracts a content #1 of the printing management table 171 from the received search-response data, and then gives the extracted content #1 to the information management section 113. The information management section 113 then updates a content #2 of the printing management table 171 held in the memory 116 so that the content #2 becomes the same as the content #1 of the printing management table 171. For example, the information management section 113 replaces the content #2 of the printing management table 171 with the received content #1 of the printing management table 171. It is to be noted that if the searching section 114 receives a plurality of items of search-response data via the communicating section 119, the printing management table 171 may be updated with the content of the printing management table 171 included in any one of the plurality of items of search-response data.

The searching section 114 obtains the printer name of the source printer from the search-response data received via the communicating section 119. Likewise, the searching section 114 obtains the IP address of the source printer that transmitted the IP packet that includes the search-response data. The searching section 114 then stores these items of information into the printer table 172 held in the memory 116 (S13).

At S14, the searching section 114 notifies the information managing section 113 of the search results indicating that other printer 110 was not detected. In response to this notification, the information managing section 113 initializes the printing management table 171 held in the memory 116. For example, the searching section 114 deletes all items of information held in the printing management table 171.

Through the process shown in FIG. 7, the printer 110 obtains the content of the printing management table 171 held in the other printer 110, and then updates the printing management table with the received content. Also, the printer 110 can obtain the identification information about other printers connected to the network 130.

FIG. 9 is a flowchart illustrating the process for the search-response section 115 of the printer 110 to respond to the search data received from the other printer 110 or PC 150.

The flow starts upon reception of the search data, via the communicating section 119, transmitted from the other printer 110 or PC 150.

The search-response section 115 makes a decision to determine whether the search data received via the communicating section 119 was transmitted from one of the printers 110 (S20).

For example, as shown in FIG. 8, the search data 173 transmitted from a printer 110 includes elements "Color/Mono," "MediaSize," and "Capacity." Thus, the search-response section 115 can make a decision to determine whether the search data was transmitted from one of the printers 110, by checking if these elements are present in the search data. Alternatively, the search-response section 115 may check the content of the element "Name" to determine whether the search data was transmitted from a printer 110. If the search data was transmitted from a printer 110 (S20, YES), the program proceeds to S21. If the search data was not transmitted from a printer 110 (S20, NO), the program proceeds to S23.

At S21, the search-response section 115 obtains the printer name of the source printer 110 from the search data 173 received via the communicating section 119. Also, the search-response section 115 obtains the IP address of the source device that transmitted the IP packet containing the search data 173.

The search-response section 115 produces the search-response data responding to the search data 173 (S22). The search-response section 115 adds the content of the printing management table 171 held in the memory 116 to the search-response data.

FIG. 10 illustrates the outline of the search-response data 174. The search-response data 174 includes at least the identification information about the printer 110 that responds to the search data, and the content of the printing management table 171 of the printer that responds to the search data. The search-response data 174 shown in FIG. 10 is the data for a structure document that includes "Type," "Color/Mono," "MediaSize," "Name," "Capacity," and "Table." "Type" indicates model information indicative of the printer 110 that responds to the search data. "Color/Mono" and "MediaSize" indicate the cap ability of the printer 110 that responds to the search data. "Color/Mono" indicates the capability of the printer that responds to the search data, e.g., whether the printer 110 supports color printing or monochrome printing. "MediaSize" indicates the size of the print medium used in the printer 110 that responds to the search data. "Name" indicates the printer name of the printer 110 that responds to the search data. "Capacity" indicates the available remaining capacity of the memory in the printer 110 that responds to the search data. "Table" holds the content of the printing management table 171 held in the memory 116 of the printer that responds to the search data. For example, "Table" includes elements "PJL," "PrinterName," and "FileName." For example, for each record in the printing management table 171 shown in FIG. 4, the element "PJL" holds the information of the control data field 171a, the element "PrinterName" holds the information of the destination field 171b, and the element "FileName" holds the information of the name-of-print-data field 171c. The search-response data 174 may include the IP address of the printer 110 that responds to the search data.

Referring back to FIG. 9, if the search-response section 115 determines that the search data was not transmitted from one of the printers 110 (S20, NO), the search-response section 115 produces the search-response data that should be sent to an apparatus (e.g., PC 150) other than the printers (S23). The search-response data produced at S23 includes at least the identification information indicative of a printer that responds to the search data and does not include the content of the printing management table 171 of the printer that responds to the search data. For example, the search-response data produced at S23 may be constituted of elements in the search-response data shown in FIG. 10 except "Table."

At S24, the search-response section 115 performs the process for transmitting the search-response data, which has been produced at S22 or S23, to the source device of the printer that sent the search data, via the communicating section 119.

As described above, the process shown in FIG. 9 allows the printer 110, which sent out the search data, to obtain the search-response data identical to that held in the printing management table 171 of the printer that responds to the search data.

Figure 11:
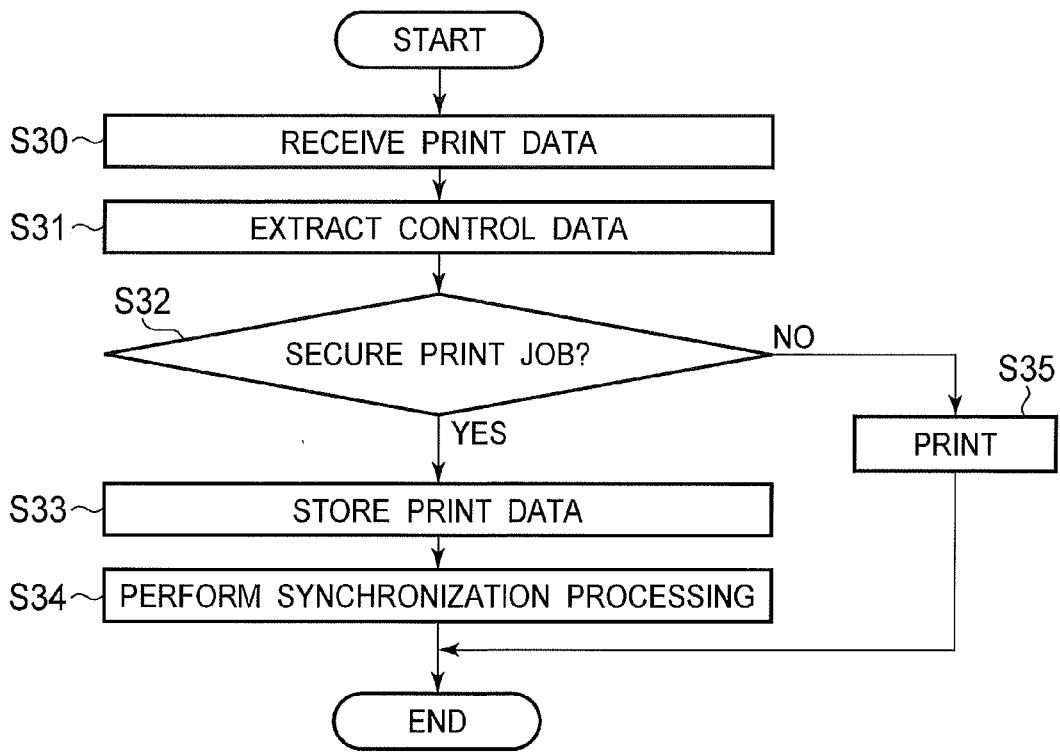
FIG. 11 is a flowchart illustrating the process for one of the printers to receive the print data.

FIG. 11 is a flowchart illustrating the process for one of the printers 110 to receive the print data 170. The flow starts when the printing controller 112 of the printer 110 receives the print data 170 through the communicating section 119.

The printing controller 112 receives the print data 170, which was received over the network 130, via the communicating section 119 (S30). The printing controller 112 then extracts the control data 170a from the received print data 170 (S31).

The printing controller 112 checks the control data 170a extracted at S31 to determine whether the received print data 170 is data for a secure print job that requires authentication (S32). For example, the printing controller 112 checks the value of "Confidential" which is an extended variable of the control data 170a. If the value is YES, the printing controller 112 determines that the received print data 170 is a secure print job, and then the program proceeds to S33. If the value is NO, the printing controller 112 determines that the received print data 170 is not a secure print job, and then the program proceeds to S35.

At S33, the printing controller 112 assigns a name to the print data 170 which is unique in the printer 110, and stores the print data 170 into the memory 116. The printing controller 112 gives the control data 170a extracted at S31 to the information managing section 113 and an update command to the information managing section 113, commanding the information managing section 113 to update the printing management information. Upon reception of the control data 170a and a command to update the printing management information, the information managing section 113 performs the synchronization processing for the printing management table 171 (S34). The synchronization processing at S34 will be described in detail with reference to FIG. 12.

At S32, if the printing controller 112 determines that the print data 170 obtained at S30 is not a secure print job (S32, NO), the program proceeds to S35 where the printing controller 112 sends the print data 170 to the printing section 111 which in turn prints the print data 170.

As described above, the printing controller 112 checks the control data 170a of the received print data 170 to determine whether the print job should be printed immediately or the print job requires authentication before printing. If the print job is a secure print job, the printing controller 112 stores the print data 170 into the memory 116 and the control data 170a into the information management section 113. The information management section 113 then performs the synchronization processing for the printing management table 171 so that the printing management table 171 of all other printers 110 connected to the network 130 can have the common, identical updated printing management information.

Figure 12:
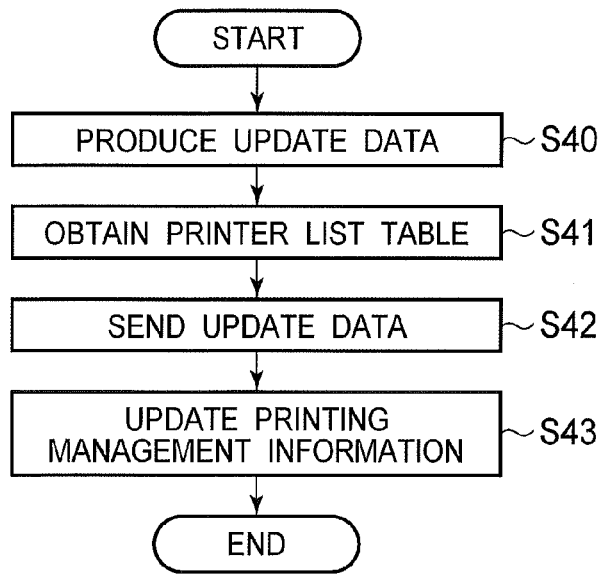
FIG. 12 is a flowchart illustrating a synchronization processing of the printing management information.

FIG. 12 is a flowchart illustrating the synchronization processing of the printing management information. The information management section 113 starts the process upon reception of an update command from the printing controller 112.

The information management section 113 produces the update data in accordance with the content of the update command (S40). The update data is used to describe the content to be updated when performing the synchronization processing of the printing management table 171, so that the printing management table 171 of all other printers 110 connected to the network 130 can have the identical updated printing management information.

FIGS. 13A and 13B illustrate update data 175A and 175B, respectively. The update data (e.g., 175) with the numerals alone refers to the same thing as the numerals with letters (e.g., 175A or 175B) if the term update data is intended to cover either the update data 175A, update data 175B, or both 175A and 175B. FIG. 13A illustrates the update data 175A used when a new item of control data 170a is added to the printing management table 171. As shown in FIG. 13A, the update data 175A includes elements "Command," "PJL," "PrinterName," and "FileName." The "Command" indicates "ADD" that is a command to add a new item of control data 170a to the printing management table 171. The "PJL" is information that is to be stored into the control data field 171a of the printing management table. The "PrinterName" indicates information that is to be stored into the destination field 171b of the printing management table 171. The "FileName" indicates information that is to be stored into the name-of-print-data field 171c of the printing management table 171.

FIG. 13B illustrates the update data 175B used when a new item of control data 170a is deleted from the printing management table 171. As shown in FIG. 13B, the update data 175B includes elements "Command," "PrinterName," and "FileName." The "Command" indicates "DELETE" that is a command to delete an item of control data 170a from the printing management table 171. The "PrinterName" indicates information in the destination field 171b of the printing management table 171, the destination field 171b being in a record to be deleted. The "FileName" indicates information in the name-of-print-data field 17 ic of the printing management table 171, the name-of-print-data field 171c being present in a record to be deleted.

If the content of the update command received from the printing controller 112 is "ADD", the information management section 113 produces the update data 175A as shown in FIG. 13A. If the content of the update command received from the printing controller 112 is "DELETE", the information management section 113 produces the update data 175B as shown in FIG. 13B.

Referring back to FIG. 12, once the information management section 113 has produced the update data 175 at S40, the information management section 113 obtains the printer table 172 from the memory 116 (S41). The information management section 113 then transmits the update data 175 produced at S40 via the communicating section 119 to the printer 110 that is specified by the information held in the printer table 172 (S42).

The information management section 113 updates the printing management table 171 stored in the memory 116 in accordance with the content of the update command received from the printing controller 112 (S43). For example, if the content of the update command received from the printing controller 112 is "ADD", the information management section 113 adds a new record to the printing management table 171. If the content of the update command received from the printing controller 112 is "DELETE", the information management section 113 deletes a corresponding record from the printing management table 171.

As described above, when updating the printing management table 171, the information management section 113 sends the update data 175 that describes the content of the update to the other printers 110, so that the printing management tables 171 of all other printers 110 connected to the network 130 can have the common, identical updated printing management information. The update data 175 represents the content of an update, but is not limited to this. For example, the update data may represent the content of the printing management table 171 after updating.

FIG. 14 is a flowchart illustrating the process performed in the printer 110 when the printer 110 has received the update data 175. The flow starts when communicating section 119 receives the update data 175.

The information management section 113 receives the update data 175 from the communicating section 119 (S50). The information management section 113 then updates the printing management table 171 in accordance with the content of the update described by the received update data 175 (S51). For example, if the "Command" of the update data 175 indicates "ADD," then the information management section 113 adds a new record to the printing management table 171, thereby storing the information for elements "PJL," "PrinterName," and "FileName" into the control data field 171*a*, destination field 171*b*, and name-of-print-data field 171*c*, respectively. If the "Command" of the update data 175 indicates "DELETE," then the information management section 113 identifies a record in which destination field 171*b* and name-of-print-data field 171*c* of the printing management table 171 hold the information for the elements, "PrinterName" and "FileName."

As described above, once the printing management table 171 of any one of the printers 110 is updated, the printing management tables 171 of the other printers 110 are updated likewise. If a printer receives the content of the printing management table 171 as the update data, the information management section 113 of that printer replaces the content of the printing management tables 171 held in the memory 116 with the received content. Further, after the printer 110 updates its printing management tables 171 as shown in FIG. 14, the printer 110 sends the content of the updated printing management tables 171 to the source printer 110 that sent the update data 175, allowing the information management section 113 of the source printer 110 that sent the update data 175 to confirm that both printers 110 have the identical update data. For example, the information management section 113 of the source printer 110 may calculate the content of the updated printing management tables 171 using a one-way function such as a hash function, and then send the calculated value to the printer 110 as the source device that sent the update data 175. On the source printer 110 that sent the update data 175 side, the information management section 113 calculates the value using the one-way function based on the content of the printing management tables 171 and compares the calculated value with the received value, thereby confirming that both printers 110 have the identical update data.

Figure 15:
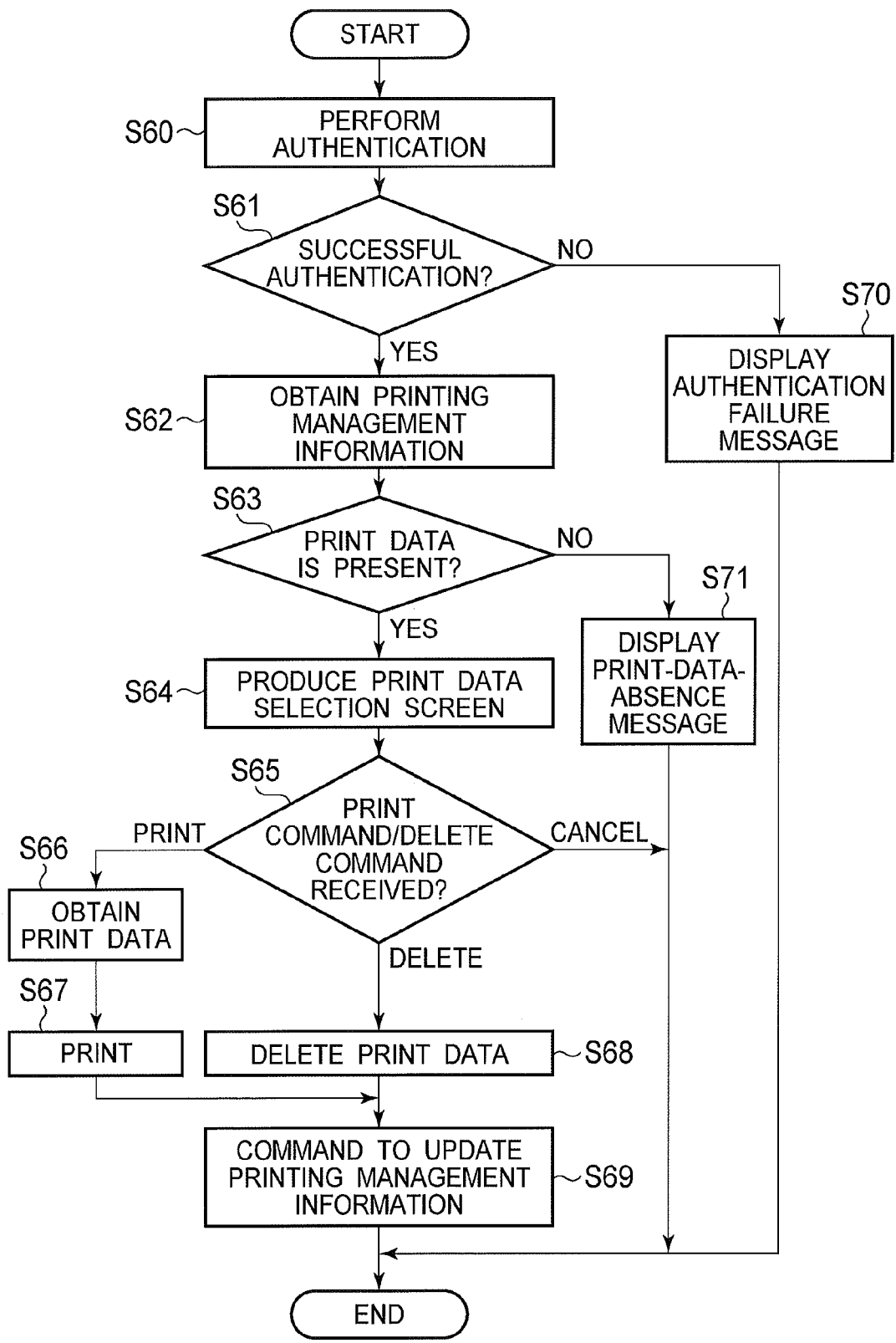
FIG. 15 is a flowchart illustrating the process performed by the printer for printing a secure print job.

FIG. 15 is a flowchart illustrating the process performed by the printer 110 for printing a secure print job. The flow starts when the printer 110 receives a print command from the user via the user interface 118.

The authenticating section 117 of the printer 110 authenticates the user (S60). For example, the authenticating section 117 performs authentication by checking if the ID information which is the authentication information of a user can be obtained from an IC card via the user interface 118. Alternatively, the authenticating section 117 obtains the ID information of the user from the IC card via the user interface 118, and then compares the ID information with reference information preregistered in, for example, a user ID table stored in the memory 116. Still alternatively, the authenticating section 117 obtains the password and the ID information of the user from the IC card via the user interface 118, and an external authentication server (not shown) such as a light weight directory access protocol (LDAP) server performs authentication based on these items of information. The printing controller 112 obtains the ID information of the user through the authentication performed at S60.

The authenticating section 117 then makes a decision to determine whether the user was successfully authenticated (S61). If the authentication is successful (S61, YES), then the program proceeds to S62; if the authentication is not successful (S61, NO), the program proceeds to S70.

At S62, the printing controller 112 obtains the printing management table 171 held in the memory 116.

The printing controller 112 makes a decision to determine whether the printing management table 171 obtained at S62 holds the print data 170 corresponding to the user ID information obtained at S60 (S63). For example, the printing controller 112 checks the control data 170*a* held in the control data field 171*a* of the printing management table 171 to determine whether the value of the extended variable of "UserID" is equal to that of the user ID information obtained at S60. If the printing controller 112 determines that a corresponding print data 170 exists (S63, YES), the program proceeds to S64; if the printing controller 112 determines that a corresponding print data 170 is not available (S63, NO), the program proceeds to S71.

At S64, based on the printing management table 171 obtained at S62, the printing controller 112 produces a print data selection screen 176 (FIG. 16) for a user to select an item of print data 170 that should be printed. The printing controller 112 sends the print data selection screen to the user interface 118 which in turn displays the print data selection screen. The print data selection screen displays the items of information that identify all items of print data 170 that were sent by the user authenticated at S60 and have not been printed yet. The information that identifies the print data 170 preferably includes the value in at least one value included in, for example, the control data 170*a*.

Figure 16:
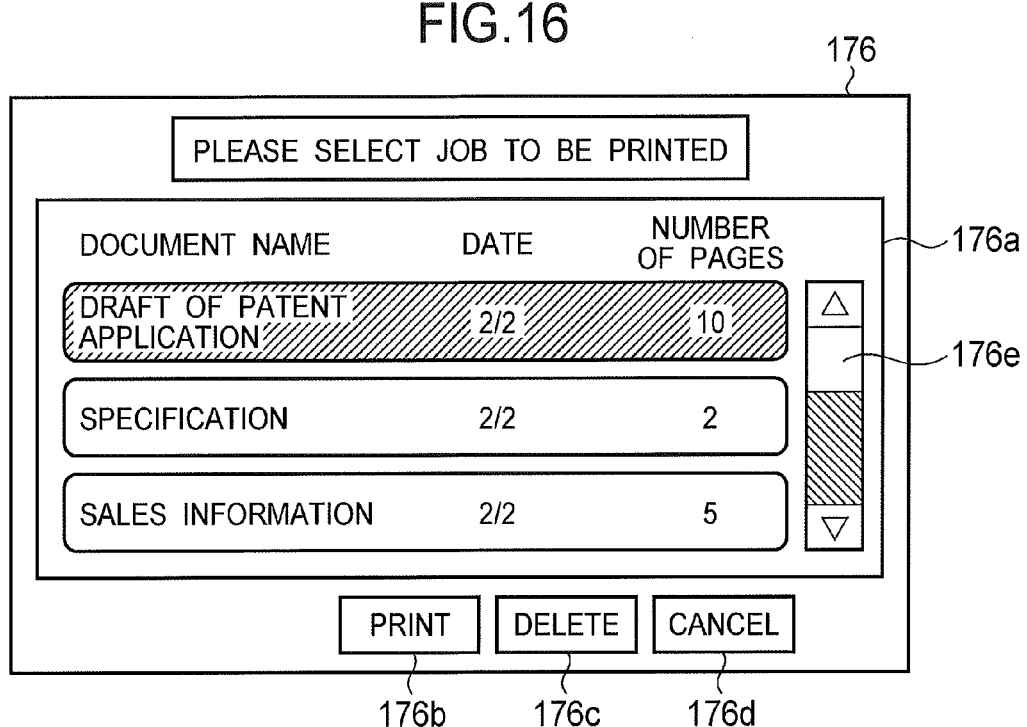
FIG. 16 illustrates the outline of an example of a print data selection screen.

FIG. 16 illustrates the outline of an example of the print data selection screen 176. The print data selection screen 176 includes a print data selection area 176*a*, a print command area 176*b*, a deletion command area 176*c*, and a cancellation command area 176*d*. The print data selection area 176*a* receives selection of the print data 170. For example, the print data selection area 176*a* includes "DocumentName", apart of "Date", and the value of "Page," which are all extended variables of the control data 170*a* included in the printing management table 171 obtained at S62. The print data 170 is identified based on these values. The excess items of print data 170 that cannot be displayed in the print data selection area 176*a* may be moved into the screen by moving the scroll bar 176*e* downward. When the user selects an item of print data 170 from the print data selection area 176*a* and a command to print the item of print data, the user interface 118 sends the information selected from the print data selection area 176*a* and the print command to the printing controller 112. When the user selects the print data 170 through the print data selection area 176*a* but inputs a command through the deletion command area 176*c*, the user interface 118 sends the information selected from the print data selection area 176*a* and the delete command to the printing controller 112. If the user inputs a command through the cancel command area 176*d*, the user interface 118 sends a cancel command to the printing controller 112.

Referring back to FIG. 15, the printing controller 112 checks the command received from the user interface 118 (S65). If the printing controller 112 receives a print command via the user interface 118, the program proceeds to S66. If the printing controller 112 receives a delete command, the program proceeds to S68. If the printing controller 112 receives a cancel command, the program ends. If the printing controller 112 does not receive any command within a predetermined time frame, it may be determined that printing controller 112 received the cancel command, and the program end.

At S66, the printing controller 112 performs the process for obtaining the print data 170 to be printed. For example, the printing controller 112 identifies a record in the printing management table 171 having the control data 170a held in the control data field 171a of the print data 170 selected through the print data selection area 176a of the print data selection screen 176. The printing controller 112 checks the information in the destination field 171b of the identified record. If the information in the destination field 171b represents the printer in which the printing controller 112 resides, the printing controller 112 obtains the print data 170, which corresponds to the name held in the name-of-print-data field 171c of the identified record, from the memory 116, in which case the printing controller 112 deletes the obtained print data 170 from the memory 116. If the checked information in the destination field 171b indicates one of the other printers 110, the printing controller 112 produces a print data transfer requesting message that include the name held in the name-of-print-data field 171c of the identified record. The printing controller 112 sends the thus produced transfer requesting data to the printer 110 identified by the information in the destination field 171b. It is to be noted that the communication address of the source printer 110 is obtained from the printer table 172 stored in the memory 116. The printing controller 112 obtains the print data 170 to be printed in response to the transfer requesting data via the communicating section 119.

The printing controller 112 sends the print data 170 obtained at S66 to the printing section 111 which in turn prints the print data 170 (S67).

If the command received at S65 from the user interface 118 is the delete command, the printing controller 112 proceeds to S68 where the printing controller 112 deletes the print data 170 specified by the command received through the user interface 118. Specifically, the printing controller 112 identifies a record in which the control data field 171a of the printing management table 171 holds the control data 171a of the print data 170. This control data 171a is the control data of the commanded print data 170 selected from the print data selection area 176a of the print data selection screen 176 shown in FIG. 16. The printing controller 112 then checks the information in the destination field 171b of the identified record. If the information indicates the printer 110 that received the delete command, then the printing controller 112 deletes the print data 170 corresponding to the name held in the name-of-print-data field 171c of the identified record. If the checked information indicates other printer 110, then the printing controller 112 produces deletion requesting data that includes the name held in the name-of-print-data field 171c of the identified record. The printing controller 112 sends the deletion requesting data to the printer 110, identified by the information held in the destination field 171b, via the communicating section 119. The communication addresses of the source printer to which the deletion requesting data is to be sent is obtained from the printer table 172 held in the memory 116.

The printing controller 112 sends the update command to the information management section 113, commanding update of the printing management information (S69). This update command is to command deletion of the print data 170.

If the user is not successfully authenticated at S61 (NO at S61), the program proceeds to S70 where the authenticating section 117 produces an authentication failure screen that includes a message indicative of failure of authentication. The authenticating section 117 sends the authentication failure screen to the user interface 118 which in turn displays the authentication failure screen. Then, the program shown in FIG. 15 ends.

At S63, if it is determined that the printing management table 171 holds the print data 170 (S63, NO), the printing controller 112 produces an absence-of-print data screen that includes a message indicative of absence of print data. The printing controller 112 sends the absence-of-print data screen to the user interface 118 which in turn displays the absence-of-print data screen to the user. Then, the program shown in FIG. 15 ends.

As described above, the print data 170 held in any one of the printers 110 connected to the network 130 may be transferred to another printer connected to the network 130. This configuration allows the print data 170 to be printed in a printer 110 that receives the print data 170.

According to the flowchart shown in FIG. 15, the flow ends after the printing management information is commanded to be updated (S69). However, the invention is not limited to this. For example, the flow may return to S62 after S69. In addition, the print data selection screen 176 may have an additional command area for selecting "print and then continue to process." If such a command is inputted, the printing controller 112 will return, after S67, to S64 where the flow will continue.

Figure 17:
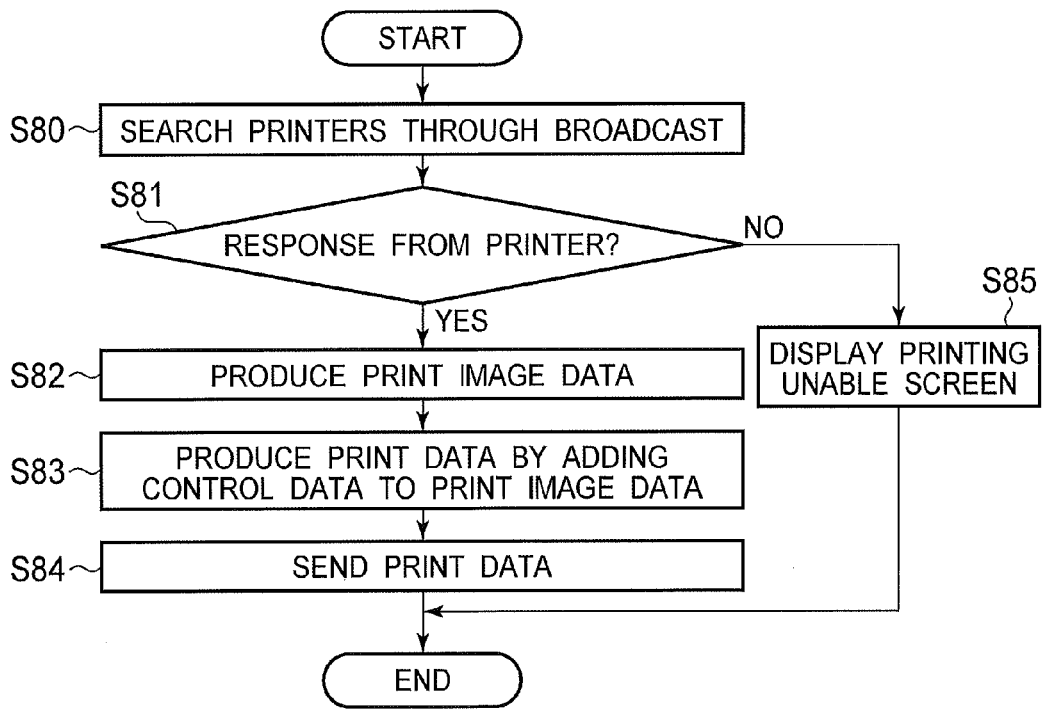
FIG. 17 is a flowchart illustrating the process for the PC to search the printers connected to the network and then send the print data to the selected printer.

FIG. 17 is a flowchart illustrating the process for the PC 150 to search the printers 110 connected to the network 130 and then send the print data 170 to the selected printer 110. The flow starts when the user interface 154 of the PC 150 has received the print command from the user.

The printer searching section 152 of the PC 150 searches the printers 110 connected to the network 130 (S80). The printer searching section 152 produces the search data that includes identification information that identifies the PC 150. This identification information is a PC name indicative of the PC 150 and not printer 110. However, the identification information is not limited to this. The search data may include the IP address of the PC 150. The printer searching section 152 broadcasts the search data via the communicating section 155 to the network 130, and then the printer searching section 152 waits a predetermine period of time for a response from the printers connected to the network 130.

The printer searching section 152 makes a decision to determine whether the communicating section 155 has received the search data from the printer 110 connected to the network 130 (S81). If the communicating section 155 has received the search-response data (YES at S81), the printer searching section 152 proceeds to S82; if the communicating section 155 has not received the search-response data (No at S81), the printer searching section 152 proceeds to S85.

At S82, the print data generating section 151 produces the print image data, i.e., actual data 170b.

The print data generating section 151 then produces the control data 170a. The print data generating section 151 adds the control data 170a to the actual data 170b produced at S82, thereby completing the print data 170 (S83). When producing the control data 170a, the print data generating section 151 receives, as required, the necessary information from the user via the user interface 154.

The print data generating section 151 sends the print data 170 produced at S83 to the printer 110 searched at S80 via the communicating section 119 (S84). If a plurality of printers 110 is detected at S80, the print data generating section 151 may select a printer 110 that sent back the search-response data earlier than any other printers 110. Alternatively, the print data generating section 151 checks the search-response data to detect a printer 110 that has a larger remaining capacity of the memory 116 than any other printers 110 may be selected.

At S81, if the communicating section 155 does not receive the search-response data (NO at S81), the printer searching section 152 proceeds to S85 where the printer searching section 152 generates a printing unable screen that includes a message indicative that no printer 110 was detected. The printer searching section 152 sends the printing unable screen to the user interface 154 which in turn displays the printing unable screen to the user.

As described above, in the first embodiment, when the PC 150 sends a print command to the printers 110, the PC 150 searches the printers 110 and then sends the print data 170 to the detected printer 110. The printer 110 that received the search data from the PC 150 sends the search-response data to the PC 150 according to the flowchart shown in FIG. 9.

The operation of the image forming system 100 according to the first embodiment will be described with reference to a sequence diagram. It is assumed that the image forming system 100 is constituted of the printer 110A, printer 110B, and printer 110C shown in FIG. 1. The printer 110A, printer 110B, and printer 110C are connected to the network 130 to which the PC 150 is also connected. The configuration of the printer 110A, printer 110B, and printer 110C is the same as that shown in FIG. 2. The printer 110A, printer 110B, and printer 110C have their printer names "printer A," "printer B," and "printer C," respectively.

Figure 18:
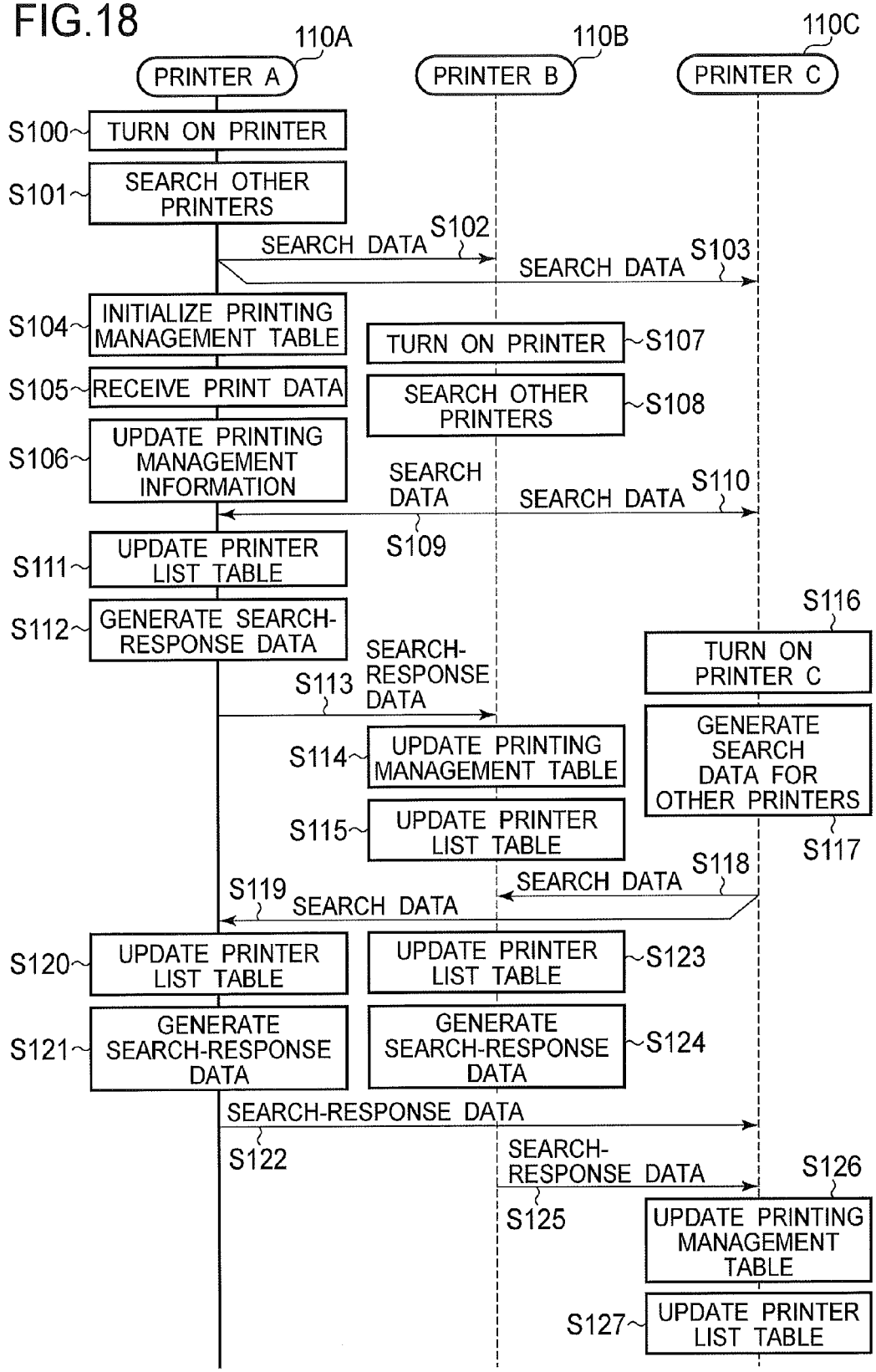

FIG. 18 is a sequence diagram illustrating the operation when the printer 110A, printer 110B, and printer 110C are turned on. A description will be given of how the printers 110a, 110B, and 110C are searched and the synchronization processing of the printing management table 171 of these printers is performed if the printers 110a, 110B, and 110C are turned on in this order.

The printer 110A is turned on (S100). The searching section 114A of the printer 110A generates the search data 173 for searching the other printers 110 connected to the network 130 (S101), and broadcasts the search data 173 via the communicating section 119A (S102, S103).

At this moment, the printers 110B and 110C have not been turned on yet, and therefore the printer 110A does not receive the search-response data 174 from the printers 110B and 110C. Thus, the searching section 114A of the printer 110A sends a search result, which indicates that other printers 110B and 110C were not detected, to an information managing section 113A, which in turn initializes the printing management table 171 stored in a memory 116A (S104). For example, the information managing section 113A deletes all the information held in the printing management table 171, and initializes the printer table 172 held in the memory 116A.

The printer 110A receives the print data 170 from the PC 150 connected to the network 130 (S105), and a printing controller 112A stores the received print data 170 into the memory 116A and sends the control data 170a included in the print data 170 to the information managing section 113A. The information managing section 113A updates the printing management table 171 held in the memory 116A with the received control data 170a (S106). Since the printer table 172 in the memory 116A does not hold the information about the other printers 110, no other printer 110 is notified of an update content.

The printer 110B is turned on after the printer 110A is turned on (S107). A searching section 114B of the printer 110B generates the search data 173 for searching other printers 110 connected to the network 130 (S108), and broadcasts the search data 173 via the communicating section 119B (S109, S110). At this moment, the printer 110C has not been turned on yet, so that the printer 110C does not respond to the search data 173. The printer 110A has been turned on, and receives the search data 173.

A search-response section 115A of the printer 110A receives the search data 173 from the communicating section 119A, and extracts the printer name included in the search data 173 and the IP address of the source printer that sends the IP packet held in the memory 116A. The search-response section 115A then stores the printer name and IP address of the printer 110B into the printer table 172 (S111). The search-response section 115A generates the search-response data 174 (S112), adds the content of the printing management table 171 to the search-response data 174, and sends the thus produced search-response data 174 to the printer 110B via the communicating section 119A (S113).

The printer 110B receives the search-response data 174 via the communicating section 119B, and the searching section 114B sends the search-response data 174 to an information management section 113B. The information management section 113B replaces the content of the printing management table 171 held in the memory 116B with the content of the printing management table 171 included in the search-response data 174, thereby updating the printing management table 171 (S114). The searching section 114B extracts the printer name included in the search-response data 174 received via the communicating section 119B, and the IP packet held in the search-response data 174, and stores the search-response data and the IP address into the printer table 172 (S115). At S115, the printer 110B obtains the printer name and IP address of the printer 110A.

The printer 110C is turned on after the printer 110B is turned on (S116). A searching section 114C of the printer 110C generates the search data for searching other printers 110 connected to the network 130 (S117), and broadcasts the search data 173 via a communicating section 119C (S118, S119). At this moment, the printer 110C has already been turned on, the printers 110A and 110B receives the search data 173.

A search-response section 115A of the printer 110A receives the search data 173 from the communicating section 119A, and extracts the printer name included in the search data 173 and the IP address of the source device that sends the IP packet. The search-response section 115A then stores the printer names and IP addresses into the printer table 172 (S120). At S120, the printer 110A obtains the printer name and IP address of the printer 110C. The printer table 172 of the printer 110A then holds the printer name and IP address of the printers 110B and 110C. The search-response section 115A generates the search-response data 174 (S121), adds the content of the printing management table 171 to the search-response data 174, and then sends the thus produced search-response data 174 to the printer 110C via the communicating section 119A (S122).

A search-response section 115B of the printer 110B receives the search data 173 via the communicating section 119B, and extracts the printer name included in the search data 173 and the IP address of the source device that sends the IP packet that includes the search data 173, and stores the printer name and IP address into the printer table 172, thereby updating the printer table 172 (S123). At S123, the printer 110B obtains the printer name and IP address of the printer 110C. The printer table 172 of the printer 110B now holds the printer name and IP address of the printer 110A and printer 110C. The search-response section 115B generates the search-response data 174 (S124), and adds the content of the printing management table 171 to the produced search-response data 174. The search-response section 115B then sends the search-response data 174 to the printer 110C via the communicating section 119B (S125).

The printer 110C receives the search-response data 174 via the communicating section 119C, and the searching section 114C sends the received search-response data 174 to an information management section 113C. The information management section 113C replaces the content of the printing management table 171 held in the memory 116C with the content of the printing management table 171 included in the received search-response data 174, thereby updating the printing management table 171 in the printer 110C (S126). Although the printer 110C receives the search-response data 174 from both the printer 110A and printer 110B, the information management section 113C may update the printing management table 171 of the printer 110C with one of the search-response data. The searching section 114C extracts the printer name included in the search-response data 174 received via the communicating section 119C, and the IP address of a source printer that sent the IP packet held in the search-response data 174, and then stores the search-response data 174 and the IP address into the printer table 172 in the memory 116C (S127). At S127, the printer 110C obtains the printer names and IP addresses of the printer 110A and printer 110B.

The above-described sequence permits each of the printers 110A, 110B, and 110C to obtain the identical printing management table 171 that hold identical information and obtain the printer names and IP addresses of remaining printers 110 connected to the network 130.

Figure 19:
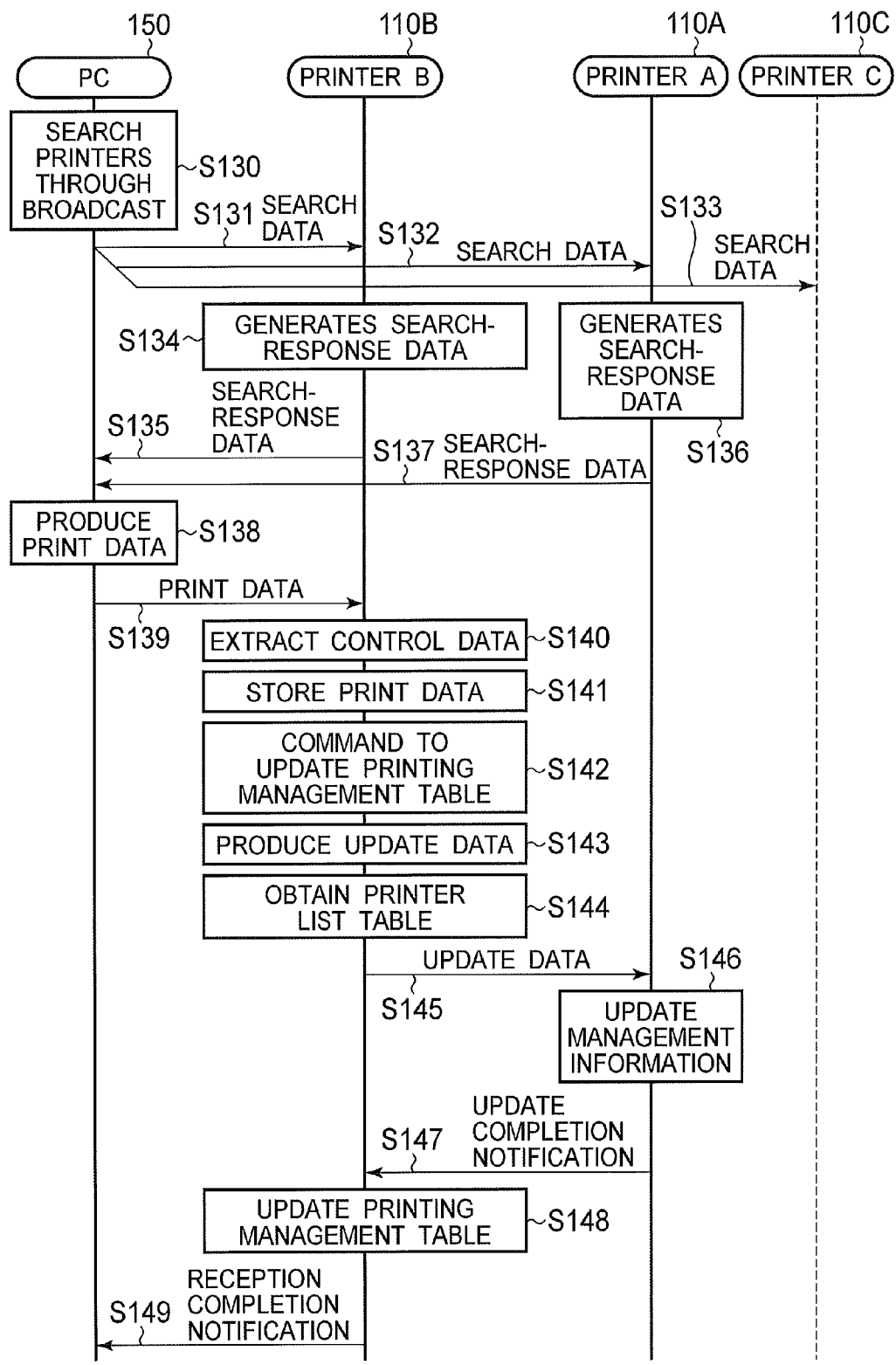
FIG. 19 is a sequence diagram illustrating the printing operation performed by the PC.

FIG. 19 is a sequence diagram illustrating the printing operation performed by the PC 150. FIGS. 20A and 20B illustrate a printing management table before the printing management table is updated and the printing management table after the printing management table is updated. It is assumed that the printers 110A and 110B have been turned on and the printer 110C has not been turned on yet. It is also assumed that when the sequence shown in FIG. 19 starts, the memory 116A of the printer 110A and the memory 116B of the printer 110B have a printing management table 171#1 as shown in FIG. 20A. Further, the printer table 172 held in the memory 116A of the printer 110A holds the printer name and IP address of the printer 110B, and the printer table 172 held in the memory 116B of the printer 110B holds the printer name and IP address of the printer 110A.

The printer searching section 152 of the PC 150 generates the search data that includes the PC name of the PC 150 (S130), and then broadcasts the generated search data to the network 130 via the communicating section 155 (S131,S132, and S133).

After receiving the search data, the search-response section 115B of the printer 110B generates the search-response data that includes the printer name of the printer 110B (S134), and sends the search-response data to the PC 150 via the communicating section 119B in reply to the search data (S135). Upon reception of the search-response data, the printer searching section 152 of the PC 150 extracts from the search-response data the printer name and the IP address of the source printer that sent the IP packet that includes the search-response data, and then stores the printer name and IP address into the memory 153.

Upon reception of the search data, the search-response section 115A of the printer 110A generates the search-response data that includes the printer name of the printer 110A (S136), and sends the search-response data to the PC 150 via the communicating section 119A in reply to the search data (S137). Upon reception of the search-response data, the printer searching section 152 of the PC 150 extracts from the search-response data the printer name and the IP address of the source device that sent the IP packet that includes the search-response data, and then stores the printer name and IP address into the memory 153.

The printer 110C has not turned on yet, the printer 110C does not send the search-response data in reply to the search data from the PC 150.

The print data generating section 151 of the PC 150 produces the print data 170 (S138). It is assumed that the print data 170 is data for a secure print job. Therefore, the print data generating section 151 sets the value of "Confidential," which is an extended variable of the control data 170a, to "YES." The print data generating section 151 selects, for example, the printer 1100B that sent the search-response data earlier than any other printers, and obtains the IP address of the printer 110B stored in the memory 153. The print data generating section 151 then sends the print data 170 produced at S138 to the printer 110B (S139).

The printing controller 112B of the printer 110B that has received the print data 170, determines that the received print data 170 is the authentication print data, and then extracts the control data 170a from the received print data 170 (S140). The printing controller 112B adds a name, which is unique within the printer 110B, to the print data 170, and then stores the print data 170 into the memory 116B (S141). The printing controller 112B sends to the information management section 113B the control data 170a extracted at S140 and the update command for updating the printing management table 171 (S142). Since the new print data 170 is received, the update command is an additional command to the printing management table 171.

Upon reception of the update command, the information management section 113B produces the update data 175 (S143). As shown in FIG. 13A, the information management section 113B stores "ADD" into the "Command" and the control data 170a received from the printing controller 112B into the "PJL", the printer name of the printer 1100B into the "PrinterName", and the name added to the print data 170 by the printing controller 112B into the "FileName", thereby producing the update data 175. The information management section 113B obtains the IP address of the printer 110A from the printer table 172 held in the memory 116 (S144), and sends the update data 175A produced at S143 to the printer 110A (S145).

The information managing section 113A of the printer 110A receives the update data, and updates the printing management table 171 held in the memory 116A (S146). Here, the update data 175A is to command addition of the control data 170a and therefore the information managing section 113A adds a new record constituted of the control data 170a, printer name, and name which are held in the update data 175A. As a result, for example, the printing management table 171#1 shown in FIG. 20A becomes a printing management table 171#2 shown in FIG. 20B. The information managing section 113A sends an update completion notification to the printer 110B, which is a source device that sent the update data 175A, via the communicating section 119A (S147).

The information management section 113B of the printer 110B that has received the update completion notification updates the printing management table 171 held in the memory 116B (S148). Here, the information management section 113B adds a new record constituted of the control data 170*a* received from the printing controller 112B, printer name of the printer 110B, and name that the print data 170 is as signed by the printing controller 112B. As a result, for example, the printing management table 171#1 shown in FIG. 20A becomes a printing management table 171#2 shown in FIG. 20B. Via the communicating section 119B, the printing controller 112B of the printer 110B sends a reception completion notification, which indicates completion of reception of the print data, to the PC 150 which is a source device that sent the print data 170 (S149).

As described above, if a printer 110 receives the print data 170 which is data for a secure print job, the control data 170*a* that identifies the print data 170 is sent to the other printers 110 connected to the network 130. In other words, the printers 110 that are connected to the network 130 and have been turned on can share the control data 170*a* that identifies the print data 170.

Figure 21:
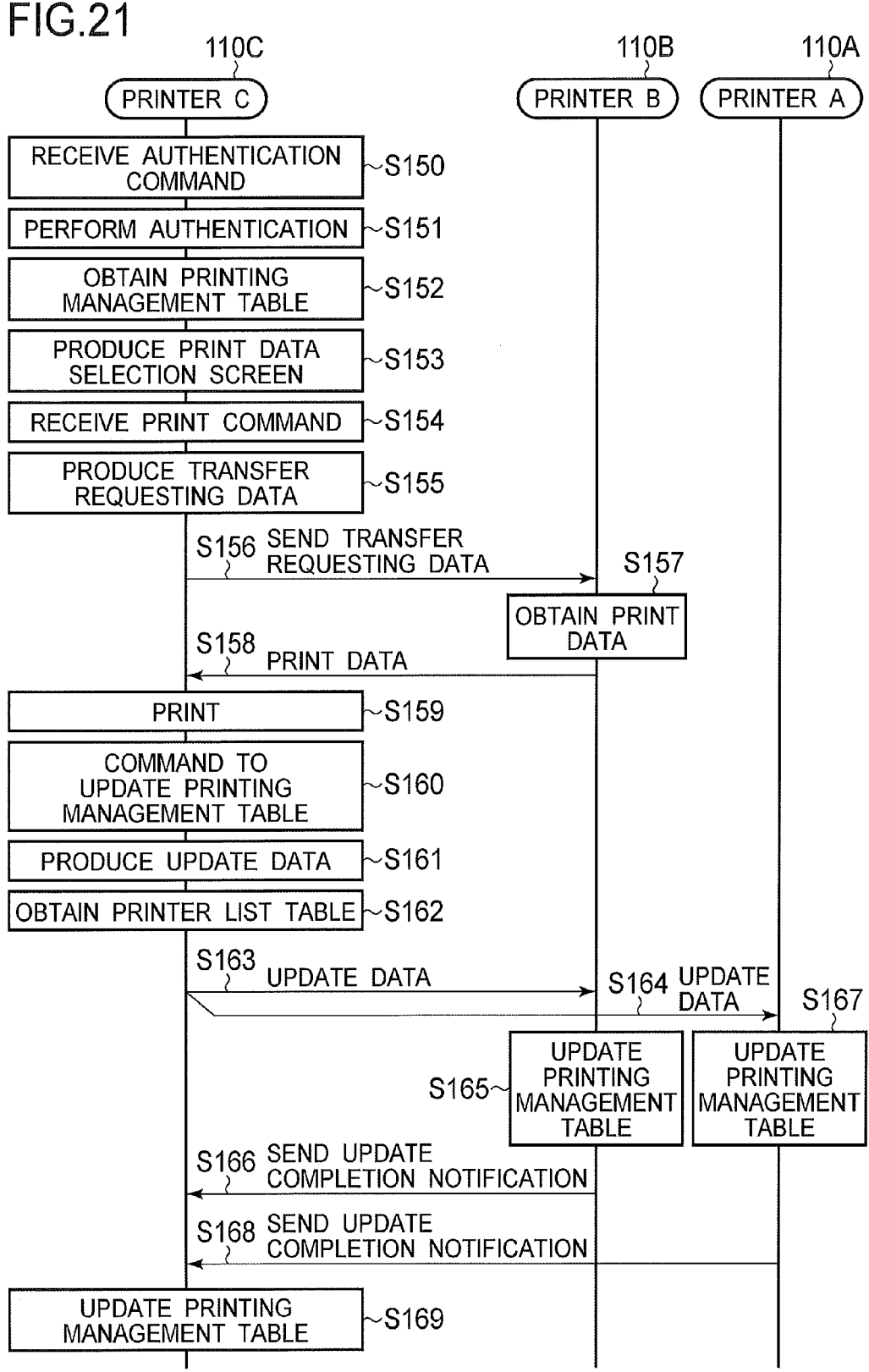
FIG. 21 is a sequence diagram illustrating the process performed when the user interface of a printer receives an authentication command from a user of the PC.

FIG. 21 is a sequence diagram illustrating the process performed when the user interface 118 of a printer 110 receives an authentication command from a user of the PC 150. The user of the PC 150 is allowed to print only when he is successfully authenticated by the printer 110C in accordance with the sequence.

The user interface 118C of the printer 110C receives an authentication command from the user (S150). An authenticating section 117C authenticates the user (S151). For example, the authenticating section 117C obtains information necessary for authentication via the user interface 118C, the information being, for example, ID information. The authenticating section 117C determines whether authentication is successful. It is assumed that the user has been authenticated successfully.

Upon successful authentication, the printing controller 112C obtains the printing management table 171 held in the memory 116C (S152).

The printing controller 112C produces the print data selection screen for the user to select an item of print data 170 that should be printed, the print data selection screen being produced based on the ID information obtained at S151 and the printing management table 171 obtained at S152 (S153). The printing controller 112C then sends the print data selection screen to the user interface 118C, which in turn displays the print data selection screen to the user. The user interface 118C receives a print command from the user (S154).

Upon reception of the print command from the user interface 118C, the printing controller 112C executes printing of the print data 170. The printing controller 112C refers to the printing management table 171 to check whether the print data 170 to be printed is held in the memory 116C. It is assumed that the print data 170 is not held in the memory 116C of the printer 110C but is held in the memory 116B of the printer 110B. In order to obtain the print data 170 to be printed under the print command, the printing controller 112C produces a print data transfer requesting message that includes the name of the print data 170 (S155).

The printing controller 112C then sends the transfer requesting data to the printer 110B via the communicating section 119C (S156). The communication addresses of the destination printers are obtained from the printer table 172 in the memory 116C.

The printing controller 112B of the printer 110B that received the transfer requesting data, obtains the print data 170 from the memory 116B, the print data 170 corresponding to the name included in the transfer requesting data (S157). If the printing controller 112B has received the print data 170, the print data 170 is deleted from the memory 116B. The printing controller 112B then sends the print data 170 obtained at S157 to the printer 110C in reply to the transfer requesting data via the communicating section 119B (S158).

The printing controller 112C of the printer 110C that received the print data 170, sends the received data 170 to a printing section 111C which in turn prints the print data 170 (S159). Thus, the user of the PC 150 can obtain the print out from the printer 110C.

The printing controller 112C sends an update command for updating the printing management table 171 to the information management section 113C (S160). Here, printing of the print data 170 is performed. Thus, the update command is to command deletion of the print data from the printing management table 171. The print data to be deleted is the print data 170 that is printed at S159.

Upon reception of the update command, the information management section 113C produces the update data 175 (S161). As shown in FIG. 13B, the information management section 113C stores "DELETE" into the element "Command" and the printer name of the destination printer to which the print data 170 to be printed should be sent, into "PrinterName", the name of the print data 170 to be printed into the "FileName", thereby producing the update data 175B. The information management section 113C obtains the IP address of the printer 110B and the IP address of the printer 110C from the printer table 172 held in the memory 116C (S162), and then sends the update data 175B produced at S161 to the printers 110A and 110B (S163, S164).

The information management section 113B of the printer 110B that has received the update data 175B updates the printing management table 171 held in the memory 116B (S165). The update data 175B commands deletion of the control data 170*a*. Thus, the information managing section 113B searches the printing management table 171 to identify a record constituted of the destination field 171*b* that holds the printer name included in the update data 175B and the name-of-print-data field 171*c* that holds the name included in the update data 175B, and then deletes the identified record from the printing management table 171. The information managing section 113B sends an update completion notification to the printer 110C via the communicating section 119B, the printer 110C being the source device that sent the update data 175B (S166).

The information managing section 113A of the printer 110A that received the update data 175B, updates the printing management table 171 held in the memory 116A (S167). The update data 175B is to command deletion of the control data 170*a*. Thus, the information managing section 113A searches the printing management table 171 to identify a record constituted of the destination field 171*b* that holds the printer name included in the update data 175B and the name-of-print-data field 171*c* that holds the name included in the update data 175B, and then deletes the identified record from the printing management table 171. The information managing section 113A sends an update completion notification to the printer 110C via the communicating section 119A, the printer 110C being the source device that sent the update data 175B (S168).

Upon reception of the update completion notifications, the information management section 113C of the printer 110C updates the printing management table 171 held in the memory 116C, and then deletes the record corresponding to the control data 170*a* that was commanded to be deleted (S169).

As described above, the user of the PC 150 is enabled to print the print data 170 not only by using the printer 110 that sent the print data 170 but also one of the other printers 110 connected to the network 130. The print data that has been printed is deleted from the printer 110, so that all of the printers 110 connected to the network 130 can share the information about the deletion of the print data.

In the first embodiment, even if one of the printers 110 is disconnected from the network 130 for some reason, the user of the PC 150 may be obtained a print out by being authenticated in another printer. This is because all of the printers 110 connected to the network 130 have the printing management table 171 holding identical information therein.

Second Embodiment

{Configuration}

Just as in FIG. 1, an image forming system 200 according to a second embodiment includes a plurality of printers 210A, 210B, 210C, and 210D. The numerals alone (e.g., 210) refer to the same thing as the numerals with letters (210A, 210B, 210C, and 210D) if the term printer refers to either the printer 210A, printer 210B, printer 210C, printer 210D, or all of these. The printers 210A-210D are connected to a network 130 to which a PC 250 is also connected.

Figure 22:
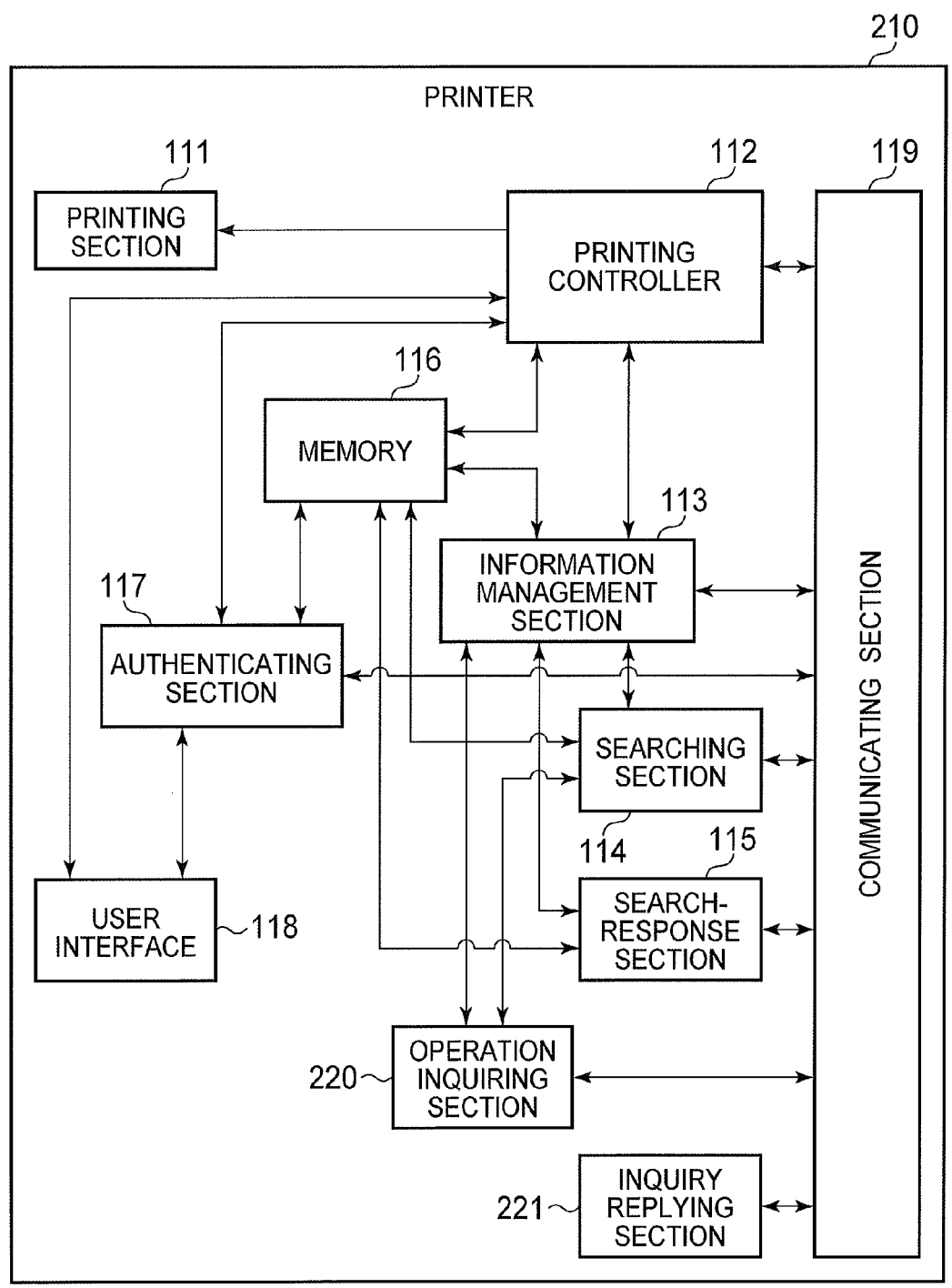
FIG. 22 is a block diagram illustrating the general configuration of the printers according to a second embodiment.

FIG. 22 is a block diagram illustrating the general configuration of the printers 210. Each of the printers 210A-210D includes a printing section 111, a printing controller 112, an information management section 113, a searching section 114, a search-response section 115, a memory 116, an authenticating section 117, a user interface (UI) 118, a communicating section 119, an operation inquiring section 220, and an inquiry replying section 221. The second embodiment differs from the first embodiment in that the operation inquiring section 220 and inquiry replying section 221 are employed.

The operation inquiring section 220 makes a decision to determine at a predetermined point of time or at predetermined time intervals whether the other printers 210 connected to the network 130 are active, i.e., ready to print. If the other printers have been turned off, or the other printers 210 have been placed in a power saving mode so that the communication function is inactive, or the other printers 210 have been disconnected from the network 130, then the operation inquiring section 220 determines that the printers are inactive or not ready to print. The operation inquiring section 220 sends operation inquiring data via the communicating section 119 to the other printers 210 connected to the network 130. If the operation inquiring section 220 does not receive the response to the operation inquiring data within a predetermined time period, then the operation inquiring section 220 determines that the other printers 110 are inactive or not ready to print. The operation inquiring data is sent to all the other printers the information about which is held in a printer table 172 held in the memory 116. The operation inquiring data may include the same information as the search data 173 shown in FIG. 8.

The operation inquiring section 220 deletes a record in the printing management table 171 held in the memory 116, the record including the control data extracted from the print data held in the printer 210 that is determined not to be ready to print. Based on the deleted record, the operation inquiring section 220 generates print data deletion notification data 277. The print data deletion notification data notifies that printing should be performed of the print data held in the printer that has been determined not to be ready to print. The operation inquiring section 220 sends the print data deletion notification data 277 via the communicating section 119 to the PC 250, which sent out the print data to the printer not ready to print.

FIG. 23 illustrates print data deletion notification data 277. The print data deletion notification data 277 is data in the form of a structured document constituted of elements such as "Command," "PJL," and "PrinterName." The "Command" indicates that the data is print data deletion notification data. The "PJL" represents the control data extracted from the print data held in the print 210 not ready to print. The "PrinterName" indicates the printer name of the printer 210 determined not to be ready to print.

Referring back to FIG. 22, the operation inquiring section 220 deletes the information about the printer 210 not ready to print from the printer table 172 held in the memory 116. Also, the operation inquiring section 220 produces printer deletion notification data that commands deletion of the information about the printer 210 not ready to print, and sends the printer deletion notification data 278 via the communicating section 119 to all the printers 210 whose printer tables 172 in the memories 116 hold the information about the printers not ready to print.

FIG. 24 illustrates the outline of printer deletion notifying data 278.

The printer deletion notification data 278 is data for a structured document constituted of elements such as "Command" and "PrinterName." The "Command" is a printer deletion notification. "PrinterName" indicates the printer name of the printer 210 that has been determined to be inactive i.e., not to be ready to print.

The operation inquiring section 220 receives the printer deletion notification data 278 from one of the other printers 210, and updates the printer table 172 held in the memory 116. For example, the operation inquiring section 220 identifies a record in the printer table 172, the record having the printer name held in the "PrinterName" of the printer deletion notification data 278. The operation inquiring section 220 then deletes the record from the printer table 172.

While the operation inquiring section 220 has been described to make a decision at an appropriate timing or at predetermined time intervals whether the other printers 210 connected to the network 130 are active or ready to print, the operation inquiring section 220 may make the decision in response to the user's command or randomly.

If the communicating section 119 receives the operation inquiring data, the inquiry replying section 221 produces inquiry replying data which is a response to the received operation inquiring data. The inquiry replying data includes at least the printer name of the printer that received the operation inquiring data. The inquiry replying section 221 sends the inquiry replying data via the communicating section 119 to the source device that has sent out the operation inquiring data. The inquiry replying data may include the same information as the search data 173 shown in FIG. 8.

Figure 25:
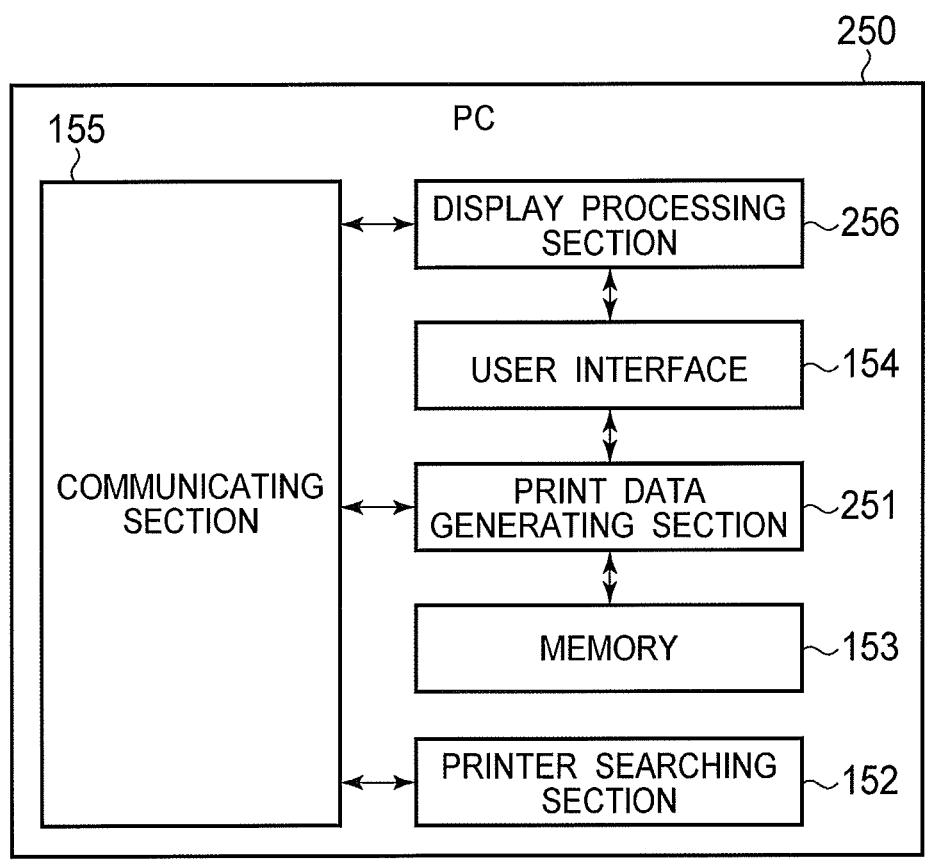
FIG. 25 is a block diagram illustrating the configuration of the PC.

FIG. 25 is a block diagram illustrating the configuration of the PC 250. The PC 250 includes a print data generating section 251, a printer searching section 152, a memory 153, a user interface 154, a communicating section 155, and a display processing section 256. The PC 250 differs from the PC 150 in that the print data generating section 251 and the display processing section 256 are employed.

The print data generating section 251 produces print data 270, by using for example, an application program.

Figure 26:
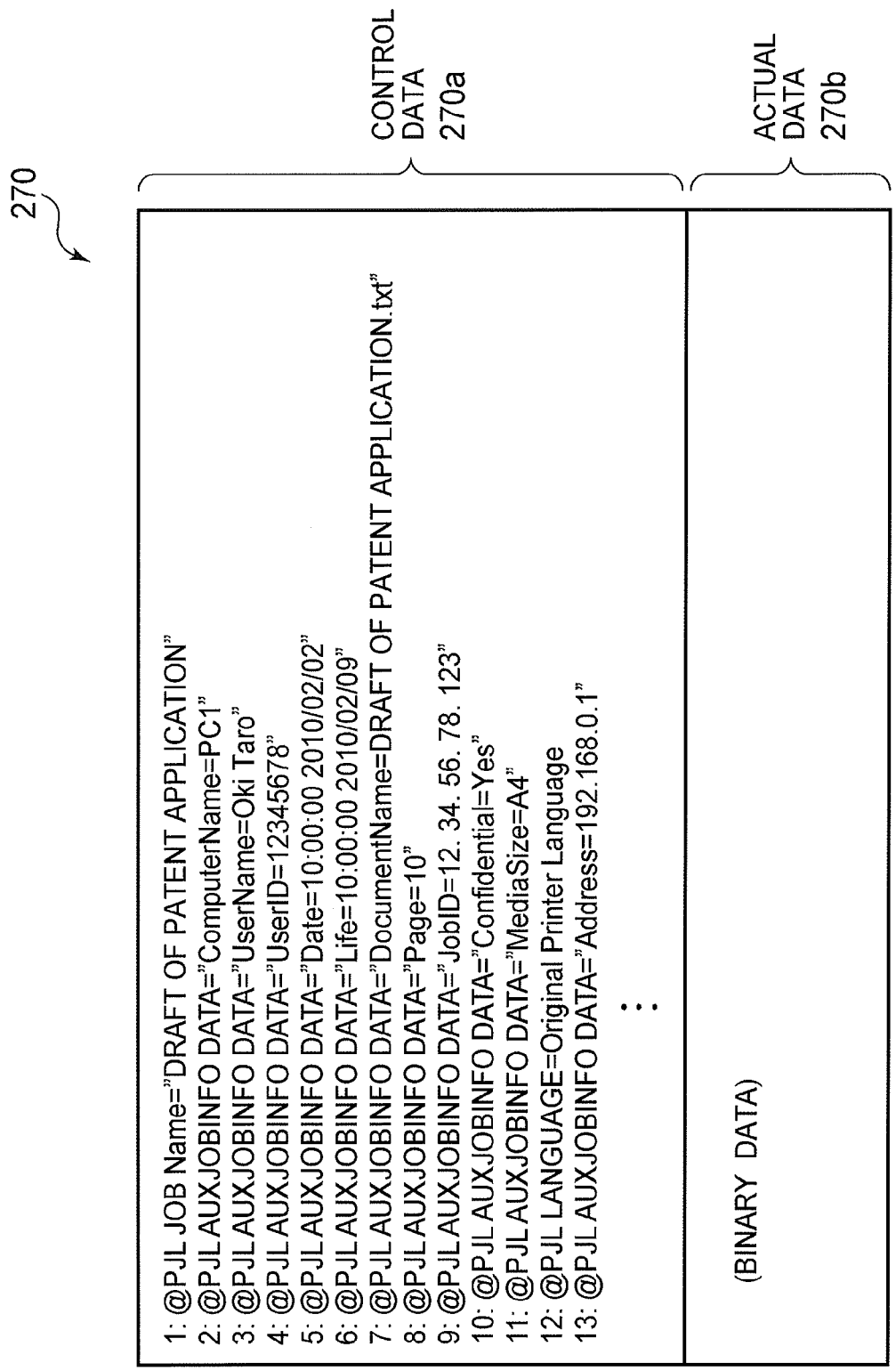
FIG. 26 illustrates the print data of the second embodiment.

FIG. 26 illustrates the print data 270 of the second embodiment. The print data 270 includes control data 270a and actual data 270b. The print data 270 differs from the print data 170 in that the control data 270a is used. The control data 270a differs from the control data 170a in that line 13 of the control data 270a includes the extended variable of "Address" indicative of the IP address which is the communication address of the PC 250 that produces the print data 270.

Referring to FIG. 25, once the communicating section 155 receives the print data deletion notification data 277, the display processing section 256 receives the print data deletion notification data 277 from the communicating section 155. Based on the received print data deletion notification data 277, the display processing section 256 generates a retry printing screen 279 which in turn is sent to the user interface 154. The user interface 154 displays the retry printing screen 279.

Figure 27:
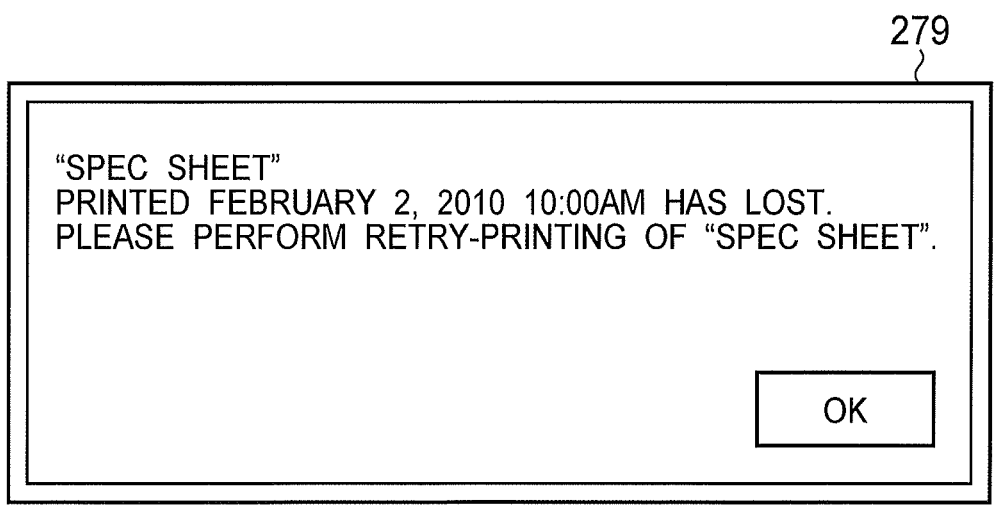
FIG. 27 illustrates the outline of the retry printing screen.

FIG. 27 illustrates the outline of the retry printing screen 279. The retry printing screen 279 displays the value of at least one variable extracted from the control data 270a included in the print data deletion notification data 277, thereby indicating that the print data represented by the at least one variable on the display has been deleted and printing of the print data should be retried. The example shown in FIG. 27 has the name for identifying the print data 270 and time information (e.g., year-month-day-hour) of creation of the print data 270, which have been extracted from the control data 270a.

{Operation}

Figure 28:
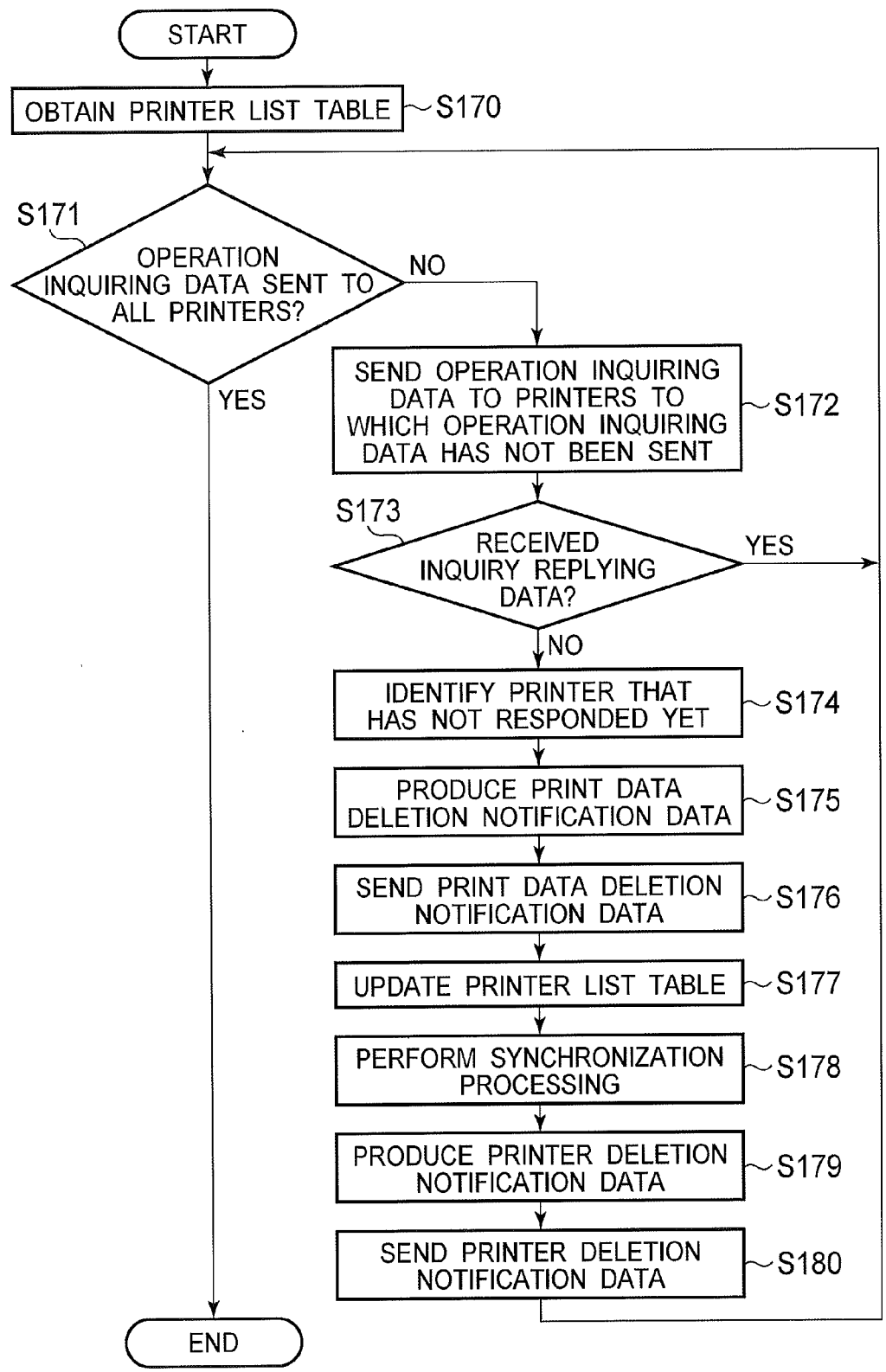
FIG. 28 is a flowchart illustrating the operation inquiring process.

FIG. 28 is a flowchart illustrating the operation inquiring process. The process starts at a predetermined timing, e.g., at predetermined time intervals.

The operation inquiring section 220 obtains the printer table 172 from the memory 116 (S170), and checks the printer table 172 to determine whether the operation inquiring data has been sent to all the printers, the information about which is held in the obtained printer table 172 (S171). If the operation inquiring data has been sent to all the printers or if none of the printers present in the obtained printer table 172 failed to receive the operation inquiring data (S171, YES), the flow ends. If not all printers have received the operation inquiring data or if some printers failed to receive the operation inquiring data (S171, NO), the program proceeds to S172.

At S172, the operation inquiring section 220 identifies one printer 210 to which the operation inquiring data has not been sent yet, and then sends the operation inquiring data to that printer 210. The operation inquiring section 220 makes a decision to determine whether the communicating section 119 has received the inquiry replying data (S173). If the operation inquiring section 220 has received the inquiry replying data (S173, YES), the program loops back to S171; if the operation inquiring section 220 has not received the inquiry replying data yet (S173, NO), the program proceeds to S174.

At S174, the operation inquiring section 220 refers to the printing management table 171 held in the memory 116, to identify a record whose destination field 171b holds the printer name of the printer 210 from which the inquiry replying data has not been received yet. The operation inquiring section 220 then obtains the control data 270a held in the control data field 171a of the identified record.

The operation inquiring section 220 produces the print data deletion notification data 277 that includes the control data 270a obtained at S174 and the printer name of the printer 210 from which the inquiry replying data has not been received yet (S175). If a plurality of items of control data 270a are obtained at S174, the print data deletion notification data 277 is produced for each of the printers 210 that is identified by one of the value of the extended variable of "ComputerName" and the value of the extended variable of "Address" in the control data 270a. The operation inquiring section 220 sends the print data deletion notification data 277 via the communicating section 119 to the IP address, which is represented by the value of the extended variable "Address" included in the print data deletion notification data 277 (S176).

The operation inquiring section 220 deletes, from the printer table 172 held in the memory 116, the information about a printer 210 from which the inquiry replying data has not been received yet (S177). The operation inquiring section 220 sends to the information managing section 113 the control data 270a extracted at S174 and an update command that commands the information managing section 113 to update the printing management information. This update command is to command deletion of the corresponding printing management information. Upon reception of the update command and the control data 270a, the information managing section 113 performs the synchronization processing (S178). The process at S178 is the same as that shown in FIG. 11.

The operation inquiring section 220 produces the printer deletion notification data 278 that includes the printer name of the printer 210 from which the inquiry replying data has not been received yet (S179). The operation inquiring section 220 then sends the produced printer deletion notification data 278 to the printer 210, the information about which is held in the printer table 172 held in the memory 116 (S180).

As described above, in the printer 210 according to the second embodiment, if the operation inquiring section 220 fails to receive the inquiry replying data from a printer, then the operation inquiring section 220 deletes the information about that printer from the printing management table 172. Further, the operation inquiring section 220 notifies the PC 250, which created the print data 270 held in that printer, that printing of the print data 270 should be retried.

Figure 29:
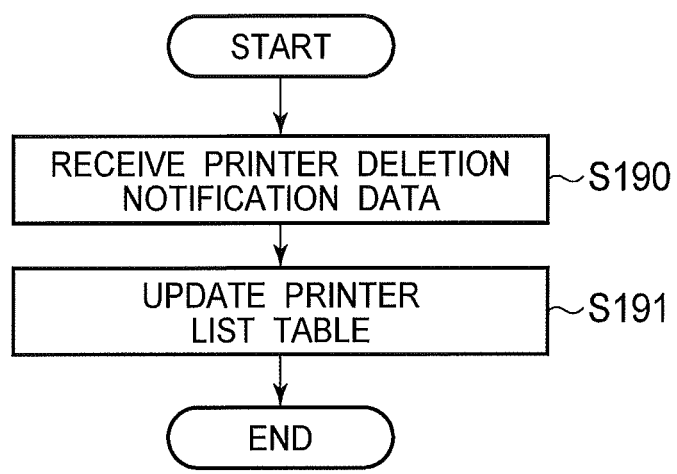
FIG. 29 is a flowchart illustrating the process for the printer to receive the printer deletion notification data.

FIG. 29 is a flowchart illustrating the process for the printer 210 to receive the printer deletion notification data 278.

The communicating section 119 of the printer 210 receives the printer deletion notification data 278 (S190). The operation inquiring section 220 then obtains the received printer deletion notification data 278, and then identifies a record whose printer name field 172a in the printer table 172 holds the printer name included in the printer deletion notification data 278. The operation inquiring section 220 deletes the identified record from the printer table 172 (S191).

As described above, by the use of the notification received from other printers, the operation inquiring section 220 deletes the information about the printer 210 that is not normally active.

Figure 30:
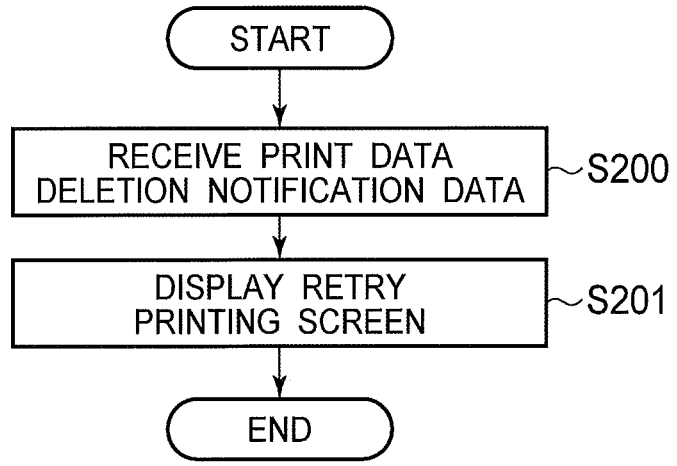
FIG. 30 is a flowchart illustrating the process for the PC to receive the print data deletion notification data.

FIG. 30 is a flowchart illustrating the process for the PC 250 to receive the print data deletion notification data 277.

The communicating section 155 of the PC 250 receives the print data deletion notification data 277 (S200). The display processing section 256 obtains the received print data deletion notification data 277 from the communicating section 155. The display processing section 256 then produces the retry printing screen 279 using the value of the control data 270a included in the received print data deletion notification data 277. The display processing section 256 then sends the retry printing screen 279 to the user interface 154 which in turn displays the retry printing screen 279 as shown in FIG. 27 (S201).

As described above, the PC 250 can inform the user that the printing operation should be retried.

The operation of the image forming system 200 according to the second embodiment will be described with reference to a sequence diagram. It is assumed that the image forming system 200 is constituted of the printer 210a, 210B, 210C, and PC 250 shown in FIG. 1. The configuration of the printer 210A, 210B, and 210C is the same as that shown in FIG. 2. The printers 210A, 210B, 210C have their printer names "printer A," "printer B," and "printer C," respectively.

Figure 31:
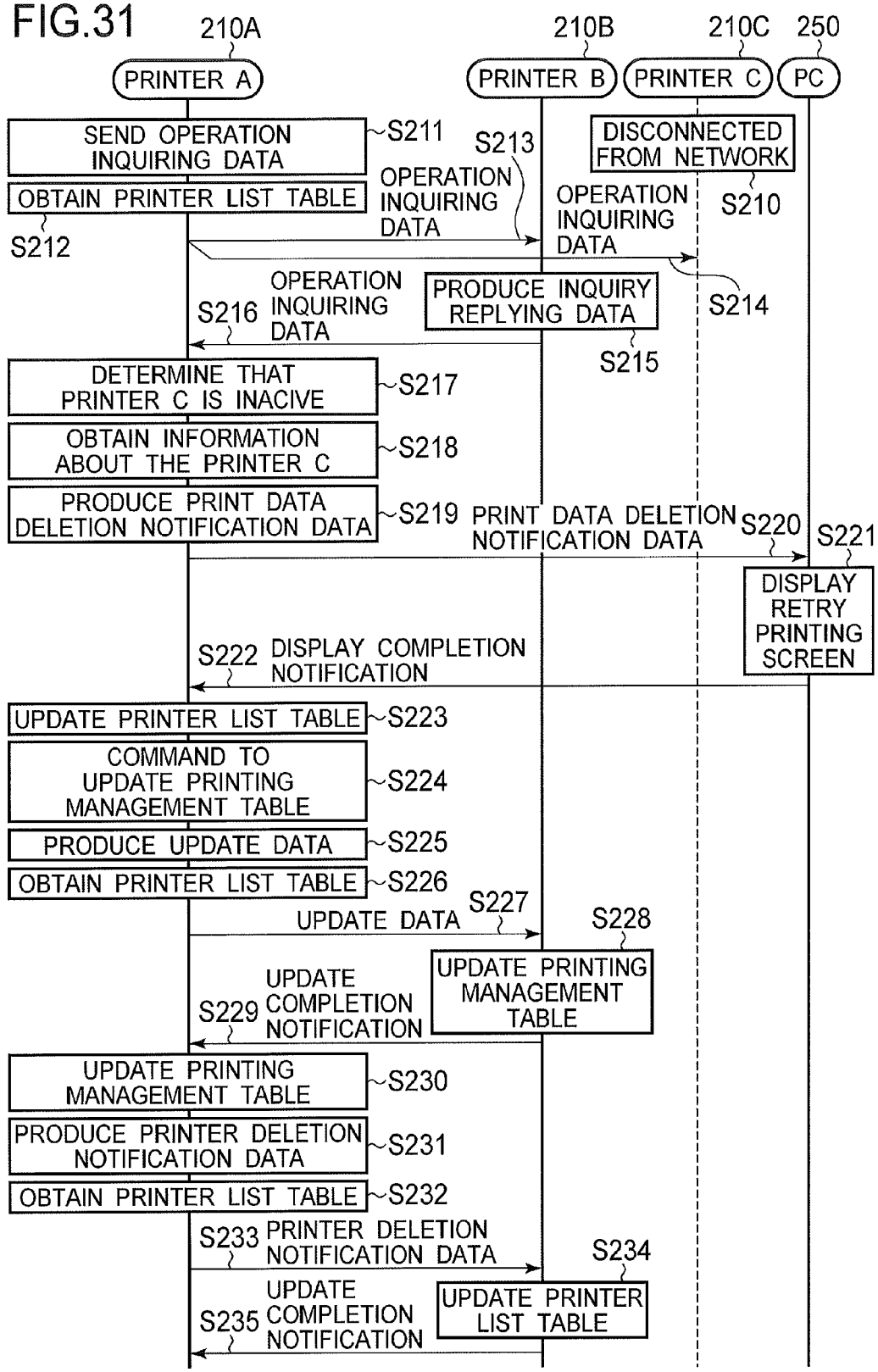
FIG. 31 is a sequence diagram illustrating the operation of how an image forming system operates.

FIG. 31 is the sequence diagram illustrating how the image forming system 200 operates.

Figure 32:
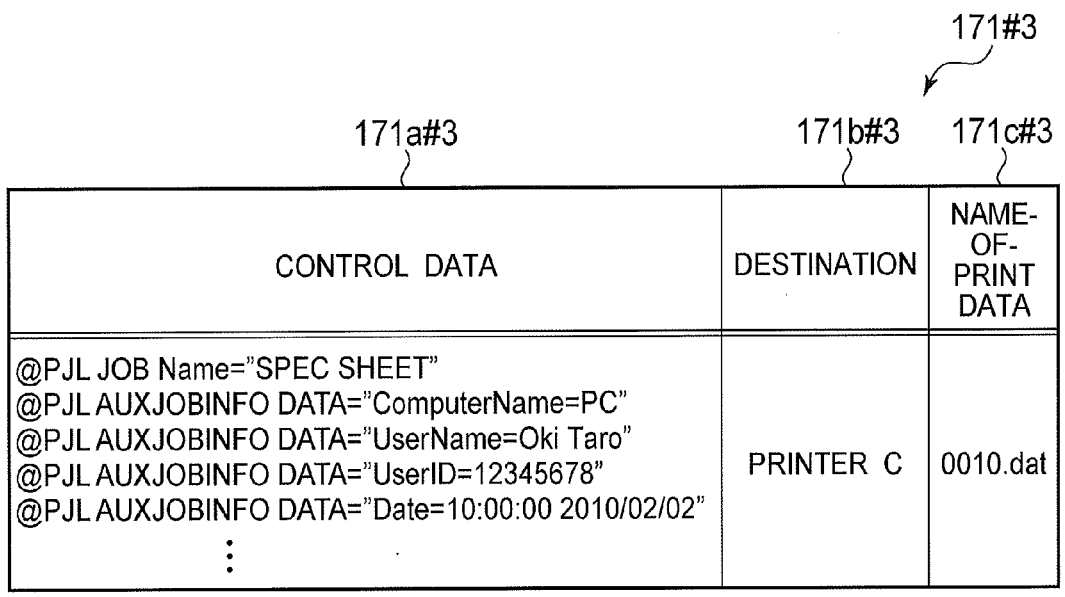
FIG. 32 illustrates an example of a printing management table according to the second embodiment.

FIG. 32 illustrates an example of a printing management table according to the second embodiment.

It is assumed that the printers 210A, 210B, and 210C have a printing management table 171#3 as shown in FIG. 32.

The printer 210C is disconnected from the network 130 due, for example, to power-off. (S210).

The operation inquiring section 220A of the printer 210A produces the operation inquiring data (S211). The operation inquiring section 220A then obtains the printer table 172 from the memory 116A (S212), and then sends the operation inquiring data to printers 210, the information about which is held in the printer list table 172 (S213, S214).

Upon reception of the operation inquiring data, the inquiry replying section 221B of the printer 210B produces the inquiry replying data (S215). The inquiry replying section 221B then sends via the communicating section 119B the inquiry replying data to the printer 210A which is a source device that sent the operation inquiring data (S216). Upon reception of the inquiry replying data from the printer 210B, the printer 210A determines that the printer 210B is normally active.

The printer 210C does not respond to the operation inquiring data since the printer 210C has been disconnected from the network 130. Thus, a period of time after transmission of the operation inquiring data, the operation inquiring section 220A of the printer 210a determines that the printer 210C is not normally active (S217). The operation inquiring section 220A identifies a record in the printing management table 171#3, the record having a destination field 171b#3 that holds the printer name of the printer 210C. The operation inquiring section 220A obtains the control data 270a from the control data field 171a#3 of the identified record (S218). The operation inquiring section 220A produces the print data deletion notification data 277 that includes the obtained control data 270a and the printer name "PRINTER C" of the printer 210C (S219). The operation inquiring section 220A then sends the produced print data deletion notification data 277 to a destination expressed by the value of the extended variable "Address" of the obtained control data 270a (S220).

Upon reception of the print data deletion notification data 277, the display processing section 256 of the PC 250 causes the user interface 154 to display the retry printing screen 279 as shown in FIG. 27 based on the print data deletion notification data 277 (S221). Via the communicating section 155, the display processing section 256 sends a display completion notification to the printer 210A which is a source device of the print data deletion notification data 277 (S222).

Upon reception of the display completion notification, the operation inquiring section 220A of the printer 210A updates the printer table 172 stored in the memory 116A, and then deletes the information about the printer 210C determined not to be active (S223).

The operation inquiring section 220A sends the control data 270a obtained at S218 and the update command of the printing management table 171 to an information managing section 113A (S224). This update command is to command deletion of the record from the printing management table 171.

Upon reception of the update command, the information managing section 113A produces update data 175 (S225). For example, the information managing section 113A obtains the printer name and name-of-print-data, which correspond to the control data 270a received from the operation inquiring section 220A, from the printing management table 171#3 held in the memory 116. As shown in FIG. 13B, the information managing section 113A stores "DELETE" into the element "Command", the obtained printer name into the element "PrinterName", and the obtained name-of-print data into the element "FileName," thereby producing the update data 175B (S225). Also, the information managing section 113A obtains the IP address of the printer 210B from the printer table 172 stored in the memory 116A (S226), and then sends the update data 175B to the printer 210B via the communicating section 119A (S227).

Upon reception of the update data 175B, the information managing section 113B of the printer 210B updates the printing management table 171#3 held in the memory 116 (S228). Because the update 175B is to command deletion of the control data 170a, the information managing section 113B searches the printing management table 171 to identify a record that includes the printer name held in the destination field 171b and the name of print data held in the name-of-print-data field 171c, and then deletes the identified record from the printing management table 171. The information managing section 113B sends an update completion notification to the printer 210A via the communicating section 119B, the printer 210A being the source device that sent out the update data 175B (S229).

Upon reception of the update completion notification, the information managing section 113A of the printer 210A updates the printing management table 171#3 held in the memory 116, i.e., deletes the record that corresponds to the control data 170a (S230).

As shown in FIG. 24, the operation inquiring section 220A produces the printer deletion notification data 278 that includes the printer name of the printer 210C determined to inactive (S231). The operation inquiring section 220A obtains the IP address of the printer 210B from the printer table 172 held in the memory 116 (S232), and then sends the produced printer deletion notification data 278 to the printer 210B via the communicating section 119A (S233).

Upon reception of the printer deletion notification data 278, the operation inquiring section 220B identifies a record having the printer name field 172a that holds the printer name included in the obtained printer deletion notification data 278. The operation inquiring section 220B then deletes the identified record from the printer table 172 (S234). The operation inquiring section 220B sends the update completion notification to the printer 210A via the communicating section 119B, the printer 210A being the source device that sent the produced printer deletion notification data 278 (S235).

As described above, the printer 210 according to the second embodiment detects inactivity of any one of the printers connected to the network 130, so that the remaining printers 210 connected to the network 130 can share the information about the inactive printer 210. The PC 250 receives the information about the printer data that has been sent to the inactive printer and cannot be printed, and therefore the user of the PC 250 can request another one of the printers to perform a retry printing of the print data. This configuration makes the image forming system more user friendly.

Third Embodiment

{Configuration}

Just as in FIG. 1, an image forming system 300 according to a third embodiment includes a plurality of printers 310A, 310B, 310C, and 310D and at least one PC 350. The numerals alone refer to the same thing as the numerals with letters. The printers 310A-310D and PC 350 are connected to a network 130.

Figure 33:
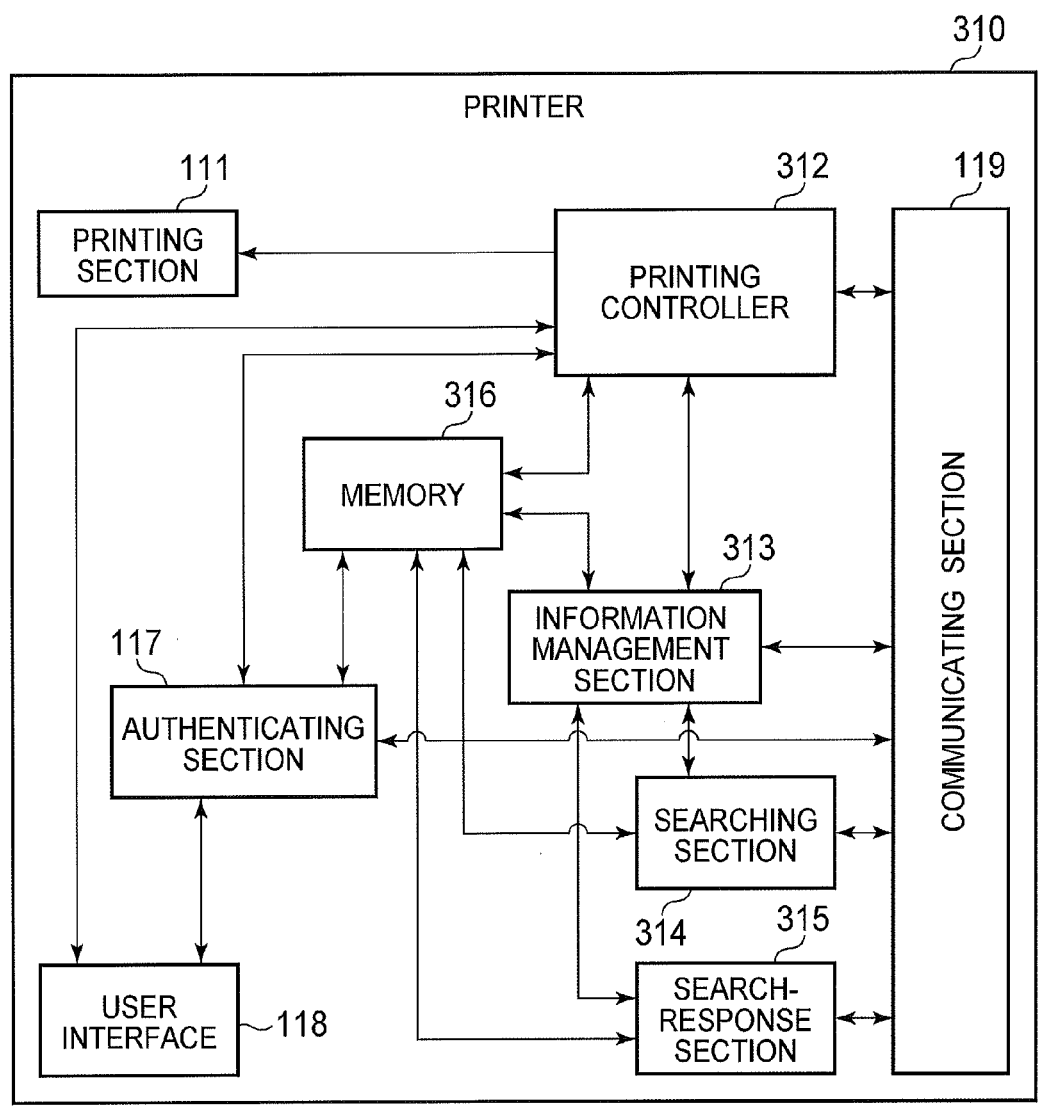
FIG. 33 is a block diagram illustrating the general configuration of the printers according to a third embodiment.

FIG. 33 is a block diagram illustrating the general configuration of the printers 310. Each of the printers 310A-310D includes a printing section 111, a printing controller 312, an information management section 313, a searching section 314, a search-response section 315, a memory 316, an authenticating section 117, a user interface (UI) 118, and a communicating section 119. The third embodiment differs from the first embodiment in that the printing controller 312, information management section 313, searching section 314, search-response section 315, and memory 316 are used.

Figure 34:
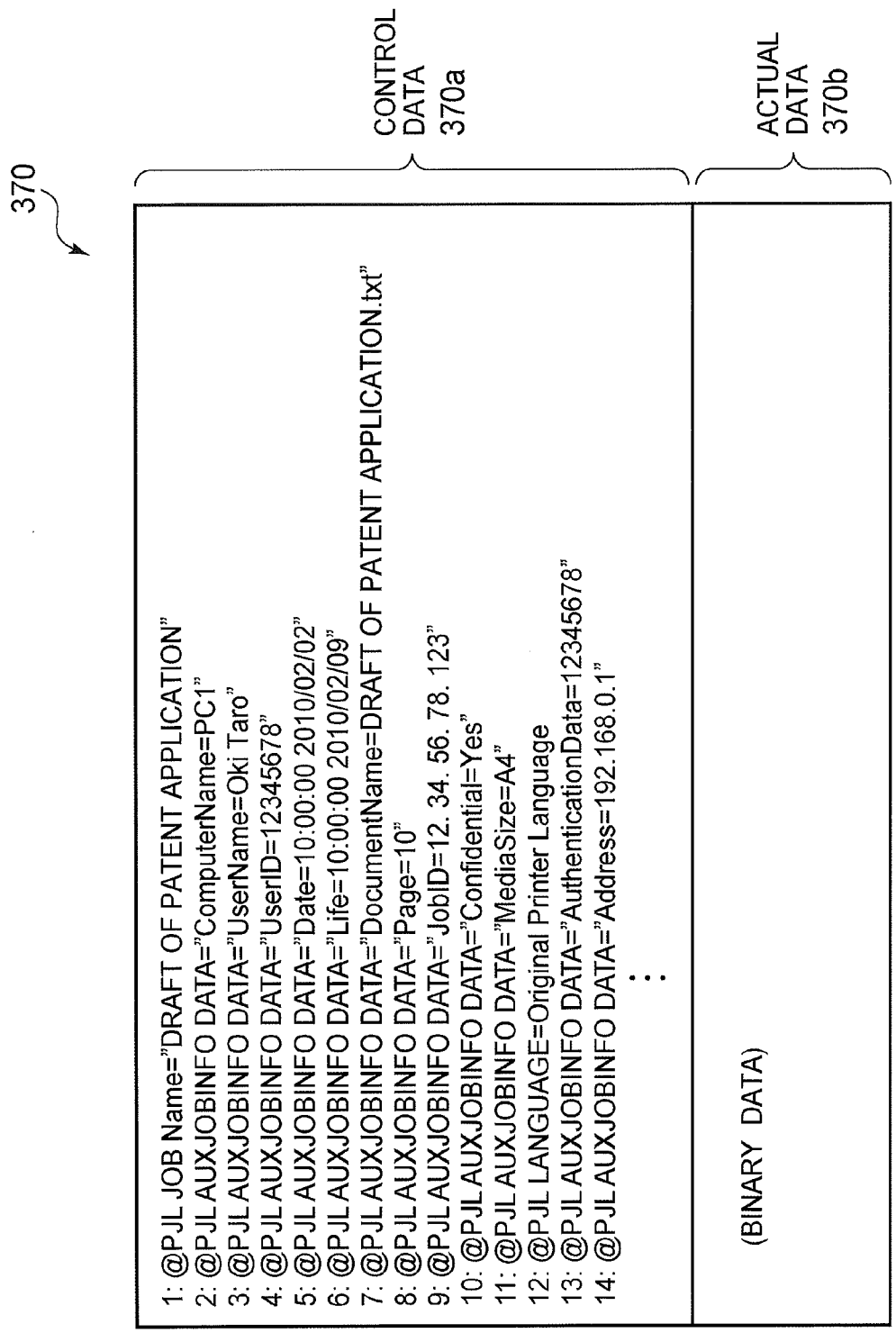
FIG. 34 illustrates the outline of the printer data according to the third embodiment.

FIG. 34 illustrates the outline of the printer data 370 according to the third embodiment. The print data 370 as a print job includes control data 370a and actual data 370b. The print data 370 of the third embodiment differs from that of the first embodiment in the control data 370a. Specifically, line 13 of the control data 370a has the extended variable of "AuthenticationData" indicative of authentication information of the user who produced the print data 370. Further, line 14 has the extended variable of "Address" indicative of the IP address as the communication address of the PC 350 by which the print data 370 was produced.

Referring back to FIG. 33, the printing controller 312 manages the print data 370. The printing controller 312 drives the printing section 111 to print the print data 370. For example, the printing controller 312 receives the print data 370 from the communicating section 119. The printing controller 312 refers to the control data 370a of the obtained print data 370 to determine whether the print data 370 should be printed immediately. If the printing controller 312 determines that the print data 370 should be printed immediately, the printing controller 312 sends the print data 370 to the printing section 111 for printing. If the printing controller 312 determines that the print data 370 should not be printed immediately, the printing controller 312 stores the print data 370 into the memory 116 for storage. When the print data 370 is stored into the memory 116, the printing controller 312 adds a name to the print data 370, the name functioning as identifying information that identifies the print data 370. This name is a unique name so that no identical name is used for other data or devices. For example, this name is added as a file name.

When the printing controller 312 stores the print data 370 into the memory 316, if the print data 370 has bibliographic data, the printing controller 312 produces individual management information by adding destination information and the name of the print data 370 to the bibliographic data. The individual management information identifies the destination to which the print data 370 should be destined. The printing controller 312 then stores the individual management information into the printing management information held in the memory 316. When the printing controller 312 stores the print data 370 into the memory 316, if the print data 370 has not the bibliographic data, the printing controller 312 produces the bibliographic data based on the control data 370a of the print data 370. The printing controller 312 adds the destination information and the name of the print data 370 to the bibliographic data. The individual management information identifies the destination to which the print data 370 should be destined. The printing controller 312 then stores the individual management information into the printing management information held in the memory 316.

When the authenticating section 117 has successfully completed authentication, the printing controller 312 receives the authentication information from the authenticating section 117, and then prints the print data 370 corresponding to the authentication information. If the print data 370 corresponding to the authentication information is held in other printer 310 connected to the network 130, the printing controller 312 receives the print data 370 from that printer that holds the print data 370.

If the printing controller 312 receives via the communicating section 119 a print data transfer requesting message from one of the other printers connected to the network 130, the printing controller 312 reads the print data 370 from the memory 316 and sends the print data 370 to that printer 310 that sent the print data transfer requesting message.

The information management section 313 manages the printing management information held in the memory 316. The printing management information is used to manage the print data 370 held in the memory 316. The printing management information includes identification information that identifies each corresponding item of print data 370 and destination information that identifies a storage destination of the item of print data 370 identified by the identification information. The storage destination is identified by the identification information and the item of print data should be stored into the storage destination.

FIG. 35 illustrates the printing management table 371. The printing management table 371 includes a reference number field 371a, a document name field 371b, a time information field 371c, a document creator field 371d, an authentication information field 371e, a number-of-pages field 371f, an address field 371g, a name field 371h, a destination field 371i, and a path field 371j. The reference number field 371a holds a reference number that identifies a corresponding record in the printing management table 371. The document name field 371b holds the extended variable of "DocumentName" of the control data 370a of the print data 370. The time information field 371c holds the extended variable of "Date" which is information indicative of the year-month-day-hour of creation of the document. The document creator field 371d holds the value of the extended variable of "UserName" of the control data 370a of the print data 370. The authentication information field 371e holds the value of the extended variable of "AuthenticationData" of the control data 370a of the print data 370. The number-of-pages field 371f holds the value of the extended variable of "Page" of the control data 370a of the print data 370. The address field 371g holds the value of the extended variable of "Address" of the control data 370a of the print data 370. The name field 371h holds the name as signed to the print data 370 by the printing controller 312 when the print data 370 is stored into the memory 316. The destination field 371i holds, for example, the printer name or PC name, which is identifying information that identifies an apparatus that is holding the print data 370. The path field 371j holds a path that indicates the device in the apparatus in which the print data 370 is to be stored. In the example shown in FIG. 35, the identification information is the information held in the document name field 371b, time information field 371c, document creator field 371d, authentication information field 371e, number-of-pages field 371f, address field 371g, and name field 371h. The destination information is the information held in the destination field 371i and path field 371j.

Referring back to FIG. 33, the information management section 313 performs the synchronization process among the printers 310 connected to the network 130. For example, when the content of the printing management table 371 is updated, the information management section 313 causes the other printers 310 connected to the network 130 to update the printing management table 371 thereof, thereby performing the synchronization processing. This synchronization processing is performed by notifying the printers of the updated content based on the printer list held in the memory 316. The printing management table 371 of printers on which the synchronization processing is being performed are locked so that the synchronization processing is performed on all the printers simultaneously and no other changes are made to the printing management table 371 of the respective printers. Therefore, if the printing management table 371 of a printer is locked, the information management section 313 of that printer is able to receive changes only from the printer 310 that caused locking. Upon completion of the synchronization processing, the information management section 313 unlocks the printing management table 371 of printers. The printers are given corresponding priority levels, so that if more than one printer 310 tries to lock the printing management table 371 of other printers, a printer having a higher priority level is allowed to the printing management table 371 of lock printers having a lower priority level. Different priority levels are as signed to the printers so that each printer has a different priority level from other printers. For example, the IP address of the printer 310 may be interpreted as a 12-digit number and lower priority levels are as signed to earlier numbers. Specifically, an IP address of 192.168.0.1 is interpreted simply as a number 19216801 and lower priority levels are assigned to earlier numbers. Alternatively, the priority levels may be assigned by the users of the printers 310. When referring to the printing management table 371, the corresponding printer need not be locked. However, the process for referring the printing management table 371 is temporarily halted while the printing management table 371 of the printer remains locked.

The searching section 314 searches other printers 310 connected to the network 130. For example, the searching section 314 broadcasts the search data to the printers 310 via the communicating section 119, and then makes a decision to determine whether the communicating section 119 receives the search-response data responding to the search data. It is preferable that the searching section 314 produces the search data that includes, for example, the printer name, printer's capability, and status of consumables of the printer to which the searching section 314 belongs.

FIG. 36 illustrates the outline of a printer table 372 as a printer list. The printer table 372 includes a reference number field 372a, an IP address field 372b, a printer name field 372c, an active/inactive field 372d, a printer model field 372e, a maximum paper size field 372f, and a remaining amount of toner field 372g. The reference number field 372a holds a reference number that identifies a corresponding record in the printer table 372. The IP address field 372b holds the IP address, which is the communication addresses of the other printer as a source device of the search data or search-response data. The printer name field 372c holds the printer name which is identification information indicative of other printer having an IP address held in the IP address field 372b, the printer name including information indicative that the apparatus is a printer (i.e., image forming apparatus). For example, the example shown in FIG. 36 includes a string of characters "PRINTER." The active-inactive field 372d holds information indicative that the other printer 310 having the IP address held in the IP address field 372b should be checked whether it is active or inactive. In the third embodiment, the symbol "YES" denotes that the printer 310 should be checked whether it is active or inactive, and the symbol "NO" denotes that the printer need not be checked. The printer model field 372e holds the printer model that identifies other printer 310 having an IP address held in the IP address field 372b. The maximum paper size field 372f holds the maximum paper size on which the printer can print, the printer having the IP address held in the IP address field 372b. The remaining toner field 372g holds the remaining amount of toners (cyan, magenta, yellow, and black toners) in the other printer having the IP address held in the IP address field 372b. The printer table 372 shown in FIG. 36 holds the printer's cap ability of the printer 310 e.g., the maximum paper size and the status of consumables e.g., remaining amount of toner. Alternatively, the printer's cap ability may include at least one of color/monochrome printing and resolution, and the status of consumables may include at least one of the remaining number of paper sheets and the usable life of the photoconductive drum. The printer table 372 may further hold status information indicative of whether the printer is malfunctioning.

Once the searching section 314 receives the search-response data via the communicating section 119, the searching section 314 extracts the information about the other printers 310 from the search-response data, and then stores the information into the printer table 372.

Referring back to FIG. 33, if the search-response section 315 receives the search data via the communicating section 119 from the toner printers and PC 350 connected to the network 130, the received search-response section 315 produces the search-response data responding to the search data. The search-response section 315 sends via the communicating section 119 the produced search-response data to the source device from which the search data is sent out. In the third embodiment, the search-response section 315 produces the search-response data having the printer name of the printer that sends out the search-response data, the printer's capability, and the status of consumables. When the search-response section 315 receives the search data via the communicating section 119, the search-response section 315 extracts information from the received search data and stores the information into the printer table 372.

The memory 316 stores information necessary for the operation of the printer 310. For example, the memory 316 stores the print data 370, printing management table 371, and printer table 372.

Figure 37:
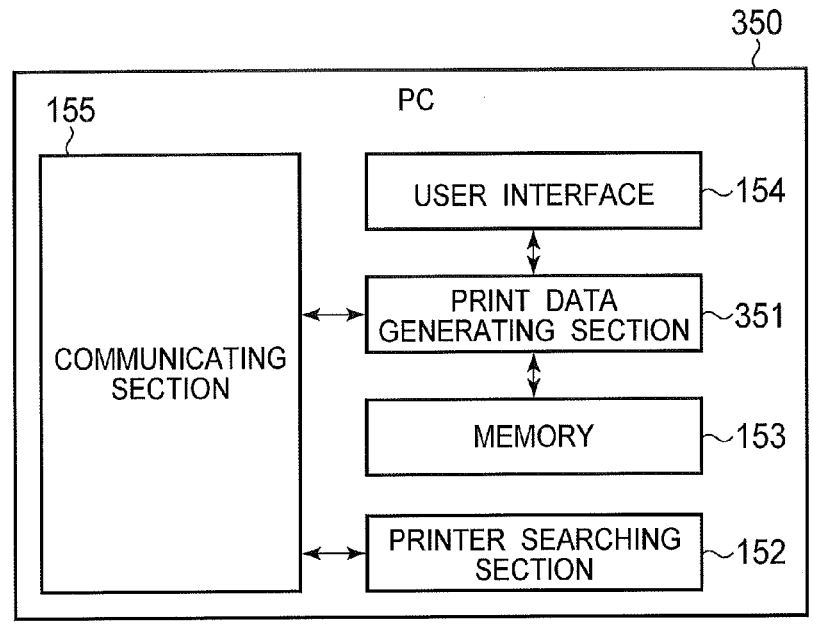
FIG. 37 is a block diagram illustrating the outline of the configuration of the PC.

FIG. 37 is a block diagram illustrating the outline of the configuration of the PC 350. The PC 350 includes a print data generating section 351, a printer searching section 152, a memory 153, user interface 154, and a communicating section 155. The PC 350 according to the third embodiment differs from the PC 150 according to the first embodiment in the process performed by the print data generating section 351.

The print data generating section 351 produces the print data 370. For example, the print data generating section 351 creates the print data 370 using, for example, an application program. The print data 370 includes the control data 370a as shown in FIG. 34. The control data 370a may be determined upon the command, selection by the user, or independently of the user. The print data generating section 351 may produce the bibliographic data from the control data 370a of the print data 370, and then add the bibliographic data 370a to the print data 370. The bibliographic data 370a includes at least one value of the extended variable included in the control data 370a. For example, in the third embodiment, the bibliographic data includes the value of the extended variable of "DocumentName", the value of the extended variable of "Date," the value of the extended variable of UserName, the value of the extended variable of "AuthenticationData," and the value of the extended variable of "Page." If the user of the PC 350 commands to add the bibliographic data to the print data 370, the PC 350 adds the bibliographic data to the print data 370. The print data generating section 351 sends via the communicating section 155 the produced print data 370 to the printer 310 detected by the printer searching section 152.

{Operation}

Figure 38:
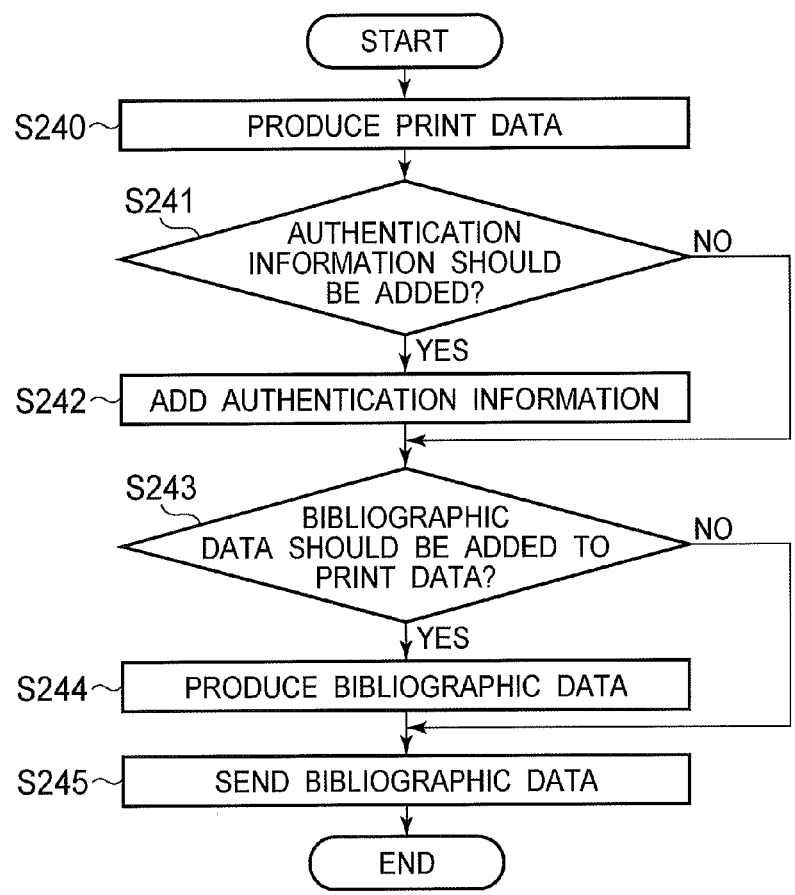
FIG. 38 is a flowchart illustrating the operation in which the PC according to the third embodiment produces the printed data and sends out the print data.

FIG. 38 is a flowchart illustrating the operation in which the PC 350 according to the third embodiment produces the printed data 370 and sends out the print data 370.

The flowchart shown in FIG. 38 is invoked, for example, when the user commands a printing operation of a document via the user interface 154.

The print data generating section 351 produces the print data from a document that is commanded to print (S240).

The print data generating section 351 makes a decision to determine whether the authentication information should be added to the print data (S241). For example, if the user of the PC 350 selects immediate printing via the user interface 154, the print data generating section 351 determines that no authentication information should be added (S241, NO) and the program proceeds to S243. If the user does not select immediate printing, the print data generating section 351 determines that authentication information should be added (S241, YES) and the program proceeds to S242.

At S242, the print data generating section 351 includes the authentication information into the print data produced at S240. For example, the print data generating section 351 sets the value of the extended variable of "Confidential" in line 10 of the print data 270 shown in FIG. 38, to "YES," and includes the authentication information of the user into the value of the extended variable "AuthenticationData" line 13. The print data generating section 351 receives the authentication information inputted by the user, for example, through the user interface 154.

At S243, the print data generating section 351 makes a decision to determine whether the bibliographic data should be added to the print data. For example, the print data generating section 351 makes a decision to determine whether the bibliographic data should be included into the print data by checking if the user of the PC 350 has selected inclusion of the bibliographic data via the user interface 154. If the print data generating section 351 determines that the bibliographic data should be included into the print data (S243, YES), the program proceeds to S244; if the print data generating section 351 determines that the bibliographic data should not be included into the print data (S243, NO), the program proceeds to S245.

At S244, the print data generating section 351 produces the bibliographic data and includes the produced bibliographic data into the print data produced at S240.

At S245, the print data generating section 351 sends the print data 370 or the print data 370 and the bibliographic data (if the bibliographic data has been added to the print data) to the printer 310 via the communicating section 155. The destination printer 310 to which the print data 370 is destined is any one of the printers 310 connected to the network 130. The destination printer 310 may be previously registered in the PC 350. For example, the user of the PC 350 or the administrator of the image forming system 300 may register via the interface 154 a printer 310 as a destination device to which the print data 370 should be sent.

As described above, the PC 350 according to the third embodiment produces the print data 370 and sends out the produced print data 370 to the printer 310.

Figure 39:
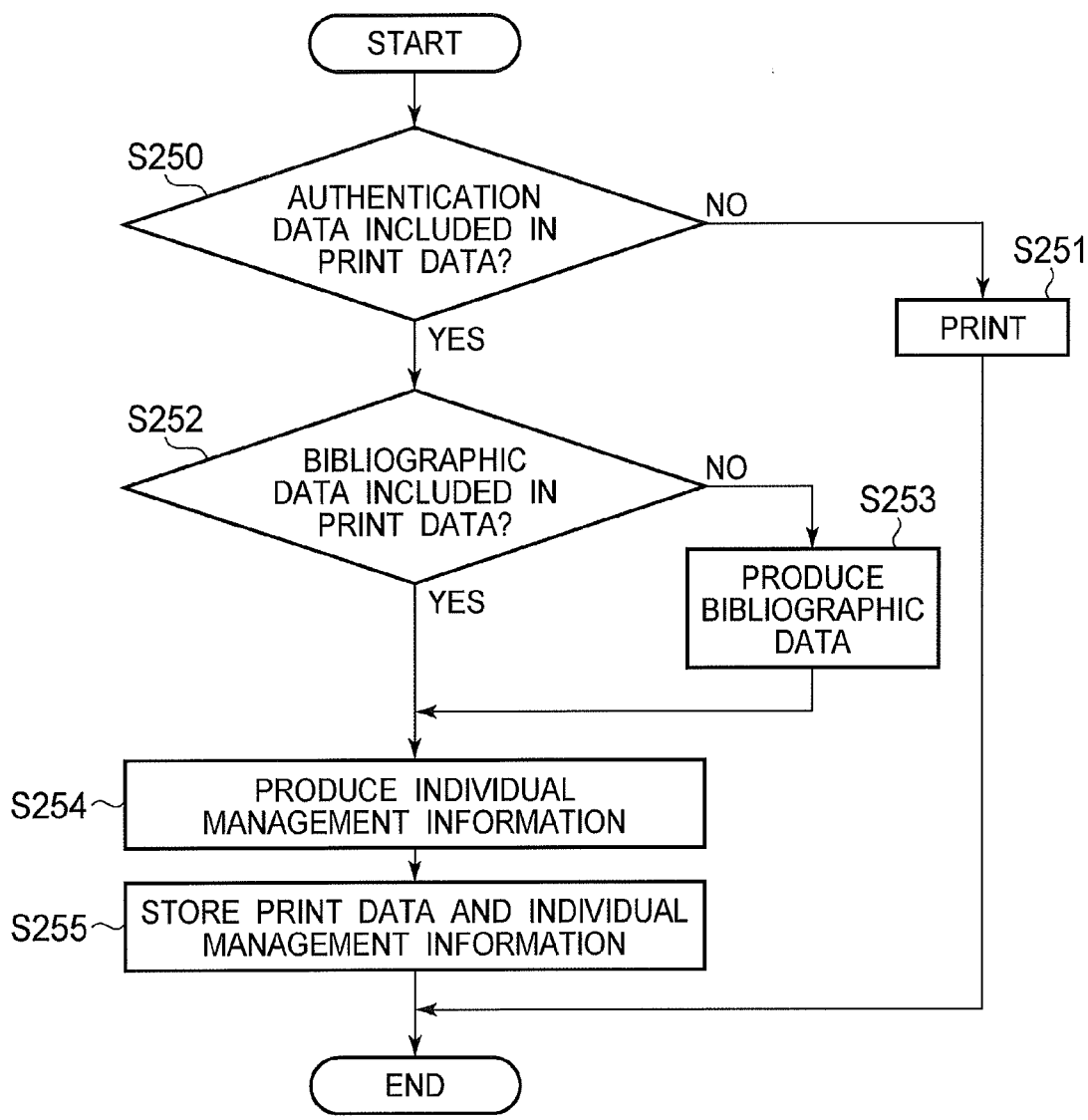
FIG. 39 is a flowchart illustrating the process for the printer according to the third embodiment to receive the print data.

FIG. 39 is a flowchart illustrating the process for the printer 310 according to the third embodiment to receive the print data 370. The flow starts when the printing controller 312 has obtained the print data 370 via the communicating section 119.

The printing controller 312 makes a decision to determine whether the print data 370 received via the communicating section 119 includes the authentication information (S250). If the authentication information is included (S250, YES), the program proceeds to S252; if the information is not included (S250, NO), the program proceeds to S251.

At S251, the printing controller 312 sends the received print data 370 to the printing section 111, which in turn prints the print data 370.

At S252, the printing controller 312 makes a decision to determine whether the print data 370 includes the bibliographic data therein. If the print data 370 includes the bibliographic data (S252, YES), the program proceeds to S254; if the print data 370 does not include the bibliographic data (S252, NO), the program proceeds to S253.

At S253, the printing controller 312 produces the bibliographic data from the value of the extended variable of the control data 370a included in the print data 370 (S253). The bibliographic data is such that at least the print data 370 can be identified.

At S254, the printing controller 312 includes the information that identifies the destination device of the print data 370 and the name of the print data 370 into the bibliographic data, thereby producing the individual management information (S254).

The printing controller 312 stores the received print data 370 into the memory 316, and adds a new record to the printing management table 371 held in the memory 316. The printing controller 312 then stores the individual management information produced at S254 into the record (S255).

As described above, when the printer 310 according to the third embodiment receives the print data 370 that includes the authentication information, the printer 310 stores the print data 370 into the memory 316, and the individual management information used for managing the print data 370 into the printing management table 371.

Figure 40:
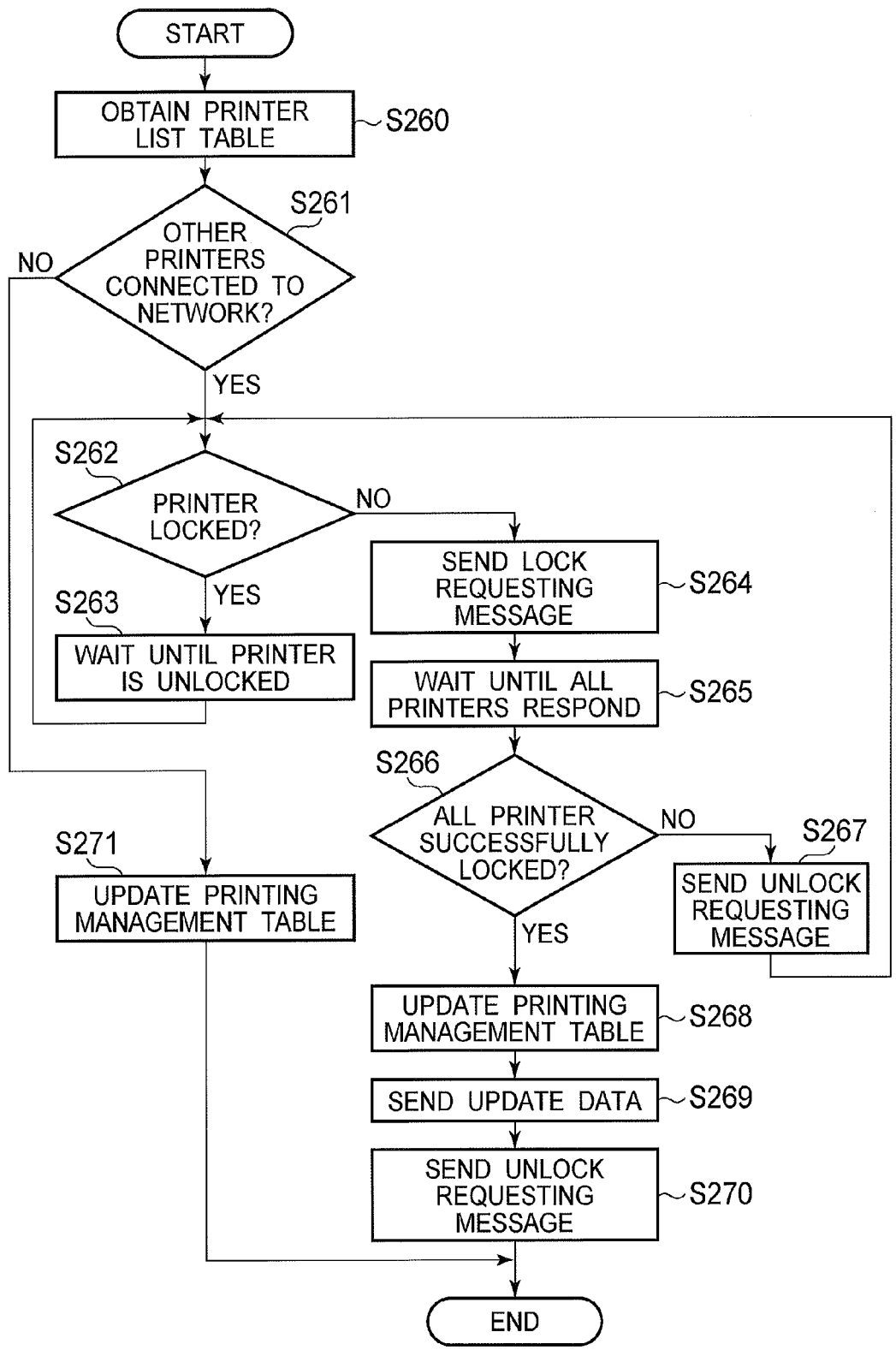
FIG. 40 is a flowchart illustrating the synchronization processing performed by the information management section.

FIG. 40 is a flowchart illustrating the synchronization processing performed by the information management section 313. The synchronization processing according to the third embodiment is a process in which the content of the printing management table 371 after update is sent to the other printers for storage, so that all of the printers connected to the network 130 can have the same content of the printing management table 371 held in the memory 316. The process shown in FIG. 40 starts when a change is to be made to the content of the printing management table 371 held in the memory 316.

The information management section 313 obtains the printer table 372 held in the memory 316 (S260). The information management section 313 refers to the obtained printer table 372 to determine whether there exist other printers 310 connected to the network 130 (S261). If at least one other printer is connected to the network 130, (S261, YES), the program proceeds to S262; if no printer is connected to the network 130 (S261, NO), the program proceeds to S271.

At S262, prior to the changing of the printing management table 371, the information management section 313 makes a decision to determine whether the printing management table 371 of the printer is locked by the other printer 310. If the printing management table 371 of the printer is locked (S262, YES), the program proceeds to S263; if the printing management table 371 of the printer is not locked (S262, NO), the program proceeds to S264.

At S263, the information management section 313 then waits until the other printer unlocks the printing management table 371 of the printer. Once the printer is commanded to unlock, the program proceeds to S262.

At S264, the information management section 313 sends a lock requesting message that requests the other printers 310, connected to the network 130, to halt changing the printing management table 371 via the communicating section 119.

The lock requesting message is sent to printers 310 whose printer table 372 obtained at S260, holds the information. The information management section 313 then waits until all the other printers have responded to the lock requesting message (S265). Once information management section 313 receives a response to the lock requesting message from all the other printers, the program proceeds to S266.

At S266, the information management section 313 makes a decision to determine whether the printing management tables 371 of all the other printers that received the lock requesting message have been successfully locked. For example, if the response from the printers that received the lock requesting message indicates that the lock requesting message was received successfully, the information management section 313 determines that the printing management table 371 of all the other printers 310 have been successfully locked. If at least one of the responses received from the other printers 310 indicates that the printing management table 371 of the other printers is not successfully locked, the information management section 313 determines that none of the printing management tables 371 of the other printers 310 has been successfully locked. If the printing management tables 371 of all the other printers have been locked successfully (S266, YES), the program proceeds to S268; if none of the other printers have been locked successfully (S266, NO), the program proceeds to S267.

At S267, the information management section 313 sends a unlock requesting message to the printers 310 that sent back a lock success response at S265. The information management section 313 does not send the unlock requesting message to the printer 310 that sent back a lock failure response. If the information management section 313 receives the unlock success response from all the printers, the program jumps back to S262.

At S268, the information management section 313 updates the printing management table 371 held in the memory 316. The information management section 313 then produces the update data that includes all the contents held in the printing management table 371 after update, and sends the update data to the other printers 310 connected to the network 130 via the communicating section 119 (S269). The destination printers are the other printers from which the lock requesting message was sent at S264. The information management section 313 sends out the unlock requesting message via the communicating section 119 (S270). The destination printers are the other printers to which the lock requesting message was sent at S264.

At S261, if it is determined that the other printers 310 does not exist (S261, NO), the program proceeds to S271 where the information management section 313 updates the printing management table 371 held in the memory 316.

As described above, when the printing management table 371 of a printer 310 according to the third embodiment is to be changed, the printing management tables 371 held in the other printers 310 are first locked, and then the content of the printing management table of the printer 310 is changed. The other printers are notified of the changed content of the printing management table 371. This configuration prevents a case in which while a change is being made in the printing management table 371 of a printer, a change is also made in the other printing management table 371 of other printer(s) which would cause the contents in the printing management tables 371 of the printers to become different from each other.

According to the flowchart shown in FIG. 40, at S269, the information management section 313 sends all of the updated contents of the printing management table 371 to the other printers 310. However, the invention is not limited to this. For example, the information management section 313 may send to other printers 310 only the updated content of the printing management table 371 as update data.

Figure 41:
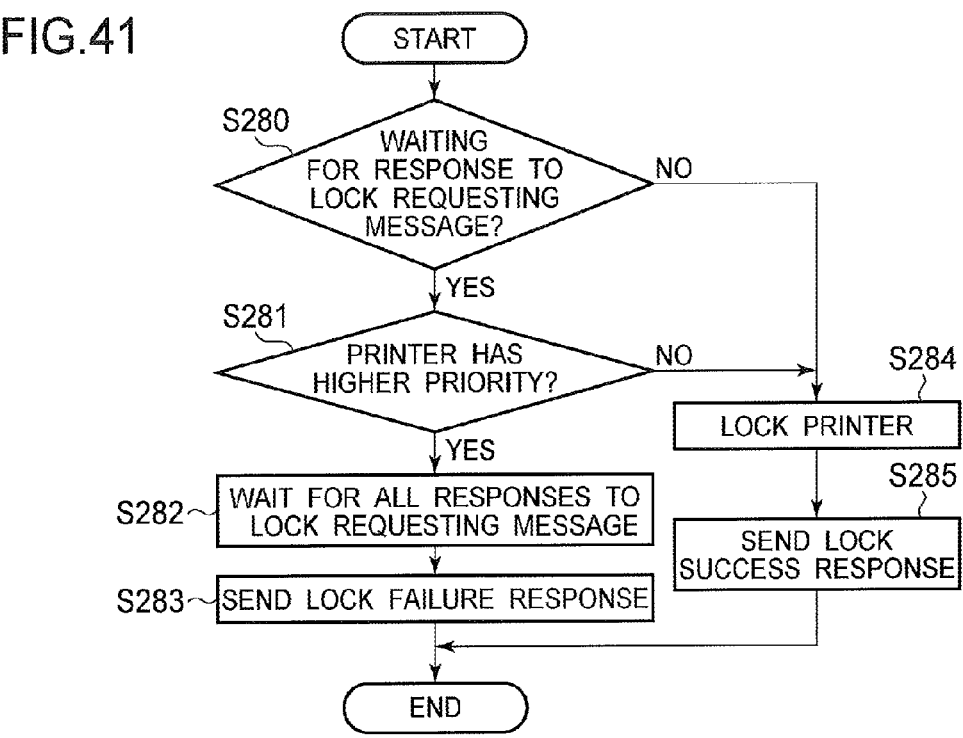
FIG. 41 is a flowchart illustrating the process when a printer receives a lock requesting message.

FIG. 41 is a flowchart illustrating the process when a printer 310 receives the lock requesting message. The flow starts when the information management section 313 of the printer 310 has obtained the lock requesting message from the other printers 310 via the communicating section 119.

The printer might have sent out a lock requesting message and therefore may be waiting for a lock success response from other printers. Therefore, the information management section 313 first makes a decision to determine whether the printer 310 is waiting for a response to the lock requesting message (S280). If the information management section 313 is waiting for the response (S280, YES), the program proceeds to S281; if the information management section 313 is not waiting for the response (S280, NO), the program proceeds to S284.

At S281, the information management section 313 makes a decision to determine whether the printer has a higher priority level than the other printer 310 that sent out the received lock requesting message. If the printer has a higher priority level (S281, YES), the program proceeds to S282; if the printer has a lower priority level (S281, NO), the program proceeds to S284.

At S282, the information management section 313 waits for all the responses to the lock requesting message that sent to the other printers. When the information management section 313 receives all responses to the lock requesting message sent out from the printer, the information management section 313 sends the lock failure response received from the other printer to the other printer 310 which is a source device of the lock requesting message, the lock failure response indicating that the device was not successfully locked (S283).

At S284, the information management section 313 locks the printing management table 371 of the printer to which the information management section 313 belongs, so that the printing management table 371 cannot be changed. Once the printing management table 371 is locked, the information management section 313 cannot perform any processing on the printing management table 371 except when the information management section 313 performs the process based on the update data received from the printer 310 that commanded to lock. For this reason, the information management section 313 stores information (e.g., IP address), which identifies a printer 310 that sent out the lock requesting message, into the memory 316. When the information management section 313 has locked the printing management table 371, if the information management section 313 receives the lock requesting message from another printer 310, the printing management table 371 is again locked, i.e., double-locked. The information management section 313 then sends the lock success response to the other printers 310 that sent the lock requesting message, the lock success response indicating that the printing management table 371 of the printer has been successfully locked in response to the lock requesting message (S285).

As described above, when the lock requesting message is received, if the printer has not sent a lock requesting message yet, the information management section 313 locks the printing management table 371 of the printer to which the printing management table 371 belongs. If the printer has sent out a lock requesting message, the information management section 313 checks the priority level of the printer to which the information management section 313 belongs, to determine whether the printing management table 371 of the printer should be locked. The flow may be altered as follows: For example, before S280 is executed, the information management section 313 makes a decision to determine whether the information about a printer 310 that sent out the lock requesting message has been stored in the printer table 372. If the information has not been stored in the printer table 372, the process shown in FIG. 41 may be terminated.

According to the process shown in FIG. 41, the information management section 313 waits until the printer 310 receives all responses in reply to the lock requesting message sent out from the printer (S282), and then sends the lock failure response (S283). However, the invention is not limited to this. For example, the information management section 313 may send out the lock failure response before the printer receives all responses replying to the printer to which the information management section 313 belongs.

Figure 42:
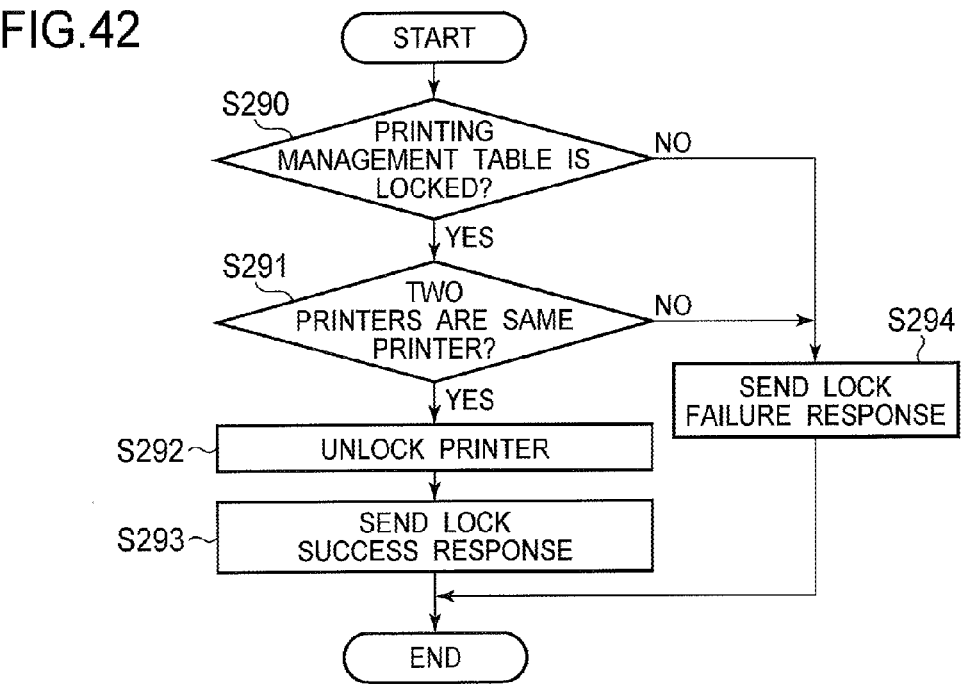
FIG. 42 is a flowchart illustrating the process when a printer receives an unlock requesting message.

FIG. 42 is a flowchart illustrating the process when a printer 310 receives the unlock requesting message. The flow starts when the information management section 313 has received the unlock requesting message from the other printers 310 via the communicating section 119.

The information management section 313 makes a decision to determine whether the printing management table 371 of the printer to which the information management section 313 belongs has been locked (S290). If the printing management table 371 has been locked (S290, YES), the program proceeds to S291; if the printing management table 371 has not been locked yet (S290, NO), the program proceeds to S294.

At S291, the information management section 313 makes a decision to determine whether a printer 310 that sent out the lock requesting message is the same as a printer 310 that is a source device of the unlock requesting message. In other words, the information management section 313 can check the IP addresses of these two printers to determine whether these two printers 310 are one and the same printer. If these two printers 310 are one and the same printer, (S291, YES), the program proceeds to S292; if these two printers 310 are not one and the same printer, (S291, NO), the program proceeds to S294.

At S292, the information management section 313 unlocks the printing management table 371 of the printer in response to the obtained unlock requesting message. If the printing management table 371 of the printer is maintained at a locked state under a plurality of lock requesting messages, the printing management table 371 of the printer is maintained at the locked state until the information management section 313 receives the unlock requesting messages for all of the lock requesting messages. The information management section 313 sends the unlock success response in response to the unlock requesting message, via the communicating section 119, to the other printers 310 that sent the unlock requesting message (S293).

At S294, the information management section 313 sends the unlock failure response responding to the unlock requesting message to the other printers 310 that sent the unlock requesting message.

As described above, upon reception of the unlock requesting message, the information management section 313 according to the third embodiment makes a decision to determine whether a printer that sent the lock requesting message and a printer that sent the unlock requesting message are one and the same printer, and then unlocks the printer.

Figure 43:
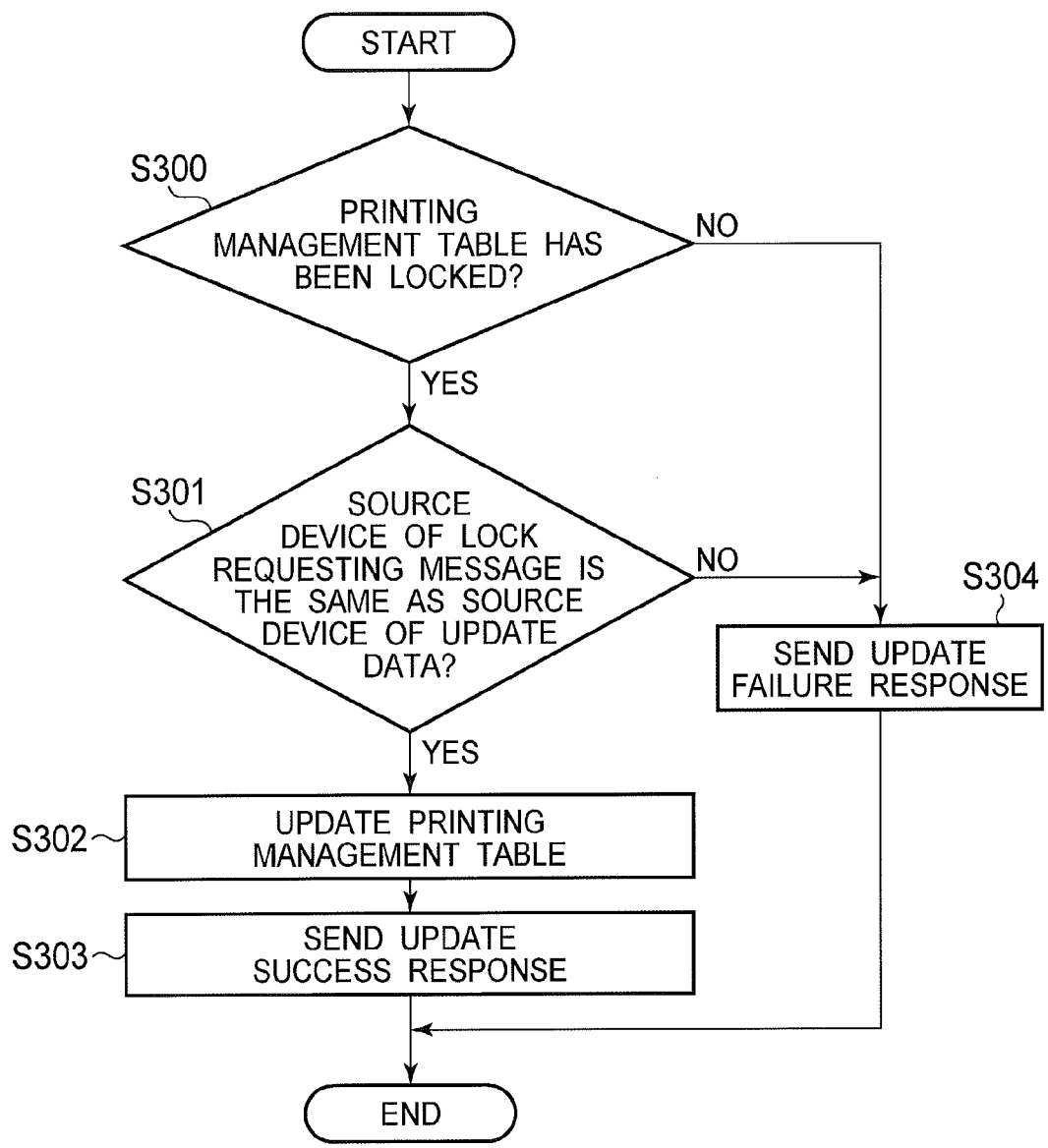
FIG. 43 is a flowchart illustrating the process when a printer receives the update data.

FIG. 43 is a flowchart illustrating the process when the printer 310 receives the update data. The flow starts when the information management section 313 has received the update data from the other printer via the communicating section 119.

The information management section 313 makes a decision to determine whether the printing management table 371 of the printer has already been locked (S300). If the printing management table 371 has already been locked (S300, YES), the program proceeds to S301; if the printing management table 371 has not been locked yet (S300, NO), the program proceeds to S304.

At S301, the information management section 313 makes a decision to determine whether a printer 310 that sent out the lock requesting message and caused the printing management table 371 of the printer to be locked is the same as a printer 310 that sent out the update data. In other words, the information management section 313 can check the IP addresses of these two printers to determine whether these two printers 310 are one and the same printer. If these two printers 310 are one and the same printer, (S301, YES), the program proceeds to S302; if these two printers 310 are not one and the same printer, (S301, NO), the program proceeds to S304.

At S302, the information management section 313 updates the printing management table 371 held in the memory 316 in accordance with the content of the received update data. For example, the information management section 313 replaces all the information held in the printing management table 371 with the information described by the received update data, thereby updating the printing management table 371. The information management section 313 sends the update success response responding to the update data to the printer 310 that sent the update data (S303).

At S304, the information management section 313 sends the update failure response responding to the update data to the other printers 310 that sent out the update data.

If the information management section 313 receives only the updated content as update data, the information management section 313 updates the printing management table 371 only with the information corresponding to the updated content.

Figure 44:
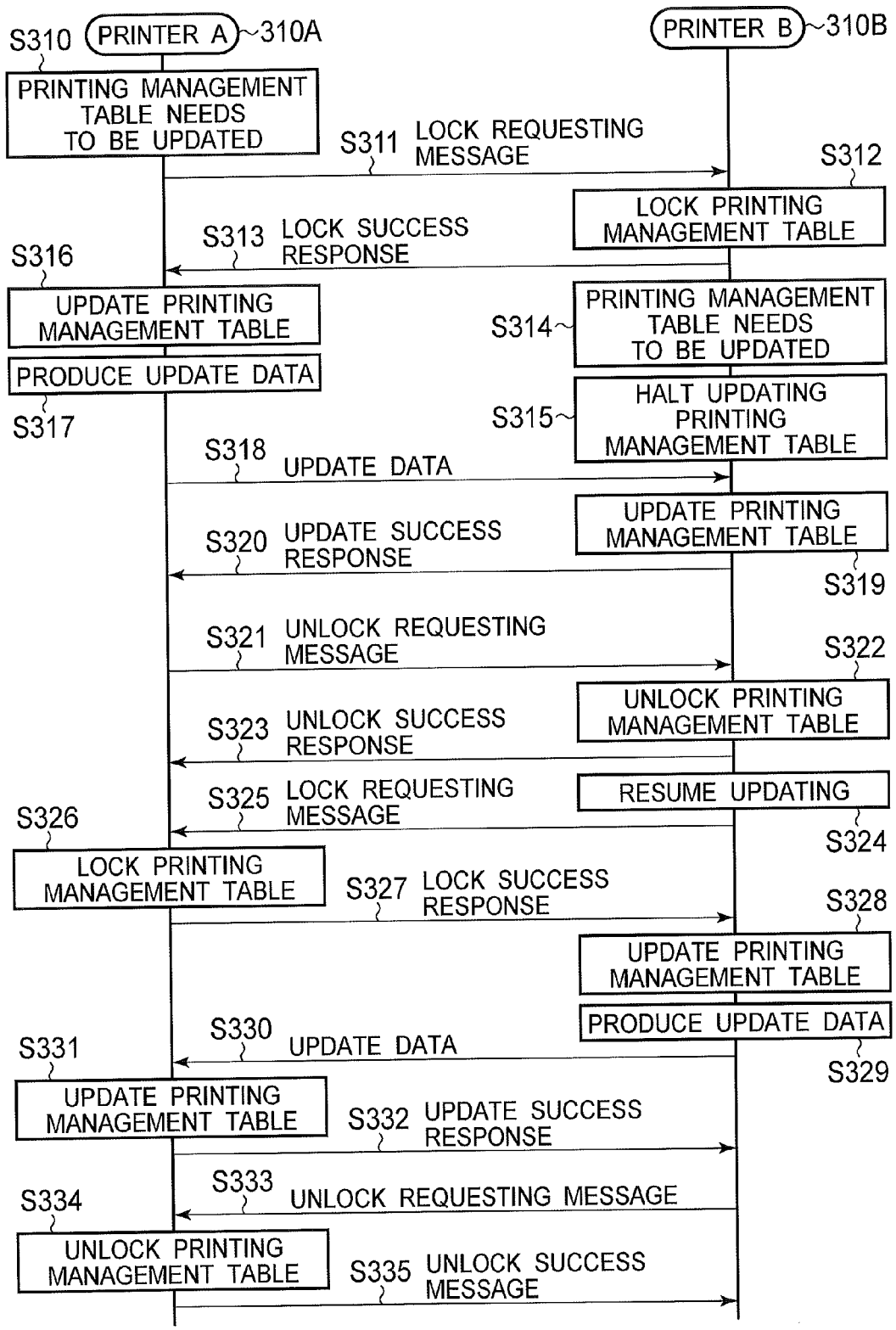
FIG. 44 is a sequence diagram illustrating the synchronization processing for the printing management table in the image forming system according to the third embodiment.

FIG. 44 is a sequence diagram illustrating the synchronization processing performed on the printing management table 371 in the image forming system 300 according to the third embodiment. FIG. 44 assumes that a printer 310A and a printer 310B are connected to the network. The configuration of the printer 310A and printer 110B is the same as that shown in FIG. 33. The printer 310A and printer 310B have their printer names "printer A" and "printer B," respectively.

An event occurs that requires the printing management table 371 of the printer 310A to be updated (S310). For example, the printer management table 371 needs to be updated (1) when a printing controller 312A has received the print data 370 from the PC 350 via the communicating section 119A, (2) when the printing controller 312A has performed printing of the print data 370, or (3) when the printing controller 312A deletes the print data 370 in response to the command from the user. The information management section 313A sends the lock requesting message to the printer 310B via the communicating section 119A.

Once the printer 310B receives the lock requesting message, the information management section 313B halts changing the printing management table 371 of the printer 310B in response to the lock requesting message from the printer 310A (S312). The information management section 313B then sends the lock success response responding to the lock requesting message via the communicating section 119 (S313).

An event then occurs that requires the printing management table 371 in the printer 310B to be updated (S314). For example, the printer management table 371 needs to be updated (1) when a printing controller 312B has received the print data 370 from the PC 350 via the communicating section 119B, (2) when the printing section 111B has performed printing of the print data 370, or (3) when the printing controller 312B has deleted the print data 370 in response to the command from the user. Since the printing management table 371 of the printer 310B has been locked, the information management section 313B halts the process for updating the printing management table 371 (S315).

When the printer 310A has received the lock success response from the printer 310B, the information management section 313A updates the printing management table 371 held in the memory 316 (S316). The information management section 313A produces update data that includes all the contents of the updated printing management table 371 (S317), and sends the produced update data to the printer 310B via the communicating section 119 (S318).

Once the printer 310B receives the update data, the information management section 313B replaces all the information held in the printing management table 371 held in the memory 316B with the information described by the received update data, thereby updating the printing management table 371 (S319). As a result, the printing management table 371 of the printer 310A and the printing management table 371 of the printer 310B have the same content, thereby completing the synchronization processing. The information management section 313B then sends the update success response, which indicates that the printing management table 371 has been successfully updated, to the printer 310A via the communicating section 119B (S320). When the printer 310A receives the update success response indicative of successful update, the information management section 313A sends the unlock requesting message to the printer 310B via the communicating section 119A. (S321).

When the printer 310B has received the unlock requesting message, the information management section 313B unlocks the printing management table 371 of the printer 310B (S322), and sends the unlock success response responding to the unlock requesting message to the printer 310A via the communicating section 119B (S323). The information management section 313B then resumes updating the printing management table halted at S315 (S324). The information management section 313B sends the lock requesting message to the printer 310A via the communicating section 119B (S325).

When the printer 310A has received the lock requesting message, the information management section 313A halts changing of the printing management table 371 of the printer 310A (S326). The information management section 313A sends the lock success response in reply to the lock requesting message to the printer 310B via the communicating section 119A (S327).

When the printer 310B has received the lock success response from the printer 310A, the information management section 313B updates the printing management table 371 held in the memory 316B (S328). The information management section 313B produces the update data that includes all the contents of the updated printing management table 371 (S329), and then sends the produced update data to the printer 310A via the communicating section 119B (S330).

When the printer 310A has received the update data, the information management section 313A replaces all the information held in the printing management table 371 held in the memory 316A with the information described by the received update data, thereby updating the printing management table 371 (S331). The information management section 313A then sends the update success response responding to the update data to the printer 310B that sent the update data via the communicating section 119B (S332). When the printer 310B has received the update success response, the information management section 313 sends the unlock requesting message to the printer 310A via the communicating section 119B (S333).

When the printer 310A has received the unlock requesting message, the information management section 313A unlocks the printing management table 371 of the printer 310A (S334). The information management section 313A sends the unlock success response responding to the unlock requesting message to the printer 310B via the communicating section 119A (S335).

As described above, when the printing management table 371 remains locked, if an event occurs that requires the printing management table 371 to be updated, the information management section 313 of each of a plurality of printers 310 is unable to change the content in the printing management table 371 of the printer until the printing management table 371 is unlocked. Thus, the printing management tables 371 of the plurality of printers 310 can have the identical contents.

Figure 45:
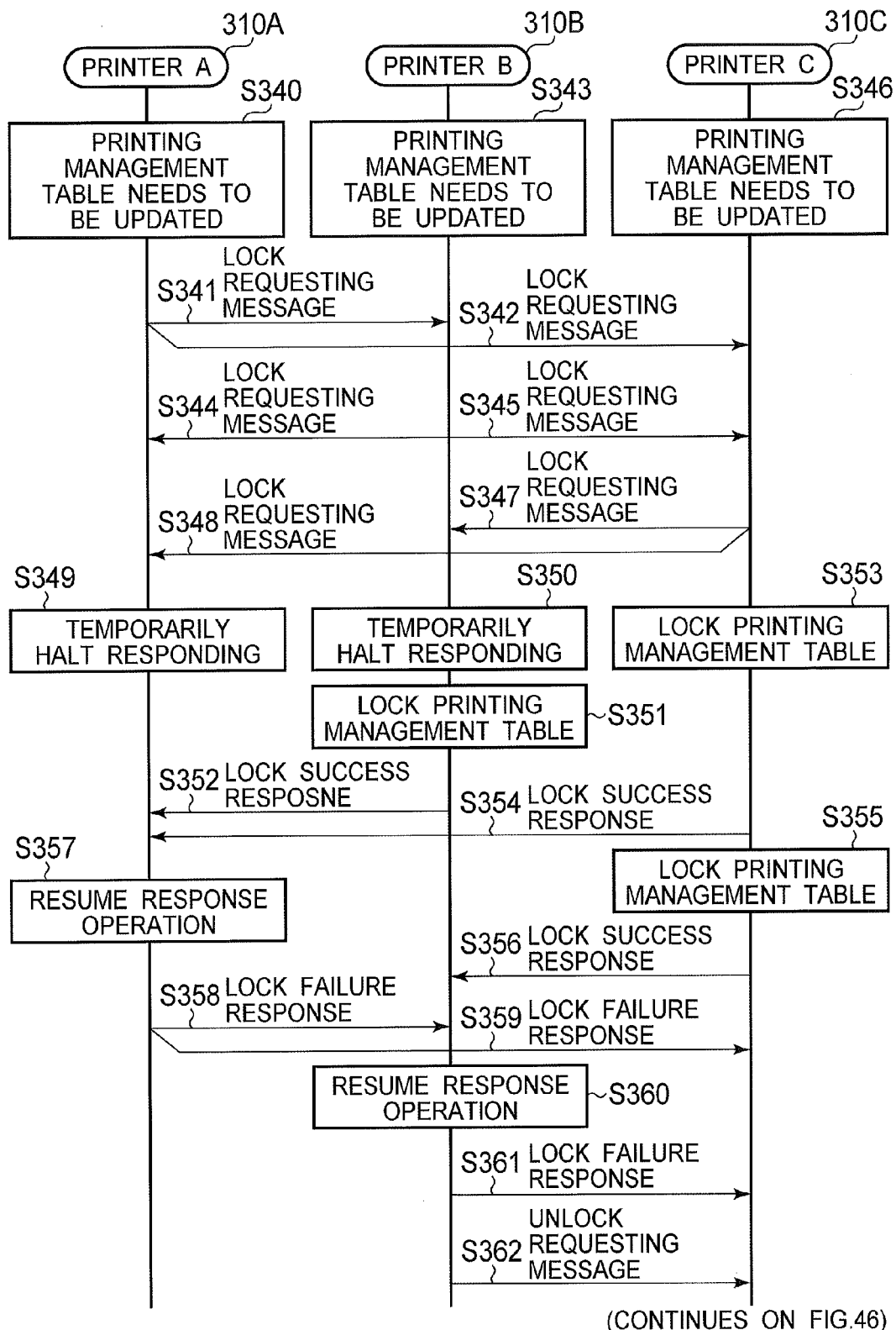
FIG. 45 is a first portion of a sequence diagram illustrating the process when the printing management tables of a plurality of printers need be updated.
Figure 46:
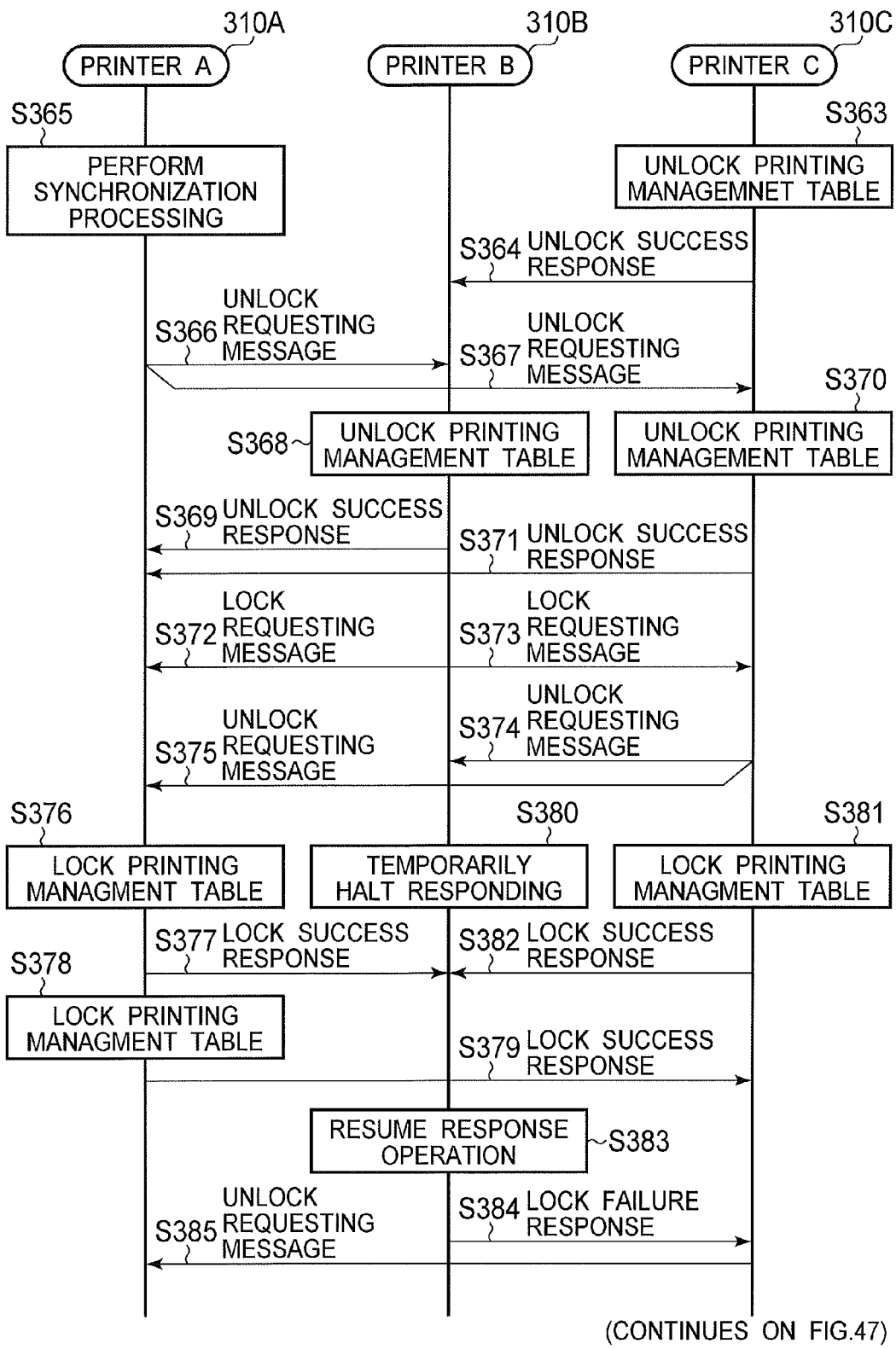
FIG. 46 is a second portion of the sequence diagram.
Figure 47:
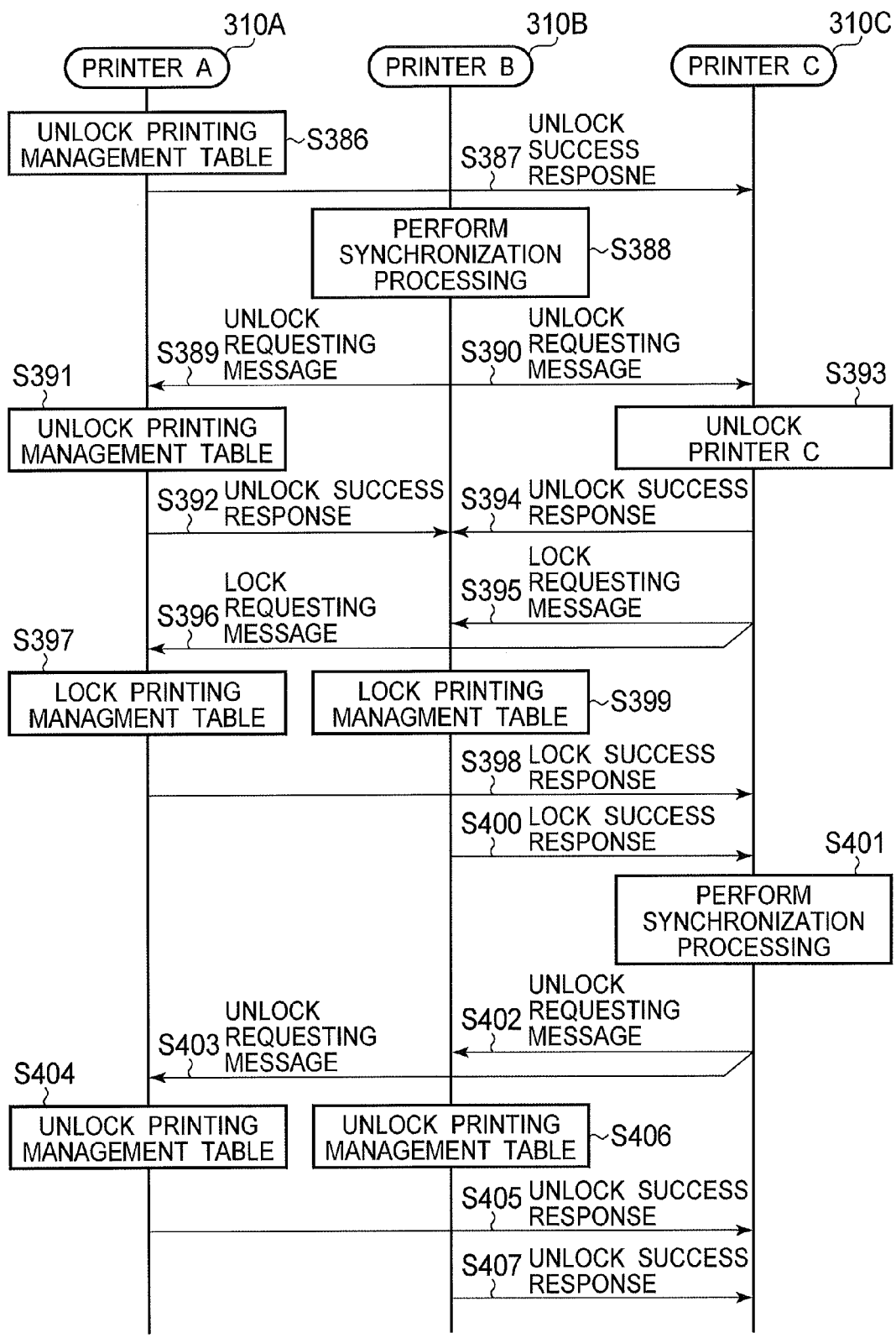
FIG. 47 is a second portion of the sequence diagram.

FIG. 45 is a first portion of a sequence diagram illustrating the process when the printing management tables 371 of a plurality of printers 310 need be updated, and FIG. 46 is a second portion of the sequence diagram, and FIG. 47 is a third portion of the sequence diagram. The sequence diagram assumes that printers 310A, 310B, and 310C are connected to the network 130 and are given priority levels in the order of the printers 310A, 310B, and 310C. The printer 310A, printer 310B, and printer 310C have their printer names "printer A," "printer B," and "printer C," respectively.

When an event occurs that requires the printing management table 371 of the printer 310A to be updated (S340), the information management section 313A of the printer 310A refers to the printer table 372 held in the memory 316A, and then sends the lock requesting message to the printers 310B and 310C via the communicating section 119A (S341, S342).

When an event occurs that requires the printing management table 371 of the printer 310B to be updated (S343), the information management section 313B of the printer 310B refers to the printer table 372 held in the memory 316B, and then sends the lock requesting message to the printers 310A and 310C via the communicating section 119B (S344, S345).

When an event occurs that requires the printing management table 371 of the printer 310C to be updated (S346), the information management section 313C of the printer 310C refers to the printer table 372 held in the memory 316C, and then sends the lock requesting message to the printers 310A and 310B via the communicating section 119C (S347, S348).

The information management section 313A of the printer 310A temporarily halts responding to the printers 310B and 310C (S349). This is because the printer 310A has sent out the lock requesting message and has a higher priority level than either the printer 310B or printer 310C. The information management section 313A does not respond until the information management section 313A receives all the responses in reply to the lock requesting message.

The information management section 313B of the printer 310B is temporarily prevented from responding to the printer 310C (S350). This is because the printer 310B has sent out the lock requesting message and has a higher priority level than the printer 310C. The information management section 313B does not respond until the information management section 313B receives all the responses in reply to the lock requesting message except the response from the printer 310A. The information management section 313B accepts the lock requesting message from the printer 310A, and then prevents the printing management table held in the memory 316B from being changed (S351). The information management section 313B then sends the lock success response responding to the lock requesting message to the printer 310A via the communicating section 119B (S352)

The information management section 313C of the printer 310C accepts the lock requesting message from the printer 310A, and prevents the printing management table 371 held in the memory 316C from being changed (S353). The information management section 313C then sends the lock success response responding to the lock requesting message to the printer 310A (S354). The information management section 313C accepts the lock requesting message from the printer 310B, and prevents the printing management table 371 held in the memory 316C from being changed (S355). The information management section 313C then sends the lock success response to the printer 310B via the communicating section 119C (S356).

When the printer 310A has received the lock success response from the printers 310B and 310C, the information management section 313A resumes the response operation that was temporarily halted at S349 (S357). This is because the information management section 313A received the lock success response from all the printers, i.e., 310B and 310C. The information management section 313A sends to the printers 310B and 310C the lock failure response responding to the lock requesting message sent at S344 and S348 (S358, S359).

The information management section 313B of the printer 310B resumes the response operation that was temporarily halted at S350 (S360). This is because the printer 310B has received all the responses from all the printers, i.e., the printers 310A and 310C. The information management section 313B sends the lock failure response to the printer 310C, responding to the lock requesting message sent at S347 (S361). The information management section 313B sends the unlock requesting message to the printer 310C via the communicating section 119B (S362). This is because the printer 310B failed to lock the printer 310A, and therefore not all the printers have been successfully locked.

When the printer 310C has received the unlock requesting message from the printer 310B, the information management section 313C unlocks the printing management table 371 of the printer 310C that was locked by the printer 310B (S363). The information management section 313C sends the unlock success response to the printer 310B via the communicating section 119C (S364). It is to be noted that the information management section 313C still maintains the printer 310C, which was locked by the printer 310A, in a locked state.

The information management section 313A of the printer 310A performs the synchronization processing in which the information management section 313A updates the printing management table 371 of the printer 310A (S365), and sends the update data indicative of the content of the updated printing management table 371 to the printers 310B and 310C, so that the printing management tables 171 of the printers 310A, 310B, and 310C can have the identical updated printing management information. The information management section 313A sends the unlock requesting message to the printers 310B and 310C via the communicating section 119A (S366, S367).

When the printer 310B receives the unlock requesting message, the information management section 313B unlocks the printing management table 371 of the printer 310B that was locked by the printer 310A (S368). The information management section 313B sends the unlock success response responding to the unlock requesting message to the printer 310A via the communicating section 119B (S369).

When the printer 310C has received the unlock requesting message, the information management section 313C unlocks the printing management table 371 of the printer 310C that was locked by the printer 310A (S370). The information management section 313C sends the unlock success response responding to the unlock requesting message to the printer 310A (S371).

The information management section 313B of the printer 310B refers to the printer table 372 held in the memory 316B, and then again sends the lock requesting message to the printers 310A and 310C via the communicating section 119B (S372, S373).

The information management section 313C of the printer 310C also refers to the printer table 372 held in the memory 316C, and sends the lock requesting message to the printers 310A and 310B via the communicating section 119C (S374, S375). The steps S372 to S375 are carried out simultaneously.

The information management section 313A of the printer 310A accepts the lock requesting message from the printer 310B, and then prevents the printing management table 371 held in the memory 316A from being changed (S376). The information management section 313A then sends the lock success responses responding to the lock requesting message to the printer 310B via the communicating section 119A (S377). The information management section 313A accepts the lock requesting message from the printer 310C and prevents the printing management table 371 held in the memory 316A from being changed (S378). The information management section 313A then sends the lock success response responding to the lock requesting message to the printer 310C via the communicating section 119A (S379).

The information management section 313B of the printer 310B temporarily halts the response operation (S380). This is because the printer 310B has sent out the lock requesting message and has a higher priority level than the printer 310C. The information management section 313B does not respond until the information management section 313B receives all the responses in reply to the lock requesting message.

The information management section 313C of the printer 310C accepts the lock requesting message from the printer 310B, and prevents the printing management table 371 held in the memory 316C from being changed (S381). The information management section 313C then sends the lock success responses responding to the lock requesting message to the printer 310B via the communicating section 119C (S382).

After the printer 310B receives the lock success responses from the printers 310A and 310C, the information management section 313B resumes the process for the response operation halted at S380 (S383). This is because the printer 310B has received all the responses from the other printers, i.e., the printers 310A and 310C. The information management section 313B then sends the lock failure response responding to the lock requesting message at S374 (S384).

The information management section 313C of the printer 310C sends the unlock requesting message to the printer 310A via the communicating section 119C (S385). This is because the printer 310C failed to lock the printer 310B and therefore not all printers are locked.

When the printer 310A has received the unlock requesting message from the printer 310C, the information management section 313C unlocks the printer 310A (S386). The information management section 313A sends the unlock success response responding to the unlock requesting message to the printer 310C via the communicating section 119A (S387). However, the information management section 313A remains locked in response to the lock requesting message received from the printer 310B.

The information managing section 313B of the printer 310B performs the synchronization processing of the printing management table 371 (S388). In other words, the information management section 313B updates the printing management table 371 of the printer 310B, and sends the update data indicative of the content of the updated printing management table 371 to the printers 310A and 310C, so that the printing management tables 171 of the printers 310A, 310B, and 310C can have the identical updated printing management information. The information management section 313B then sends the unlock requesting message to the printers 310A and 310C (S389, S390).

When the printer 310A receives the unlock requesting message, the information management section 313A unlocks the printer 310A that was locked by the printer 310B (S391). The information management section 313A sends the unlock success response responding to the unlock requesting message to the printer 310B via the communicating section 119A (S392).

When the printer 310C has received the unlock requesting message, the information management section 313C unlocks the printing management table 371 of the printer 310C that was locked by the printer 310B (S393). The information management section 313C sends the unlock success response responding to the unlock requesting message to the printer 310B (S394).

The information management section 313C refers to the printer table 372 held in the memory 316C, and again sends the lock requesting message to the printers 310A and 310B via the communicating section 119C (S395, S396).

The information managing section 313A of the printer 310A accepts the lock requesting message from the printer 310B, and prevents the printing management table 371 held in the memory 316A from being changed (S397). The information managing section 313A then sends the lock success responses responding to the lock requesting message to the printer 310C via the communicating section 119A (S398).

The information managing section 313B of the printer 310B accepts the lock requesting message from the printer 310C, and prevents the printing management table 371 held in the memory 316B from being changed (S399). The information managing section 313B sends the lock success responses responding to the lock requesting message to the printer 310C via the communicating section 119B (S400).

The information managing section 313C of the printer 310C performs the synchronization processing of the printing management table 371 (S401). In other words, the information management section 313C updates the printing management table 371 of the printer 310C, and sends the update data indicative of the content of the updated printing management table 371 to the printers 310A and 310B so that the printing management tables 171 of the printers 310A, 310B, and 310C can have the updated printing management information with identical contents therein. The information management section 313C sends the unlock requesting message to the printers 310A and 310B (S402, S403).

When the printer 310A receives the unlock requesting message, the information management section 313A unlocks the printer 310A that has been locked in response to the lock requesting message from the printer 310C (S404). The information management section 313A sends the unlock success response responding to the unlock requesting message to the printer 310C via the communicating section 119A (S405).

When the printer 310B has received the unlock requesting message, the information management section 313B unlocks the printer 310C that has been locked in response to the lock requesting message (S406). The information management section 313B sends via the communicating section 119B the unlock success response responding to the unlock requesting message to the printer 310C (S407).

As described above, the image forming system 300 according to the third embodiment operates as follows: If a plurality of printers 310 try to lock the printing management tables 371 of other printers, a printer having a higher priority level is allowed to lock other printers having lower priority levels so that the contents of the printing management tables 371 of the printers may be updated in order.

Figure 48:
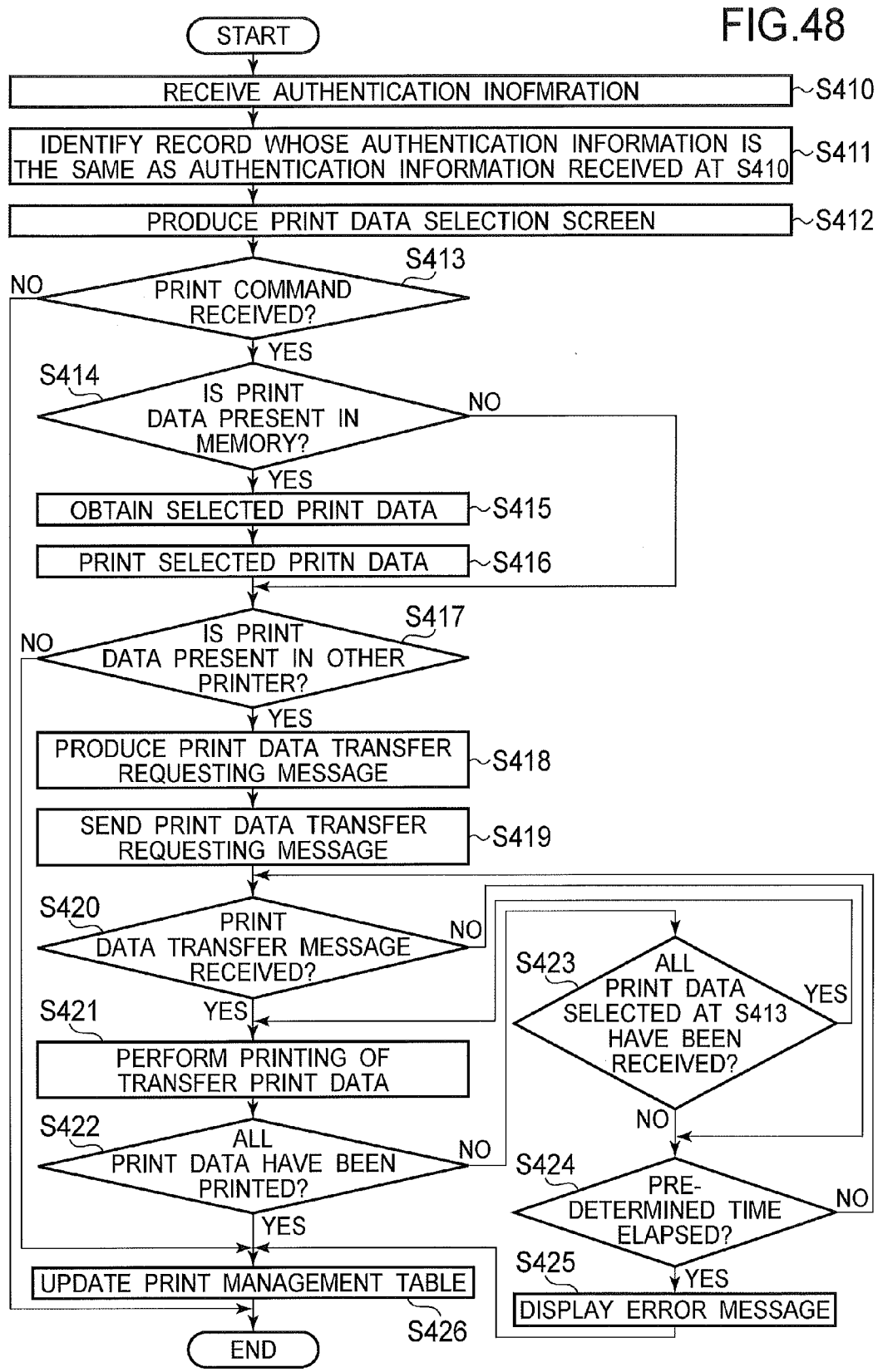
FIG. 48 is a flowchart illustrating the process when the printer according to the third embodiment prints the print data to which authentication information has been added.

FIG. 48 is a flowchart illustrating the process when the printer 310 according to the third embodiment prints the print data 370 to which authentication information has been added. The flow starts when the authenticating section 117 has successfully completed authentication of a user.

The printing controller 312 receives the authentication information from the authenticating section 117 (S410). The printing controller 312 then identifies a record whose authentication information field 371e holds the same authentication information as was received at S410 (S411). The printing controller 312 then extracts from the identified record the information required for selecting the print data 370. Based on the extracted information, the printing controller 312 produces a print data selection screen 380 (S412). The printing controller 112 causes the user interface 118 to display the produced print data selection screen 380, being ready for accepting a selection made by the user. The print data selection screen 380 is a selection screen for the authenticated user to select an item of print data 370 from items of print data ready for printing.

Figure 49:
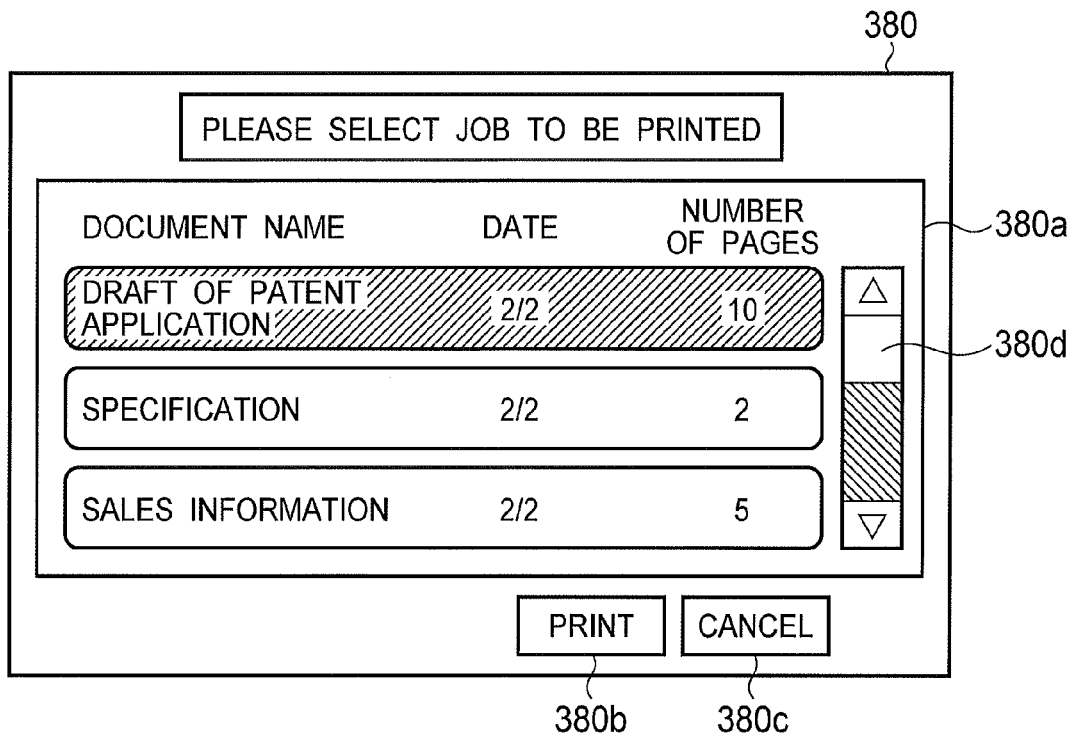
FIG. 49 illustrates an example of the print data selection screen according to the third embodiment.

FIG. 49 illustrates an example of the print data selection screen 380. The print data selection screen 380 includes a print data selection area 380a, a print command area 380b, and a cancellation command area 380c. The print data selection area 380a receives selection of the print data 170. For example, the print data selection area 380a includes a document name of the print data, a month and day, and the number of pages of the print data. The user checks the print data 370 that should be printed in terms of the displayed document name of the print data, month and day, and the number of pages of the print data, thereby selecting his desired print data 370. The excess items of print data 370 that cannot be displayed in the print data selection area 380a may be moved into the screen by moving the scroll bar 380d downward. When the user selects an item of print data 370 from the print data selection area 380a and commands to print the selected print data 370 through the print command area 380b, the user interface 118 sends the print command and information selected at the print data selection area 380a to the printing controller 312. When the user selects a command in the cancel command area 380c, the user interface 118 sends a cancel command to the printing controller 312.

Referring back to FIG. 48, the printing controller 312 receives a command inputted by the user through the user interface 118 (S413). Upon reception of a print command from the user interface 118, the program proceeds to S414. Upon reception of a cancel command from the user interface 118, the program ends. If no command is inputted within a predetermined period of time, the printing controller 312 may determine that a cancel command has been inputted, in which case, the program ends.

At S414, the printing controller 312 makes a decision to determine whether the print data selected at S413 is present in the memory 316 of the printer. If the print data 370 is present in the memory 316 (S414, YES), the program proceeds to S415; if the print data 370 is not present in the memory 316 (S414, NO), the program jumps to S417.

At S415, the printing controller 312 obtains the print data 370 selected at S413 from the memory 316 of the printer, in which case, the printing controller 312 deletes the print data 370 obtained from the memory 316 not to leave the print data 370 in the memory 316.

The printing controller 312 sends the print data obtained at S415 to the printing section 111 which in turn prints the print data 370 (S416).

The printing controller 312 then makes a decision to determine whether the print data 370 selected at S413 is present in the other printer 310. If the print data 370 is present in the other printer 310 (S417, YES), the program proceeds to S418; if the print data 370 is not present in the other printer 310 (S417, NO), the program jumps to S426.

At S418, the printing controller 312 produces a print data transfer requesting message for requesting transfer of the print data 370 that is selected at S413 and is found to be present in the other printer 310. The print data transfer requesting message includes information that identifies the print data 370 that is selected at S413 and is found to be present in the other printer 310. For example, the information that identifies the print data 370 includes the name of the print data 370. The name of print data 370 is held in the name field 371h of the printing management table 371. The printing controller 312 sends the produced print data transfer requesting message to the printer that holds the print data 370 selected at S413 (S419).

The printing controller 312 makes a decision to determine whether the printer has received a print data transferring message responding to the print data transfer requesting message transmitted at S419 (S420). If the printer has received the print data transferring message (S420, YES), the program proceeds to S421; if the printer has not received the print data transferring message (S420, NO), the program jumps to S424.

At S421, the printing controller 312 extracts the print data 370 from the print data transferring message. The printing controller 312 then sends the extracted print data 370 to the printing section 111, which in turn prints the print data 370.

The printing controller 312 checks all the print data 370 selected at S413 to determine whether all the print data has been printed (S422). If all the print data 370 has been printed out (S422, YES), the program proceeds to S426 where the program ends; if at least an item of print data 370 has not been printed out yet (S422, NO), the program jumps to S423.

At S423, the printing controller 312 makes a decision to determine whether all the print data 370 selected at S413 and held in the other printer 310 has been received. If all the print data 370 held in the other printer 310 has been received (S423, YES), the program jumps back to S421; if at least an item of the print data held in the other printer has not been received yet (S423, NO), the program proceeds to S424.

At S424, the printing controller 312 makes a decision to determine whether a predetermined time period has elapsed since the print data transfer requesting message was sent out at S419. If the predetermined time has elapsed (S424, YES), the program proceeds to S425; if the predetermined time has not elapsed yet (S424, NO), the program jumps back to S420.

At S425, the printing controller 312 produces an error screen for displaying an error message indicating that printing could not be completed. The printing controller 312 causes the user interface 118 to display the produced error message. The error screen may include a message that identifies print data 370 whose printing has not been completed yet.

At S426, the printing controller 312 sends a command to the information management section 313, commanding to delete the information corresponding to the printed print data 370 from the printing management table 371. Upon reception of the command, the information management section 313 performs the synchronization processing shown in FIG. 40, thereby updating the printing management table 371.

The printer 310 according to the third embodiment operates as described above. In other words, upon successful authentication of the user, the user is allowed to select print data 370, which has the same authentication information as that of the user, from the print data held in the printer 310 connected to the network 130. Therefore, the printer 310 that has successfully authenticated the user can print the print data 370.

In the flowchart shown in FIG. 48, while the user inputs his selection of the print data 370 at S413, this step may be omitted. In stead, the printer may print all the print data 370, which is held in the printers connected to the network 130 and has the same authentication information as that inputted by the user. The steps S417 to S425 shown in FIG. 48 may be omitted so that the printer 310 prints only the print data 370 held in that printer.

In the flowchart shown in FIG. 48, all of the print data 370 selected at S413 are printed at S416 and S421. The invention is not limited to this. The printer whose user is successfully authenticated may not be cap able of printing the selected print data 370. For example, assume that the printer 310 can print on up to A4 size paper. If the print data 370 is to be printed on A3 size paper, the printing controller 312 produces a warning screen and causes the user interface 118 to display the warning screen. The warning screen preferably includes a message that identifies the print data 370 that cannot be printed by the printer 310. Also, the warning screen preferably has an area through which the user can select either continuation or discontinuation of the printing process. If the user selects continuation of the process, the printing controller 312 continues printing process; if the user selects discontinuation, the printing controller 312 discontinues printing process.

In the flowchart shown in FIG. 48, at S412, the printing controller 312 causes the print data selection screen 380 to display all the print data 370 that has the same authentication information as that inputted by the user and held in the other printer 310 connected to the network 130. The invention is not limited to this. The printer 310 whose user is successfully authenticated may not be cap able of printing the selected printed data. For example, the printer is cap able of printing only on a print medium of maximum A4 size but the printing should be done on A3 size paper. The printing controller 312 may be configured to prevent the print data selection screen 380 from displaying the information about the print data 370 that cannot be printed by that printer 310. The printing controller 312 may not cause the user interface 118 to display the print data selection screen 380 but may cause the printing section 111 to print the print data 370 that the printer 310 can actually print.

Figure 50:
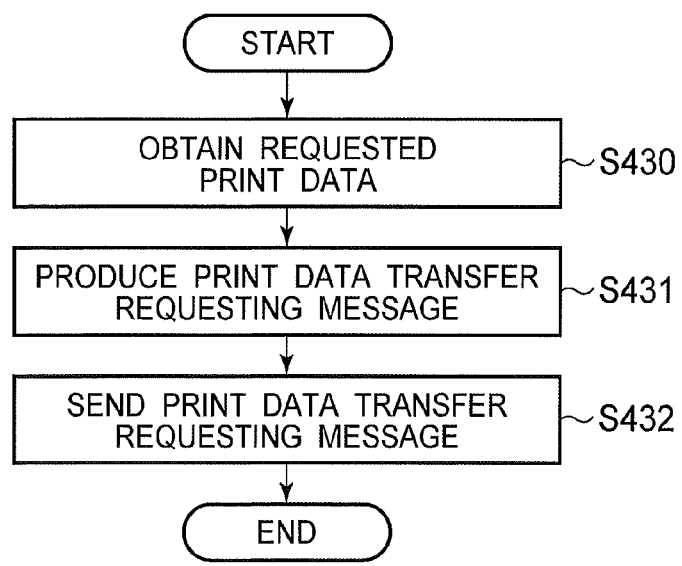
FIG. 50 is a flowchart illustrating the operation when the printer has received a print data obtain requesting message.

FIG. 50 is a flowchart illustrating the operation when the printer 310 has received a print data obtain requesting message. The flow starts when the printing controller 312 obtains the print data obtain requesting message via the communicating section 119.

The printing controller 312 obtains the print data requested by the print data obtain requesting message from the memory 316, and then erases the print data 370 from the memory 316 after the print data has been obtained from the memory 316 (S430). The printing controller 312 produces the print data transferring message that includes the obtained print data (S431). The printing controller 312 sends through the communicating section 119 the produced print data transferring message to the printer 310, which is a source device that sent the print data obtain requesting message (S432).

As described above, the printer 310 according to the third embodiment can send the print data 370 held in the memory 316 to other printer 310.

In the flowchart shown in FIG. 50, prior to step S430, the printing controller 312 may make a decision to determine whether the printer table 372 holds the information about the printer 310 that sent out the print data transfer requesting message, and then the program ends if the printer table 372 does not hold the information. While the printing controller 312 erases the print data 370 from the memory 316 after the print data 370 has been obtained from the memory 316 (S430), the invention is not limited to this. For example, the printing controller 312 may leave the print data intact and holds it for retry printing, in which case, the printing controller 312 may erase the print data 370 from the memory 316 upon reception of an erase command from the user through the user interface 118, or may erase the print data 370 from the memory 316 after a predetermined time elapsed from when the print data 370 is produced.

Figure 51:
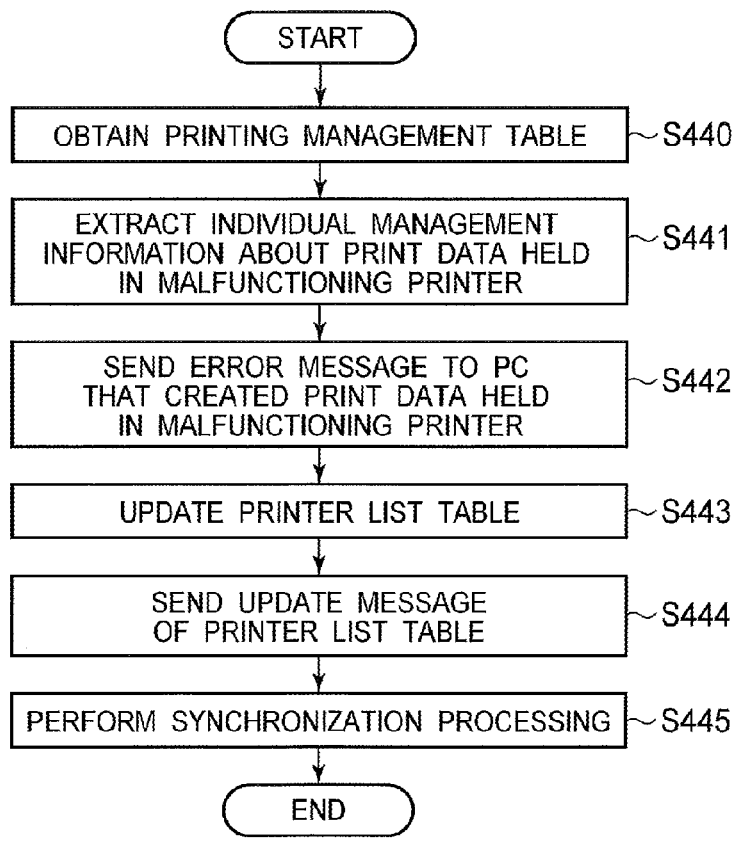
FIG. 51 is a flowchart illustrating the process when a printer has detected a malfunction in the other printer.

FIG. 51 is a flowchart illustrating the process when a printer 310 has detected a malfunction in the other printer 310. The flow starts when the searching section 314 or the information management section 313 has detected a malfunction in the other printers connected to the network 130. Assume, for example, that the searching section 314 sends the search data at a fixed time or at regular time intervals to the printer 310, the information about which is held in the printer table 372 held in the memory 316. If the printer does not send back a reply to the search data within a predetermined time frame after the search data has been sent out, the searching section 314 determines that the printer is malfunctioning. Alternatively, when a communication error occurs during the synchronization processing of the printing management table 371, the information management section 313 determines that a communication error has occurred in the printer 310 with which the printer is communicating.

The printing controller 312 obtains the printing management table 371 held in the memory 316 (S440).

The printing controller 312 extracts, from the printing management table 371 obtained at S440, information held in a record corresponding to the print data 370 held in the malfunctioning printer (S441). The information is extracted as individual management information.

The printing controller 312 refers to the individual management information extracted at S441, and then sends an error message to the PC 350 that produced the print data 370 held in the malfunctioning printer 310 (S442). Assume that the error message includes the information indicative of the print data 370 held in the malfunctioning printer 310 and that the destination of the error message is identified by the address field 371g of the printing management table 371. Upon reception of the error message, the print data generating section 351 of the PC 350 produces an error message screen 381 corresponding to the error message, and causes the user interface 154 to display the error message screen. The error message screen preferably displays information that identifies the print data 370 held in the malfunctioning printer 310.

Figure 52:
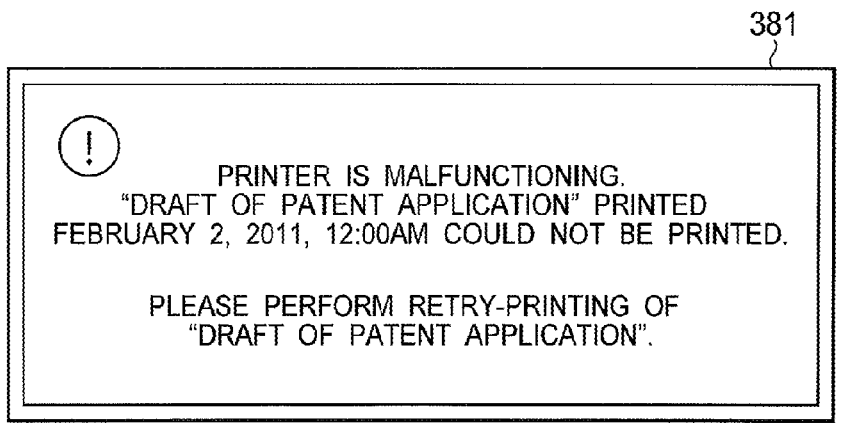
FIG. 52 illustrates an example of the error message screen.

FIG. 52 illustrates an example of the error message screen 381. The error message screen 381 includes the document name and the year-month-day-hour of creation of the print data 370 held in the malfunctioning printer 310.

The printing controller 312 updates the printer table 372 held in the memory 316 (S443), that is, the printing controller 312 deletes the information about the malfunctioning printer from the printer table 372.

The printing controller 312 produces the update message for the printer table 372, and sends the update message to the printer having a printer table 372 that holds the information about the malfunctioning printer (S444). The update message includes a command to delete the information about the malfunctioning printer 310. Upon reception of the update message, the printing controller 312 of the printer 310 deletes the information about the malfunctioning printer 310 from the printer table 372 held in the memory 316.

The printing controller 312 sends a command to the information management section 313, commanding to perform the synchronization processing (S445). This synchronization processing is to delete the record, from which the information is extracted at S441, from the printing management table 371. Upon reception of the command, the information management section 313 carries out the synchronization processing according to the flowchart shown in FIG. 40.

As described above, according to the third embodiment, when a malfunction occurs in a printer 310 holding the print data 370 produced by the PC 350, other functioning printer 310 can display the error message screen on the PC 350 based on the printing management table 371 held in the memory 316.

The error message sent to the PC 350 may include bibliographic data so that the print data generating section 351 of the PC 350 may reproduce the print data 370 based on the bibliographic data, and then resend it. If the print data 370 is successfully reproduced and then re-sent, the user interface 154 need not display the error message screen 381. If the print data 370 is not successfully reproduced and is not re-sent, the user interface 154 may display the error message screen 381.

Fourth Embodiment

{Configuration}

Referring to FIG. 1, an image forming system 400 according to a fourth embodiment includes a plurality of printers 410A, 410B, 410C, and 410D connected to a network 130. A personal computer (PC) 450 is also connected to the network 130. The reference numerals in parentheses in FIG. 1 refer to the elements in the configurations of second, third, and fourth embodiments.

Figure 53:
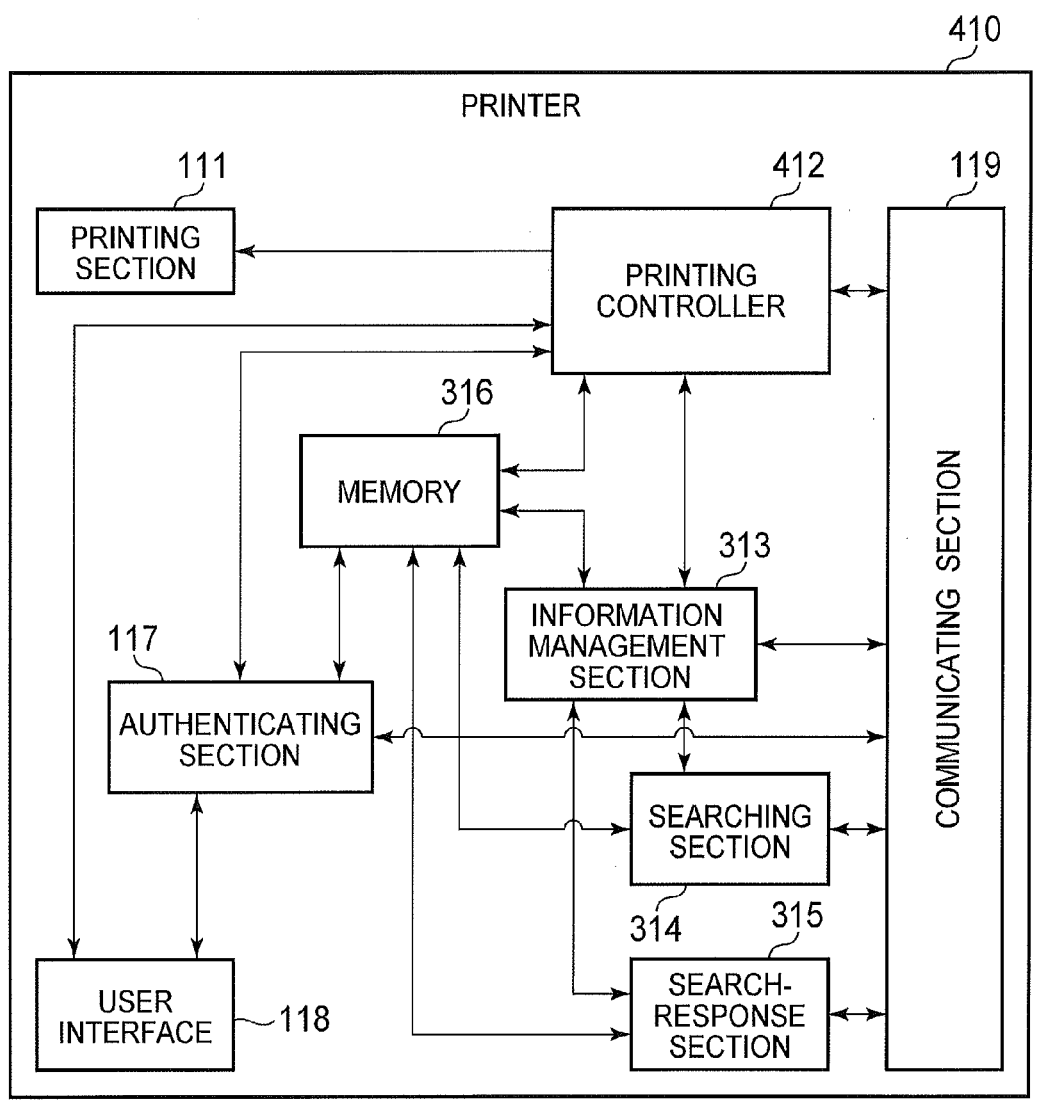
FIG. 53 is a block diagram illustrating the general configuration of the printers according to a fourth embodiment.

FIG. 53 is a block diagram illustrating the general configuration of the printers 410A-410D. Each of the printers 410A-410D includes a printing section 111, a printing controller 412, an information management section 313, a searching section 314, a search-response section 315, a memory 316, an authenticating section 117, a user interface (UI) 118, and a communicating section 119. The fourth embodiment differs from the first embodiment in that the printers 410A-4100D are used.

The printing controller 412 according to the fourth embodiment performs the same processes as the printing controller 312 according to the third embodiment. In addition, up on reception of the individual management information from the PC 450 via the communicating section 119, the printing controller 412 stores the obtained individual management information into the printing management table 371 held in the memory 316. Also, the printing controller 412 refers to the printing management table 371, and receives the print data 370 transferred from the PC 450 if the print data 370 to be printed is held in the PC 450.

Figure 54:
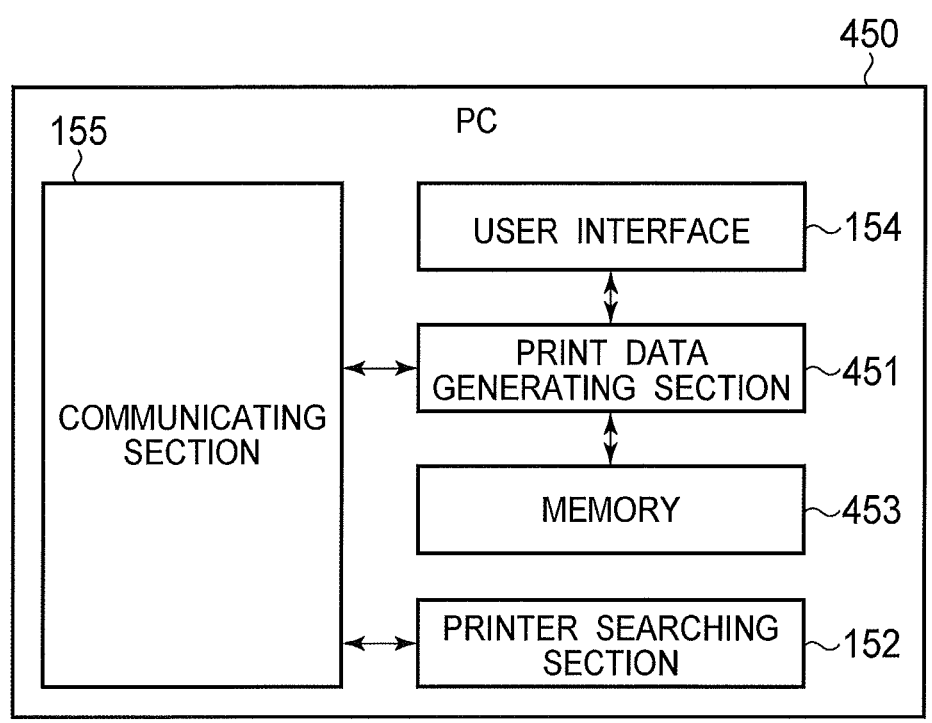
FIG. 54 is a block diagram illustrating the outline of the configuration of a PC.

FIG. 54 is a block diagram illustrating the outline of the configuration of the PC 450. The PC 450 includes a print data generating section 451, a printer searching section 152, a memory 453, a user interface 154, and a communicating section 155. The PC 450 according to the fourth embodiment differs from the PC 350 according to the third embodiment in that the print data generating section 451 and memory 453 are used.

The print data generating section 451 performs the same processes as the print data generating section 351 according to the third embodiment. In addition, if the printer 410 holds the print data 370 therein, the print data generating section 451 produces the individual management information corresponding to the produced print data 370 with additional data. The additional data includes the PC name of the PC 450 as a storage destination to which the print data 370 is sent, document name that is unique in the PC 450 and is assigned to the print data 370, and a path with which the print data 370 was stored in the PC 450. If the print data 370 is to be held in the PC 450, the print data generating section 451 stores the print data 370 into the memory 453 and then sends the produced individual management information via the communicating section 155 to the printer 410 detected by the printer searching section 152.

The print data generating section 451 stores the print data 370 therein under certain conditions, for example, (1) when the user interface 154 receives a command inputted by the user commanding to store the print data 370, (2) when the device is a device limited in its performance (e.g., note personal computer), (3) when a printer 410 to which the print data 370 is to be sent has a memory capacity smaller than a threshold, or (4) when there is a congestion in the network 130 (e.g., the printer takes a longer time than a predetermined time to respond to the packet sent to the printer).

{Operation}

Figure 55:
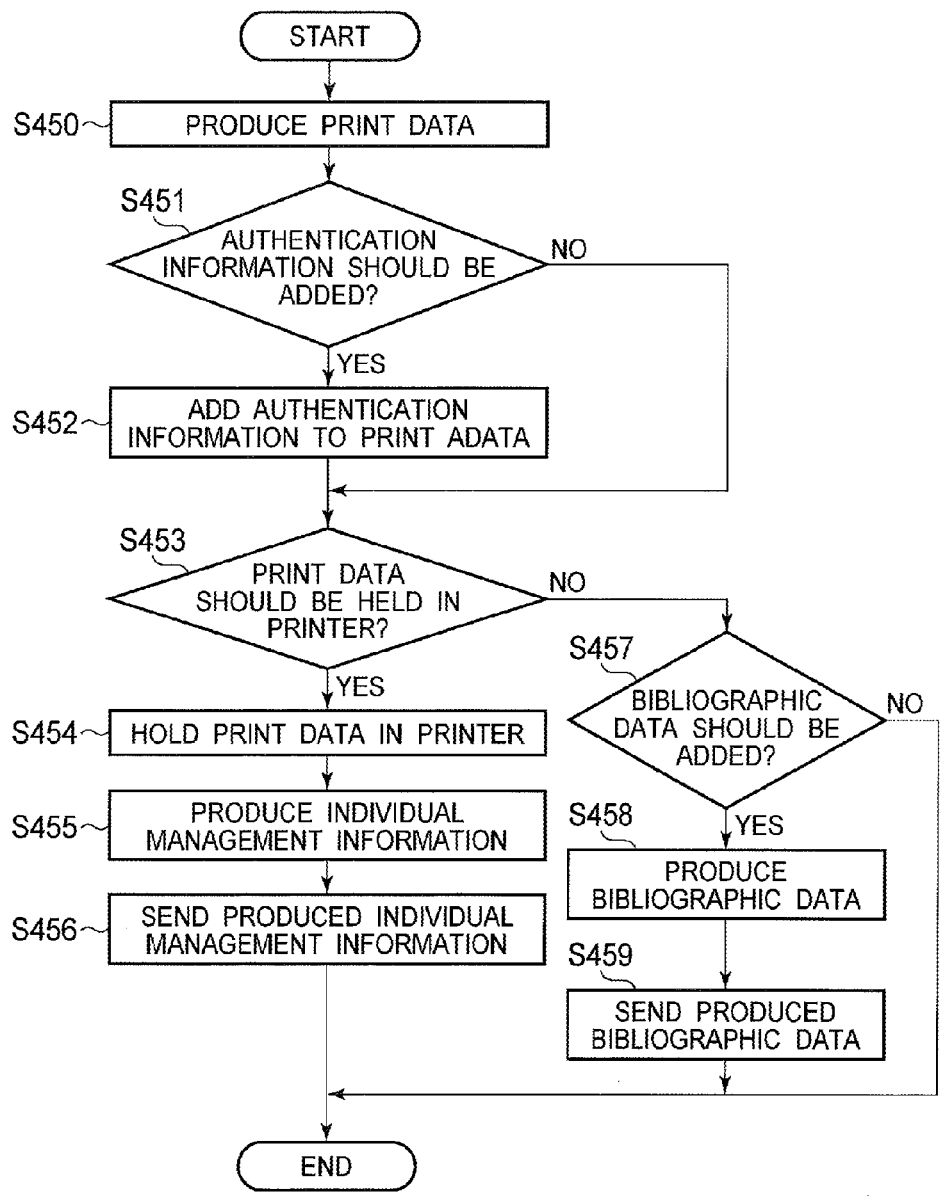
FIG. 55 is a flowchart illustrating the process in which the PC according to the fourth embodiment produces the print data and the individual management information.

FIG. 55 is a flowchart illustrating the process in which the PC 450 according to the fourth embodiment produces the print data 370 and the individual management information and sends them to other printers. The flow starts when the user has commanded to print a document via the user interface 154.

The print data generating section 451 produces the print data 370 from the document commanded to print (S450).

The print data generating section 451 makes a decision to determine whether the authentication information should be included into the print data 370 (S451). If the user of the PC 450 selects through the user interface 154 immediate printing of the print data, the print data generating section 451 determines that no authentication information is to be included into the print data. If the print data generating section 451 determines that the authentication information is to be included into the print data 370 (S451, YES), the program proceeds to S452; if the print data generating section 451 determines that the authentication information should not be added (S451, NO), the program jumps to S453.

At S452, the print data generating section 451 includes the authentication information into the print data 370 produced at S450.

At S453, the print data generating section 451 makes a decision to determine whether the print data 370 should be held in the printer by checking if the above-mentioned predetermined conditions are met. If the print data 370 should be held in the printer, the program proceeds to S454; if the print data 370 should not be held in the printer, the program proceeds to S457.

At S454, the print data generating section 451 assigns a unique name to the print data 370, and stores the print data 370 having the unique name as a file name into the memory 453.

The print data generating section 451 produces the individual management information by adding the PC name of the PC 450 as a storage destination to which the print data 370 is to be sent, the document name added to the print data 370 when the print data 370 is stored into the memory 316, and a path with which the print data 370 is stored into the memory 453 (S455). The print data generating section 451 then sends the produced individual management information to the printer 410 via the communicating section 155 (S456). The destination printer 410 is any one of the printers connected to the network 130. The destination printer 410 may be registered previously in the PC 450. For example, the user of the PC 450 or the administrator of the image forming system 400 may register the destination printer 410 via the user interface 154.

If it is determined that the print data 370 should not be held in the printer (S453, NO), the program proceeds to S457 where the print data generating section 451 makes a decision to determine whether the bibliographic data should be added to the print data 370. For example, the print data generating section 451 makes a decision at S457 by checking if the user of the PC 450 selected inclusion of the bibliographic data into the print data via the user interface 154. If the bibliographic data should be added to the print data (S457, YES), the program proceeds to S459 if the bibliographic data should not be added, the program ends.

At S458, the print data generating section 451 produces the bibliographic data, and adds the bibliographic data to the print data 370 produced at S450.

At S459, the print data generating section 451 sends the print data 370, or the print data 370 along with the bibliographic data if the bibliographic data has been added, to the printer 410 via the communicating section 155. The destination printer 410 is any one of the printers 410 connected to the network 130. The destination printer 410 may be registered previously in the PC 450. For example, the user of the PC 450 or the administrator of the image forming system 400 may set the destination printer 410 that receives the print data 370 from the PC 450.

As described above, the PC 450 according to the fourth embodiment produces the print data 370 and then sends the print data 370 to the destination printer 410. Also, the PC 450 may hold the print data 370 therein and send the individual management information to the destination printer 410.

Figure 56:
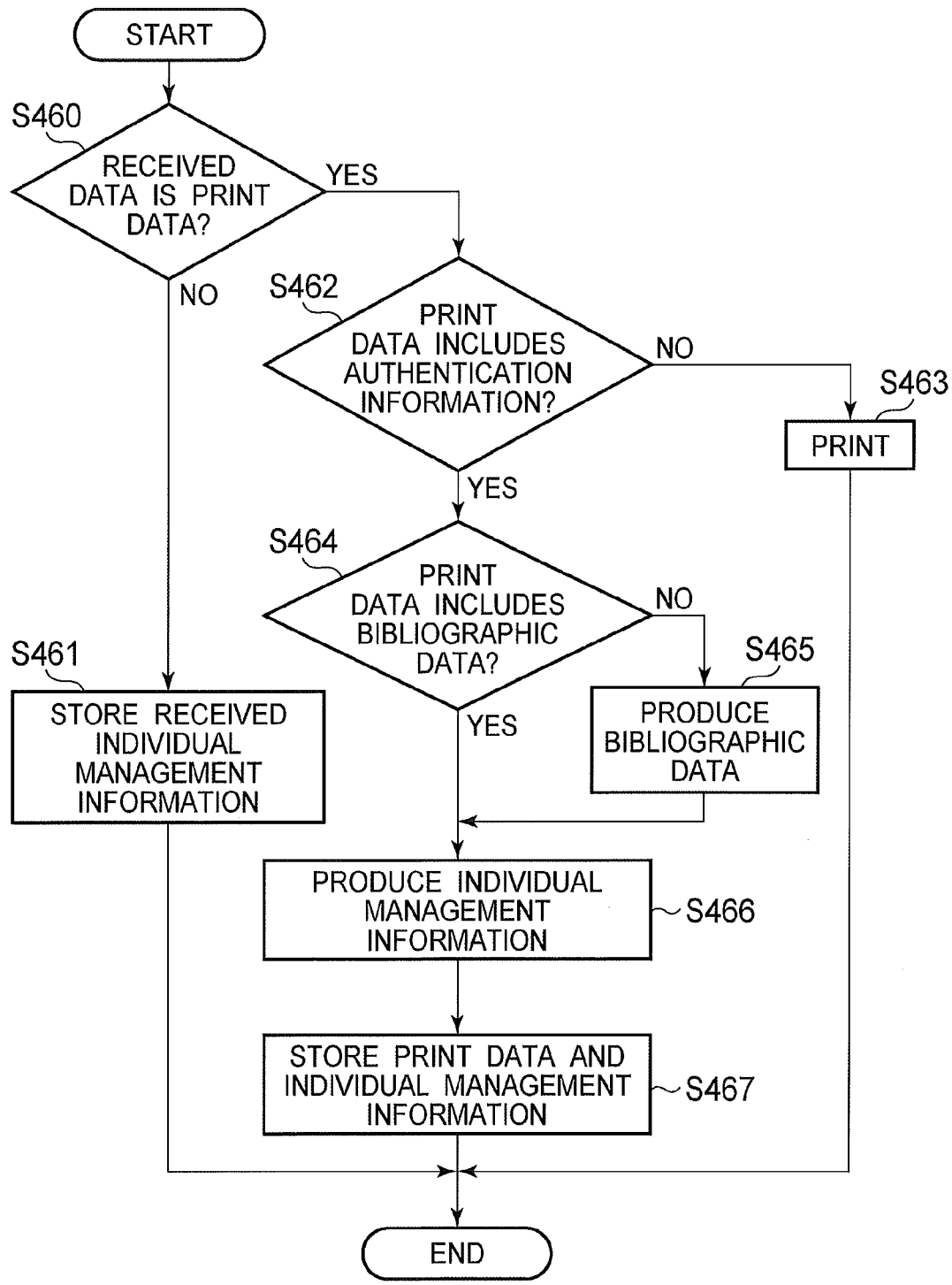
FIG. 56 is a flowchart illustrating the process when the printer according to the fourth embodiment has received the print data or the individual management information.

FIG. 56 is a flowchart illustrating the process when the printer 410 according to the fourth embodiment has received the print data 370 or the individual management information. The flow starts when the printing controller 412 of the printer 410 has obtained data from the PC 450 via the communicating section 119.

The printing controller 412 makes a decision to determine whether the data received through the communicating section 119 is the print data 370 (S460). If the received data is the print data 370 (S460, YES), then the program proceeds to S462; if the received data is not the print data 370 or the received data is the individual management information (S460, NO), then the program proceeds to S461.

At S461, the printing controller 412 adds a new record to the printing management table 371 held in the memory 316, and stores the received individual management information into the newly added record.

At S462, the printing controller 412 makes a decision to determine whether the print data received via the communicating section 119 includes the authentication information (S462). If the print data 370 includes the authentication information (S462, YES), the program proceeds to S464; if the print data 370 does not include the authentication information therein (S462, NO), the program proceeds to S463.

At S463, the printing controller 412 sends the received print data 370 to the printing section 111 which in turn prints the received print data 370.

At S464, the printing controller 412 makes a decision to determine whether the print data 370 includes bibliographic data therein. If the print data 370 includes the bibliographic data therein (S464, YES), the program proceeds to S466; if the print data 370 does not include the bibliographic data therein (S464, NO), the program proceeds to S465.

At S465, the printing controller 412 produces the bibliographic data from the value of the extended variable of the control data 370a included in the print data 370. Assume that the bibliographic data can identify at least the print data 370.

At S466, the printing controller 412 adds (1) the information which identifies the storage destination of the print data 370 and (2) the name of the print data 370 to the bibliographic data, thereby producing the individual management information (S466).

The printing controller 412 stores the received print data 370 into the memory 316, and adds a new record to the printing management table 371 held in the memory 316. The printing controller 412 stores the individual management information produced at S466 into the new record (S467).

As described above, when the printer 410 according to the fourth embodiment has received only the individual management information from the PC 450, the individual management information is stored into the printing management table 371.

Figure 57:
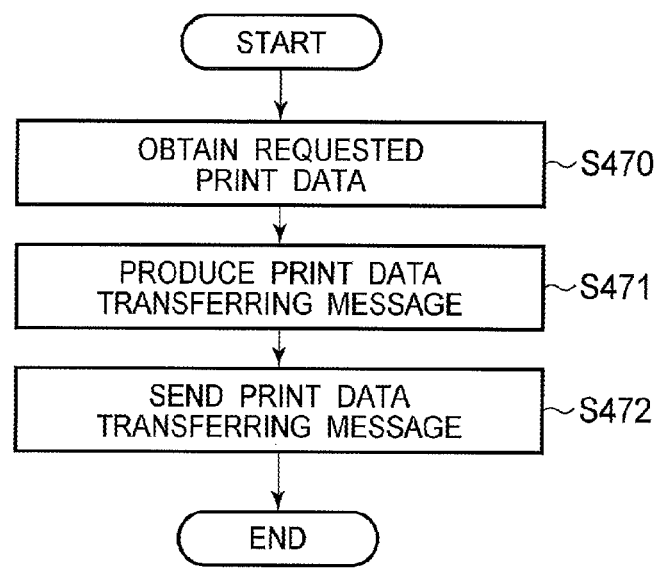
FIG. 57 is a flowchart illustrating the operation when the PC has received a print data obtain requesting message from the printer.

FIG. 57 is a flowchart illustrating the operation when the PC 450 has received a print data obtain requesting message from the printer 410. The flowchart starts when the print data generating section 451 has obtained the print data obtain requesting message via the communicating section 155.

The print data generating section 451 obtains the print data 370 from the memory 453 in response to the obtained print data obtain requesting message (S470), in which case, the printing controller 412 deletes the print data 370 from the memory 453 after having obtained the print data from the memory 453. The print data generating section 451 produces a print data transferring message that includes the obtained print data 370 (S471). The print data generating section 451 then sends the produced print data transferring message to the source printer 410 that sent the print data obtain requesting message (S472).

As described above, the PC 450 according to the fourth embodiment sends the print data 370 held in the memory 453 to the printer 410.

In the flowchart shown in FIG. 57, when the print data generating section 451 has obtained the print data 370 at S470, the print data generating section 451 erases the print data 370 from the memory 453. The invention is not limited to this. The print data generating section 451 may hold the print data 370 as it is for retry printing, in which case, the print data generating section 451 may erase the print data 370 from the memory 316 upon reception of an erase command from the user through the user interface 118, or may erase the print data 370 from the memory 316 after a predetermined time elapsed from when the print data 370 is produced.

In the fourth embodiment, the printer 410 whose user has been successfully authenticated may obtain the print data 370 from the PC 450 just as the printer 410 can obtain the print data from the other printers 410 that hold the print data 370. Therefore, the user can obtain the print out without knowing where the print data 370 is actually held. This increases user friendliness.

In the fourth embodiment, when the PC 450 sends the individual management information to the printer 410, the PC 450 sends the individual management information only to the printer 410 that actually prints the print data 370. In contrast, in the first to third embodiments, the print data 170, 270, and 370 may be transferred from the PCs 110, 150, 250, and 350 to the printers 110, 210, and 310, respectively, or from one of the printers 110, 210, and 310 to another one of the printers 110, 210, and 310, respectively. Thus, the fourth embodiment may be effective in reducing the data traffic on the network 130.

In the first to third embodiments, since the print data 170, 270, and 370 are necessarily stored in the printers 110, 210, and 310, respectively, the printers 110, 210, and 310 need to have a memory (e.g., HDD) with a relatively large capacity. In contrast, the fourth embodiment may also be configured such that the PC 450 stores the print data 370 and the printer 410 does not store the print data 370, in which case, the printer 410 only needs a memory having a relatively small capacity.

In the fourth embodiment as described above, if the print data generating section 451 meets predetermined conditions, the printer holds the print data 370 therein. However, the invention is not limited to this. For example, the PC 450 may be configured such that the PC 450 stores the print data 370 therein at all times.

The first to fourth embodiments have been described by way of the printers 110, 210, 310, and 410 as an image forming apparatus. The invention is not limited to this. For example, the image forming apparatus may take a variety of forms including a copying machine, a facsimile machine, and a multi function peripheral (MFP), as long as an image is printed in accordance with print data. In addition, an information processing apparatus that produces print data and an image forming apparatus that prints images may be combined into a complex apparatus. While the information processing apparatus that produces the print data has been described in terms of PC 150, PC 250, PC 350, and PC 450, the invention is not limited to this. For example, the information processing apparatus may be a cellular phone, a personal data assistance (PDA), or an imaging apparatus.

In the first to fourth embodiments, the image forming systems 100, 200, 300, and 400 have been configured with the printers 110, 210, 310 and 410. Instead, the PC 150, PC 250, PC 350, and PC 450 may be incorporated in the image forming systems 100, 200, 300, and 400, respectively.

What is claimed is:

1. An image forming apparatus for holding image information therein, the image forming apparatus being one of a plurality of image forming apparatuses connected to a network and being configured to communicate with remaining ones of the plurality of image forming apparatuses, the image forming apparatus comprising:

an image forming section configured to form an image in accordance with the image information;

a memory configured to store management information, the management information including an item of information that identifies one of remaining ones of the plurality of image forming apparatuses, the one of remaining ones of the plurality of image forming apparatuses holding the image information therein;

an information management section configured to perform a synchronization processing in which the management information in the plurality of image forming apparatuses is updated to become identical; and an image formation controlling section configured to obtain the image information held in the one of remaining ones of the plurality of image forming apparatuses identified by the item of information, and then drive the image forming section to form the image in accordance with the obtained image information, wherein the synchronization processing includes:
sending a first lock request to the remaining ones of the plurality of image forming apparatuses, the first lock request requesting that the management information be prevented from being changed;
sending first update data to the remaining ones of the plurality of image forming apparatuses, the first update data describing a change in the management information;
sending a first unlock request to the remaining ones of the plurality of image forming apparatuses, the first unlock request requesting that the management information be allowed to be changed;
receiving a second lock request from one of remaining ones of the plurality of image forming apparatuses;
receiving second update data from the one of remaining ones of the plurality of image forming apparatuses that sent the second lock request;
updating the management information in accordance with the received second update data; and
receiving a second unlock request from the one of remaining ones of the plurality of image forming apparatuses;
wherein the information management section performs only a process in accordance with the second update data received from the one of remaining ones of the plurality of image forming apparatuses that sent the second lock request, the process being performed from when the second lock request is received until the second unlock request is received.

2. The image forming apparatus according to claim 1, wherein the synchronization processing includes;
sending a first item of update data to a first one of remaining ones of the plurality of image forming apparatuses, the first item of update data indicative of at least a portion of the management information that should be updated;
receiving a second item of update data from a second one of remaining ones of the plurality of image forming apparatuses; and
updating the management information in accordance with the second item of update data.

3. The image forming apparatus according to claim 1 wherein the synchronization processing includes;
sending a first item of update data to a first one of remaining ones of the plurality of image forming apparatuses, the first item of update data including the information held in the updated management information;
receiving a second item of update data from a second one of remaining ones of the plurality of image forming apparatuses, the second item of update data including the information in the updated management information in the second one of remaining ones of the plurality of image forming apparatuses; and
replacing the information included in the management information with the information included in the second item of update data.

4. The image forming apparatus according to claim 1 further comprising:
a searching section configured to send first search data to the remaining ones of the plurality of image forming apparatuses; and a search-response section configured to respond to second search data received from one of the remaining ones of the plurality of image forming apparatuses, the search-response section producing search-response data that includes the information included in the management information, and sending the produced search-response data to the one of remaining ones of the plurality of image forming apparatuses that has sent the second search data;
wherein the information management section replaces information included in the management information held in the memory with the information included in the received search-response data.

5. The image forming apparatus according to claim 1, wherein the management information further includes an item of information that identifies an information processing apparatus that has created the image information;
wherein the image forming apparatus further comprises an operation inquiring section configured to detect whether the remaining ones of the plurality of image forming apparatuses are active,
wherein when the operation inquiring section detects that at least one of the remaining ones of the plurality of image forming apparatuses is inactive, the operation inquiring section identifies, based on the management information, the information processing apparatus that has created the image information held in the inactive image forming apparatus, and then notifies the identified information processing apparatus that processing of the image information held in the inactive image forming apparatus should be retried.

6. The image forming apparatus according to claim 1, wherein the plurality of image forming apparatuses are assigned priority levels;
wherein when the information management section has received the second lock request from one of the remaining ones of the plurality of image forming apparatuses, the information management section sends a first response responding to the second lock request to the one of remaining ones of the plurality of image forming apparatuses that has sent the second lock request, and receiving a second response responding to the first lock request from the one of remaining ones of the plurality of image forming apparatuses that has sent the first lock request;
wherein when the information management section has received the second lock request from the one of remaining ones of the plurality of image forming apparatuses after the information management section has sent the first lock request and before the information management section has received the second response,
(i) when the image forming apparatus has a priority level higher than the one of remaining ones of the plurality of image forming apparatuses that sent the second lock request, the information management section sends the update data,
(ii) when the image forming apparatus has a priority level lower than the one of remaining ones of the plurality of image forming apparatuses that sent the second lock request, the information management section performs only a process in accordance with the update data received from the image forming apparatus that sent the second lock request until the second unlock request is received.

7. The image forming apparatus according to claim 1, wherein the management information includes information that identifies another one of remaining ones of the plurality of the image forming apparatus that holds the image information and information that identifies an information processing apparatus that holds the image information;
 wherein the image formation controlling section obtains the image information held in one of the information processing apparatus that creates the image information and the another one of remaining ones of the plurality of image forming apparatuses, the information processing apparatus and the another one of remaining ones of the plurality of image forming apparatuses being identified by the item of information included in the management information, and the image formation controlling section then drives the image forming section to form the image in accordance with the obtained image information.

8. The image forming apparatus according to claim 7, wherein the image formation controlling section performs:
 (i) receiving individual management information from the information processing apparatus, the individual management information indicative of the information processing apparatus that hold the image information; and
 (ii) storing the received individual management information into the management information.

9. An image forming system comprising the image forming apparatus according to claim 1 and an information processing apparatus connected to the network to which the a plurality of image forming apparatuses are connected,
 wherein the information processing apparatus is configured to communicate with the plurality of image forming apparatuses and to send information to the plurality of image processing apparatuses.

10. A method for forming an image at one of a plurality of image forming apparatuses in accordance with an item of image information held in one of remaining ones of the plurality of image forming apparatuses connected to a network, the method comprising:
 storing management information that includes an item of information that identifies one of the remaining ones of the plurality of image forming apparatuses, the one of the remaining ones of the plurality of image forming apparatuses holding the item of image information therein;
 obtaining the image information held in the one of the remaining ones of the plurality of image forming apparatuses identified by the item of information; and
 forming the image in accordance with the obtained image information,
 wherein the method further includes:
  sending a first lock request from one of the plurality of image forming apparatuses to the remaining ones of the plurality of image forming apparatuses, the first lock request requesting that the remaining ones of the plurality of image forming apparatuses prevent the management information held in the remaining ones of the plurality of image forming apparatuses from being changed;
  sending first update data from the one of the plurality of image forming apparatuses to the remaining ones of the plurality of image forming apparatuses, the first update data describing a change in the management information to the remaining ones of the plurality of image forming apparatuses;
  sending a first unlock request from the one of the plurality of image forming apparatuses to the remaining ones of the plurality of image forming apparatuses, the first unlock request requesting that the management information be allowed to be changed;
  receiving a second lock request at the one of the plurality of image forming apparatuses from one of remaining ones of the plurality of image forming apparatuses;
  receiving second update data at the one of the plurality of image forming apparatuses from the one of remaining ones of the plurality of image forming apparatuses that sent the second lock request;
  updating the management information at the one of the plurality of image forming apparatuses in accordance with the received second update data; and
  receiving a second unlock request at the one of the plurality of image forming apparatuses from the one of remaining ones of the plurality of image forming apparatuses that sent the second update data, the second unlock request requesting to allow the management information in the one of the remaining ones of the plurality of image forming apparatuses to be changed; and
  performing, at the one of the plurality of image forming apparatuses, only a process in accordance with the second update data received from the one of remaining ones of the plurality of image forming apparatuses that sent the second lock request, the process being performed from when the second lock request is received until the second unlock request is received.

11. The method according to claim 10 further comprising:
 sending first update data from the one of the plurality of image forming apparatuses to a first one of the remaining ones of the plurality of image forming apparatuses, the first update data indicative of at least a portion of the management information that should be updated;
 receiving second update data at the one of the plurality of image forming apparatuses from a second one of the remaining ones of the plurality of image forming apparatuses; and
 updating the management information at the one of the plurality of image forming apparatuses in accordance with the second update data.

12. The method according to claim 10 further comprising:
 sending search data from one of the plurality of image forming apparatuses to the remaining ones of the plurality of image forming apparatuses, the search data being used for detecting the remaining ones of the plurality of apparatuses;
 receiving search-response data from the one of the remaining ones of the plurality of image forming apparatuses, the search-response data responding to the search data and including an item of information therein; and
 replacing a portion of the management information with the item of information included in the received search-response data.

13. The method according to claim 10 further comprising:
 sending operation inquiring data from one of the plurality of image forming apparatuses to the remaining ones of the plurality of image forming apparatuses;
 receiving inquiry replying data, at the one of the plurality of image forming apparatuses, from the remaining ones of the plurality of image forming apparatuses, the inquiry replying data responding to operation inquiring data;
 determining that an image forming apparatus of the plurality of image forming apparatus is inactive when the one of the plurality of image forming apparatuses fails to receive the inquiry replying data from the image forming apparatus;
 identifying an image processing apparatus that created the image information held in the image forming apparatus determined to be inactive; and notifying the image processing apparatus, which created the image information, that printing of the image information should be retried.

14. The method according to claim 10 further comprising:
(i) receiving individual management information from an information processing apparatus, the individual management information indicative of the information processing apparatus that holds the image information; and
(ii) storing the received individual management information into the management information.

15. A method for forming an image at one of a plurality of image forming apparatuses in accordance with an item of image information held in one of remaining ones of the plurality of image forming apparatuses connected to a network, the method comprising:
storing management information that includes an item of information that identifies one of the remaining ones of the plurality of image forming apparatuses, the one of the remaining ones of the plurality of image forming apparatuses holding the item of image information therein;
obtaining the image information held in the one of the remaining ones of the plurality of image forming apparatuses identified by the item of information; and
forming the image in accordance with the obtained image information,
wherein the method further includes:
sending a first lock request from the one of the plurality of image forming apparatuses to the remaining ones of the plurality of image forming apparatuses, the first lock request requesting that the management information be prevented from being changed;
sending first update data from the one of the plurality of image forming apparatuses to one of the remaining ones of the plurality of image forming apparatuses, the first update data including information in the updated management information;
sending a first unlock request from the one of the plurality of image forming apparatuses to the one of the remaining ones of the plurality of image forming apparatuses, the first unlock request requesting that the management information in the one of the remaining ones of the plurality of image forming apparatuses be allowed to be changed;
receiving a second lock request at the one of the remaining ones of the plurality of image forming apparatuses from the one of the remaining ones of the plurality of image forming apparatuses;
receiving second update data at the one of the remaining ones of the plurality of image forming apparatuses from one of the remaining ones of the plurality of image forming apparatuses that sent the second lock request;
replacing the management information in the one of the remaining ones of the plurality of image forming apparatuses with the information included in the second update data from the one of the remaining ones of the plurality of image forming apparatuses; and
receiving a second unlock request at the one of the remaining ones of the plurality of image forming apparatuses from the one of the remaining ones of the plurality of image forming apparatuses;
performing, at the one of the plurality of image forming apparatuses, only a process in accordance with the second update data received from the one of the remaining ones of the plurality of image forming apparatuses that sent the second lock request, the process being performed from when the second lock request is received until the second unlock request is received.

16. The method according to claim 15, further comprising:
sending a first response from the one of the plurality of image forming apparatuses to the one of remaining ones of the plurality of image forming apparatuses that has sent the second lock request, the first response responding to the second lock request and being sent when the information management section has received the second lock request from one of the remaining ones of the plurality of image forming apparatuses;
receiving a second response, at the one of the plurality of image forming apparatuses, the second response responding to the first lock request from the one of remaining ones of the plurality of image forming apparatuses that has sent the first lock request;
wherein when the one of the plurality of image forming apparatuses has received the second lock request from the one of remaining ones of the plurality of image forming apparatuses after the information management section has sent the first lock request and before the information management section has received the second response;
(i) sending the update data from the one of the plurality of image forming apparatuses, when the image forming apparatus has a priority level higher than the one of remaining ones of the plurality of image forming apparatuses that sent the second lock request,
(ii) performing only a process in accordance with the update data received from the image forming apparatus that sent the second lock request until the second unlock request is received, when the image forming apparatus has a priority level lower than the one of remaining ones of the plurality of image forming apparatuses that sent the second lock request.

* * * * *